(12) United States Patent
Aran et al.

(10) Patent No.: US 12,345,677 B2
(45) Date of Patent: Jul. 1, 2025

(54) INTEGRATED CIRCUIT WITH 2D FETS FOR DIRECT AND INDIRECT TARGET SIGNAL MEASUREMENT

(71) Applicant: Cardea Bio, Inc., San Diego, CA (US)

(72) Inventors: Kiana Aran, Pasadena, CA (US); Brett Goldsmith, San Diego, CA (US); Alexander Kane, Santa Cruz, CA (US); Regis Peytavi, Costa Mesa, CA (US)

(73) Assignee: Cardea Bio, Inc., San Diego, CA (US)

( * ) Notice: Subject to any disclaimer, the term of this patent is extended or adjusted under 35 U.S.C. 154(b) by 479 days.

(21) Appl. No.: 17/749,993

(22) Filed: May 20, 2022

(65) Prior Publication Data

US 2022/0365024 A1 Nov. 17, 2022

Related U.S. Application Data

(63) Continuation-in-part of application No. 17/342,284, filed on Jun. 8, 2021, now abandoned.

(60) Provisional application No. 63/191,307, filed on May 20, 2021, provisional application No. 63/314,270, filed on Feb. 25, 2022, provisional application No. 63/343,019, filed on May 17, 2022, provisional application No. 63/036,772, filed on Jun. 9, 2020.

(51) Int. Cl.
*G01N 27/414* (2006.01)

(52) U.S. Cl.
CPC ..... *G01N 27/4145* (2013.01); *G01N 27/4148* (2013.01)

(58) Field of Classification Search
CPC ............... G01N 27/4145; G01N 27/4148
See application file for complete search history.

(56) References Cited

U.S. PATENT DOCUMENTS 6,201,267 B1 3/2001 Gupta et al.
8,313,639 B2 11/2012 Rothberg et al.
(Continued)

FOREIGN PATENT DOCUMENTS

WO 2010033087 A1 3/2010

OTHER PUBLICATIONS

PCT/US22/30348, "Notification of Transmittal of the International Search Report and the Written Opinion of the International Searching Authority, or the Declaration", International Searching Authority, Oct. 26, 2022, pp. 1-21.
(Continued)

*Primary Examiner* — Richard A Booth
(74) *Attorney, Agent, or Firm* — Kunzler Bean & Adamson; Thomas D Briscoe

(57) ABSTRACT

A system and apparatus for direct or indirect target substance signal measurement include an integrated circuit with an array of 2D FETs with corresponding 2D transistor channels and a gate area for receiving a volume of liquid with one or more chemical or biological target substances, a conductive source electrically coupled to a first end of the 2D transistor channel, a conductive drain electrically coupled to a second end of the 2D transistor channel, a ceramic coating over the conductive source and the conductive drain and a thin film layer of synthetic biopolymer specific binding agents is adsorbed to the top surface of the 2D transistor channel. Methods for the system and apparatus and for selecting the synthetic biopolymer specific binding agents based on absorptivity are disclosed.

19 Claims, 16 Drawing Sheets

(56) References Cited

U.S. PATENT DOCUMENTS

| | | | |
|---|---|---|---|
| 10,309,924 B2 | 6/2019 | Jayant et al. | |
| 10,968,481 B2 | 4/2021 | van Rooyen et al. | |
| 2006/0205013 A1 | 9/2006 | Shim et al. | |
| 2019/0112643 A1 | 4/2019 | Aran et al. | |
| 2021/0116412 A1 | 4/2021 | Byrne et al. | |
| 2021/0246501 A1* | 8/2021 | van Rooyen | C12Q 1/6869 |
| 2023/0408510 A1* | 12/2023 | Goldsmith | G01N 27/4145 |

OTHER PUBLICATIONS

Tan et al., "A Graphene Oxide-Based Fluorescent Aptasensor for the Turn-on Detection of CCRF-CEM", Nanoscale Research Letters, Apr. 2018, pp. 1-8.

Guo et al., "A Novel Graphene Oxide-Based Aptasensor for Amplified Fluorescent Detection of Aflatoxin M1 in Milk Powder", Sensors, 2019, pp. 1-9.

Li et al., "Fluorescent aptamer-functionalized graphene oxide biosensor for label-free detection of mercury(II)", Biosensors and Bioelectronics, Elsevier, 2013, pp. 1-5.

Park et al., "Immobilization-free screening of aptamers assisted by graphene oxide", Chem. Commun., 48, 2071-2073, The Royal Society of Chemistry, 2012, pp. 1-4.

Thodkar et al., "Self-Assembled Pyrene Stacks and Peptide Monolayers Tune the Electronic Properties of Functionalized Electrolyte-Gated Graphene Field-Effect Transistors", ACS Appl. Mater. Interfaces, Feb. 12, 2021, pp. 1-9.

Wu et al., "Graphene Field-Effect Transistors for the Sensitive and Selective Detection of *Escherichia coli* Using Pyrene-Tagged DNA Aptamer", Advanced Healthcare Materials, Research Gate, Aug. 2017, pp. 1-10.

* cited by examiner $$1162 \rightarrow dI/dV_G = kV_G + B + \frac{A}{1+e^{-wV_G}}$$

INTEGRATED CIRCUIT WITH 2D FETS FOR DIRECT AND INDIRECT TARGET SIGNAL MEASUREMENT

CROSS-REFERENCE TO RELATED APPLICATIONS

This application claims priority to U.S. Provisional Patent Application No. 63/191,307 titled "System, Apparatus, and Method for Direct or indirect target substance signal measurement" filed May 20, 2021. This application claims priority to U.S. Provisional Patent Application No. 63/314,270 titled "Integrated circuit With 2D Field-Effect Transistors and On-Chip Thin Film Layer Deposition with Electrical Characterization" and filed Feb. 25, 2022. This application also claims priority to U.S. Provisional Patent Application No. 63/343,019 titled "Integrated Circuit with 2D Field Effect Transistors and Connected Analysis Modules for Determining Transfer Curve Parameters In Real-Time" and filed May 17, 2022. This application is also a continuation-in-part of U.S. application Ser. No. 17/342,284 titled "Dynamic Excitation and Measurement of Biochemical Interactions" and filed Jun. 8, 2021, which in turn claims priority to U.S. Provisional Patent Application No. 63/036,772 titled "Dynamic Excitation and Measurement of Biochemical Interactions" and filed Jun. 9, 2020. All of the aforementioned applications are hereby incorporated by reference to the extent legally permissible under relevant patent laws and rules.

FIELD

The subject matter disclosed herein relates to field effect transistor arrays, and more particularly relates to an integrated circuit with two dimensional field effect transistors for direct and indirect target signal measurement.

BACKGROUND

Field effect transistors may be used as sensors to detect target substances or interactions in a liquid. With the liquid applied in contact with a sensitive transistor channel, substances or interactions occurring sufficiently close to the channel may gate the current through the channel.

In a multilayer integrated circuit with field effect transistors where a channel is formed in a layer of a two dimensional nanomaterial such as graphene, a sensitization layer in the liquid may be added on top of the channel for sensitizing the channel to detect a target substance. For example, the sensitization layer may include specific binding agents such as antibodies or nucleic acids that are selected or developed to bind to a target substance in the liquid. However, if a sensitization layer of antibodies or nucleic acids is added on a channel of a graphene field effect transistor, the binding interaction between the antibodies or nucleic acids and the target may not occur sufficiently close to the channel to produce optimally detectable signals, or the concentration of the analytes may be insufficient for detection.

SUMMARY

A system is disclosed for direct or indirect direct or indirect target substance signal measurement. In various examples, the system includes an integrated circuit that includes an array of 2D FETs, at least a portion of the 2D FETs in the array individually including a 2D transistor channel disposed horizontally on a substrate, the 2D transistor channel comprising a top surface configured to carry electrical charges, a gate area for receiving a volume of liquid comprising one or more chemical or biological target substances, a conductive source electrically coupled to a first end of the 2D transistor channel, a conductive drain electrically coupled to a second end of the 2D transistor channel, where an ceramic coating is disposed over the conductive source and the conductive drain to electrically insulate at least a portion of the conductive source and at least a portion of the conductive drain, and a thin film layer of synthetic biopolymer specific binding agents adsorbed to the top surface of the 2D transistor channel.

In one or more examples, the synthetic biopolymer specific binding agents are selected to bind to a target substance in a liquid applied to the array of 2D FETs in contact with the top surface. In various examples, the system includes one or more gate bias electrodes for biasing and/or measuring electrical characteristics of the liquid, the one or more gate bias electrodes disposed on the substrate. In one or more examples, the system includes a measurement controller operable to apply one or more excitation conditions to the array of 2D FETs such that one or more output signals for the array of 2D FETs are affected by binding of the synthetic biopolymer specific binding agents, and to perform one or more measurements of the one or more output signals affected by binding of the synthetic biopolymer specific binding agents.

In some examples, the system includes an analysis module operable to determine measurement vectors relating to presence of the target substance, based on the one or more measurements, where at least a portion of the analysis module and the measurement controller individually comprises one or more of a set of hardware circuits, a set of programmable logic, and executable code stored on non-transitory computer-readable storage media.

In certain examples, the measurement vectors include one or more transfer curve parameters derived from on-chip electrical measurements of thin film characteristics of the layer of synthetic biopolymer specific binding agents in the liquid, the thin film characteristics selected from thickness, relative thickness, porosity, relative porosity, and combinations thereof. In various examples, the measurement vectors include one or more transfer curve parameters selected from maximum transconductance magnitudes for p-type and/or n-type branches of a transfer curve, a charge neutrality point voltage of the transfer curve, resistance at the charge neutrality point, curvature of the transfer curve in a charge neutrality point region, curvature of the p-type and/or n-type branches of the transfer curve apart from the charge neutrality point region, slope of the p-type and/or n-type branches of the transfer curve apart from the charge neutrality point region, skew of the transfer curve between the p-type and n-type branches of the transfer curve, and combinations thereof In some examples, one or more analyte characterization parameters selected from capacitance, mobility, defect density, and combinations thereof, are extracted from the measurement vectors using a physical model of current through selected 2D FETs that includes a capacitance term dependent on gate voltage and a term for skew of the transfer curve between p-type and n-type conduction.

In one or more examples, the thickness of a selected thin film layer in the liquid is determined by determining a ratio of a pre-deposition fitted capacitance to a post-deposition fitted capacitance. In certain examples, the synthetic biopolymer specific binding agents are further selected not to bind to a counter target. In some examples, the synthetic biopolymer specific binding agents are selected to desorb from top surfaces of channels of the 2D FETs and to specifically bind to the target substance in a selected type of liquid. In various example the liquid comprises a buffer solution. In certain examples the liquid is derived from a biological source.

An apparatus is disclosed that includes a 2D transistor channel for a 2D FET array and synthetic biopolymer specific binding agents adsorbed to a top surface of the 2D transistor channel, the synthetic biopolymer specific binding agents selected to bind to a target substance in a liquid applied to the top surface. In one or more examples, with the synthetic biopolymer specific binding agents adsorbed to the top surface of the 2D transistor channel, output current is within a predetermined range for a 2D FET of the 2D FET array.

In certain examples, the apparatus includes a counter electrode operable to apply a bias between the counter electrode and the top surface, such that ions in the liquid are attracted to the counter electrode and the opposite charge ions in the liquid are attracted to the top surface of the 2D transistor channel. In some examples, the synthetic biopolymer specific binding agents are selected from peptides, nucleic acid molecules, saccharides, and combinations thereof, such that desorption of the synthetic biopolymer specific binding agents from the top surface displaces negative charges from the 2D transistor channel.

A method is disclosed that, in various examples, includes depositing on a channel of a 2D FET, a thin film layer of a synthetic biopolymer specific binding agent for a target substance in a sample liquid, the synthetic biopolymer specific binding agent selected based on absorptivity type chosen from a type A absorptivity where the synthetic biopolymer specific binding agent is selected to remain adsorbed the channel of the 2D FET in response to specific binding with the target substance, and a type D absorptivity where the synthetic biopolymer specific binding agent is selected to desorb from the channel of the 2D FET in response to specific binding with the target substance. The method include, in one or more examples, determining a reference measurement vector of 2D FET output current versus liquid gate voltage for the selected thin film layer of a synthetic biopolymer specific binding agent in a reference liquid that lacks the target substance by applying time dependent excitation conditions to the reference liquid.

In some examples, the method includes determining a measurement vector of 2D FET output signals versus liquid gate voltage for the selected thin film layer of a synthetic biopolymer specific binding agent in the sample liquid by applying the time dependent excitation conditions to the sample liquid and characterizing the target substance in the sample liquid by applying a transfer curve model of the 2D FET to the measured output signal and extracting parameters usable to identify the target substance.

In some examples, selecting the synthetic biopolymer specific binding agent based on absorptivity type is facilitated by performing a selection cycle. The selection cycle is performed by: adsorbing a library of synthetic biopolymer specific binding agent candidates to new 2D transistor channel material; incubating the 2D transistor channel material in a liquid with the target substance, such that a subset of the synthetic biopolymer specific binding agent candidates desorb from the 2D transistor channel material and bind to the target substance; and amplifying the subset of synthetic biopolymer specific binding agent candidates, for use as synthetic biopolymer specific binding agents or as a new library of synthetic biopolymer specific binding agent candidates in a subsequent selection cycle or counterselection cycle.

In certain examples, the method further includes performing a counterselection cycle, the counterselection cycle including adsorbing a library of synthetic biopolymer specific binding agent candidates to new 2D transistor channel material; incubating the 2D transistor channel material in a liquid with a counter target, such that a first subset of the synthetic biopolymer specific binding agent candidates desorb from the 2D transistor channel material and bind to the counter target, and a second subset of the synthetic biopolymer specific binding agent candidates remain adsorbed to the 2D transistor channel material; desorbing the second subset of synthetic biopolymer specific binding agent candidates from the 2D transistor channel material; and amplifying the second subset of synthetic biopolymer specific binding agent candidates, for use as synthetic biopolymer specific binding agents or as a new library of synthetic biopolymer specific binding agent candidates in a subsequent selection cycle or counterselection cycle.

In one or more examples, the method further include iteratively performing a plurality of selection cycles and counterselection cycles to produce a final set of synthetic biopolymer specific binding agents, and adsorbing the final set of synthetic biopolymer specific binding agents to a 2D transistor channel material for a field effect transistor array. In some examples, the new 2D transistor channel material for the selection cycles and counterselection cycles is produced using a process that substantially matches the process for producing the 2D transistor channel for the 2D field effect transistor array. In various examples, the method includes increasing buffer stringency and decreasing target concentration for the liquid across multiple selection cycles.

BRIEF DESCRIPTION OF THE DRAWINGS

In order that the advantages of the subject matter of the present disclosure will be readily understood, a more particular description of the features briefly described above will be rendered by reference to specific examples that are illustrated in the appended drawings. Understanding that these drawings depict only typical examples of the disclosed subject matter and are not therefore to be considered to be limiting of the scope of the claims, the disclosed subject matter will be described and explained with additional specificity and detail through the use of the accompanying drawings, in which:

DETAILED DESCRIPTION

Figure 1:
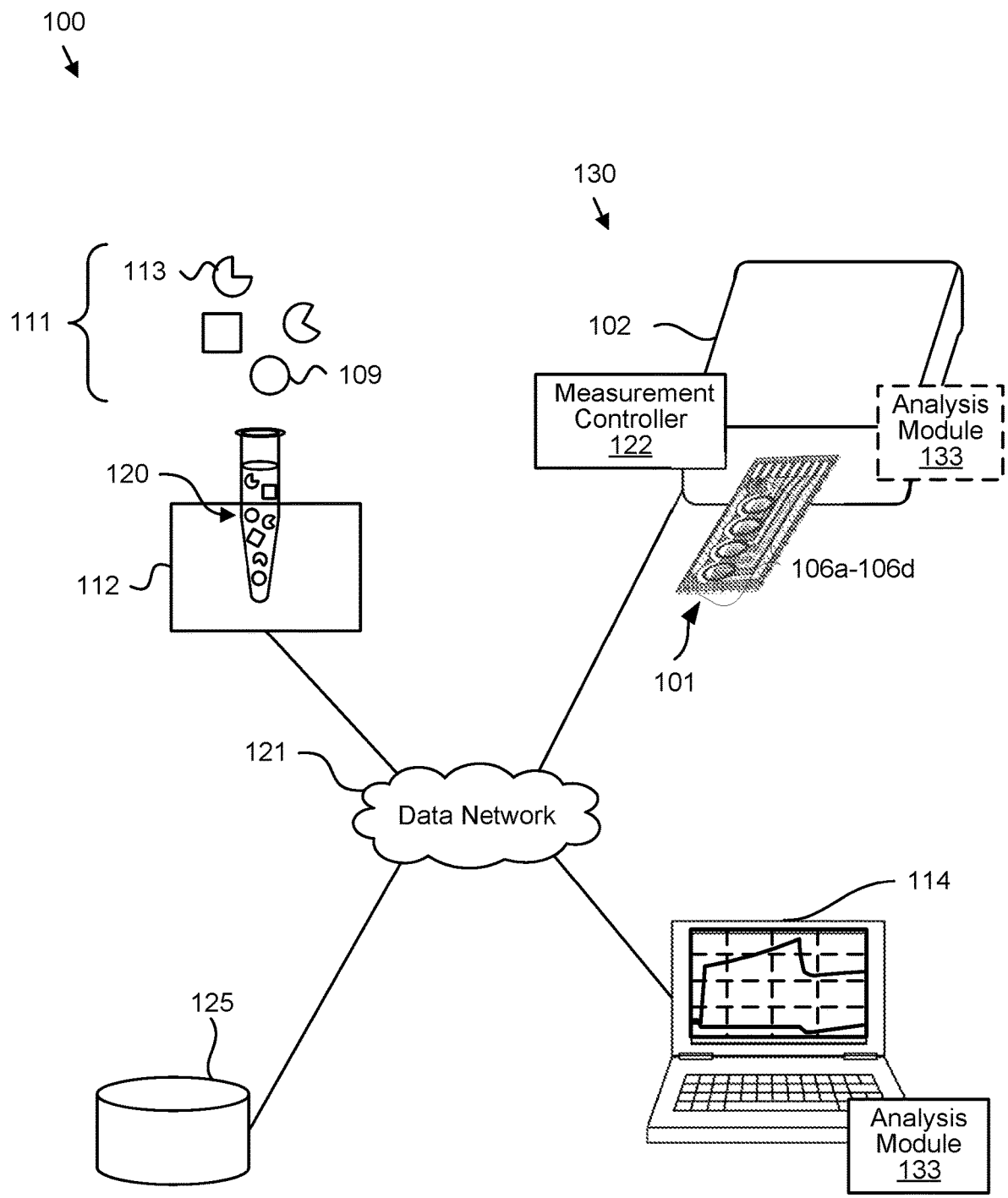
FIG. 1 is a schematic block diagram illustrating a system for direct or indirect direct or indirect target substance signal measurement, according to one or more examples of the present disclosure.

As will be appreciated by one skilled in the art, aspects of the disclosure may be embodied as a system, method, or program product. Accordingly, examples including implementations/examples may take the form of an entirely hardware implementation, an entirely software implementation (including firmware, resident software, micro-code, etc.) or an implementation combining software and hardware aspects that may all generally be referred to herein as a "circuit," "module," or "system." Furthermore, implementation may take the form of a program product embodied in one or more computer readable storage media and/or devices storing machine readable code, computer readable code, and/or program code, referred hereafter as code. The storage media and/or devices may be tangible, non-transitory, and/or non-transmission. IN various examples, the storage media and/or devices may not embody signals. In certain examples, the storage devices only employ signals for accessing code.

Certain of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for examples may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain examples, may alternatively be embodied by or implemented as a component.

A circuit, or circuitry, as used herein, comprises a set of one or more electrical and/or electronic components providing one or more pathways for electrical current. In certain examples, circuitry may include a return pathway for electrical current, so that a circuit is a closed loop. In some examples, however, a set of components that does not include a return pathway for electrical current may be referred to as a circuit or as circuitry (e.g., an open loop). For example, an integrated circuit may be referred to as a circuit or as circuitry regardless of whether the integrated circuit is coupled to ground (as a return pathway for electrical current) or not. In various examples, circuitry may include an integrated circuit, a portion of an integrated circuit, a set of integrated circuits, a set of non-integrated electrical and/or electrical components with or without integrated circuit devices, or the like.

In one or more examples, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the modules described herein, in certain example, may be embodied by or implemented as a circuit.

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation.

In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

Aspects of the examples are described below with reference to schematic flowchart diagrams and/or schematic block diagrams of methods, apparatuses, systems, and program products according to examples. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatuses, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various examples. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding examples. Indeed, some arrows or other connectors may be used to indicate only the logical flow of the depicted example. For instance, an arrow may indicate a waiting or monitoring period of unspecified duration between enumerated steps of the depicted example. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate examples of like elements.

As used herein, a list with a conjunction of "and/or" includes any single item in the list or a combination of items in the list. For example, a list of A, B, and/or C includes only A, only B, only C, a combination of A and B, a combination of B and C, a combination of A and C or a combination of A, B, and C. As used herein, a list using the terminology "one or more of" includes any single item in the list or a combination of items in the list. For example, one or more of A, B, and C includes only A, only B, only C, a combination of A and B, a combination of B and C, a combination of A and C or a combination of A, B, and C. As used herein, a list using the terminology "one of" includes one and only one of any single item in the list. For example, "one of A, B, and C" includes only A, only B or only C and excludes combinations of A, B, and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B, and C.

Definitions

The term "integrated circuit," as used herein, refers to a plurality of circuits or circuit components formed on a common substrate. For example, an integrated circuit may include a plurality of transistors. As another example, an integrated circuit may include one or more transistors with peripheral components such as resistors, capacitors, voltage regulators, or the like. Although the term "integrated circuit" is sometimes used in the semiconductor industry to refer to digital circuits such as microprocessors with millions or billions of transistors, the term may refer to digital and/or analog circuits, and to circuits with as few as two components integrated on the same substrate. Examples of a substrate for an integrated circuit include silicon, silicon oxide or another non-conductive substrate formed above a silicon wafer or chip, plastics, fiberglass, polymers, glass, or other conductive or non-conductive substances, which may or may not be silicon-based. Some integrated circuits may be manufactured using layered processing similar to integrated circuit processes for silicon chips, applied with any desired modifications to materials other than silicon chips.

The term "graphene," as used herein, refers to a single layer of carbon atoms arranged in a two-dimensional (2D) hexagonal lattice. The hexagonal lattice may resemble the hexagonal structure of a honeycomb. A single layer of atoms may be referred to as an "atomic" layer. Minor impurities, lattice defects, or deformations may exist in an atomic layer of carbon, but the resulting structure may nevertheless still be referred to as "graphene."

The terms "new 2D transistor channel material" or "new graphene channel material" refers to an unused layer of the same 2D material as used in the 2D FET but which does not necessarily have to be formed as part of a transistor for purposed of testing whether particular synthetic biopolymer specific binding agents such as aptamers, peptides, saccharides, or similar biopolymers are suitable for desorbing from the type of 2D material used in the channel of the 2D FETs in response to biochemical interactions with a target substance in liquid.

The terms "two dimensional field effect transistor" or "2D FET," as used herein, refer to a transistor where current between source and drain terminals, through one or more channels comprising a 2D nanomaterial such as graphene, molybdenum disulfide, phosphorene, transition metal dichalcogenides, or similar 2D material, can be modulated by events occurrences, or interactions that affect the conductivity of the channel(s). Although the term "2D FET" may be sometimes used in industry to refer to entirely solid-state devices where the output current of the 2D material channel is modulated via a gate terminal or a body terminal, the 2D FETs disclosed herein are liquid-gated, meaning that current through the 2D material channel(s) is modulated or affected by events, occurrences, or interactions within a liquid in contact with the channel(s). For example, an interaction of ions, molecules, or moieties within the liquid, or an interaction between the channel surface and ions, molecules, or moieties within the liquid, may be capable of gating, modulating, or affecting the channel current. The term "2D FET" may be used to refer to such a device in use, with a liquid applied to the surface of the channel, or to the same device before the liquid has been applied. The term "biologically gated transistor" may also be used to refer to a 2D FET that is liquid gated as described above.

The terms "graphene field effect transistor" or "gFET," as used herein, refer to a 2D FET where current between source and drain terminals, through one or more graphene channels, can be modulated by events occurrences, or interactions that affect the conductivity of the graphene channel(s). Although the term "graphene field effect transistor" is sometimes used in industry to refer to entirely solid-state devices where the output current of the graphene channel is modulated via a gate terminal or a body terminal, the 2D FETs disclosed herein are liquid-gated, meaning that current through the graphene channel(s) is modulated or affected by events, occurrences, or interactions within a liquid in contact with the channel(s). For example, an interaction of ions, molecules, or moieties within the liquid, or an interaction between the channel surface and ions, molecules, or moieties within the liquid, may be capable of gating, modulating, or affecting the channel current. The term "graphene field effect transistor" may be used to refer to such a device in use, with a liquid applied to the surface of the channel, or to the same device before the liquid has been applied.

Furthermore, the term "graphene field effect transistor" or "2D FET" may be used without regard to whether current is modulated by an external power source, the interactions of ions, molecules, or moieties within the applied liquid, or a combination of the two. For example, a graphene field effect transistor or 2D FET may be gated by an external voltage applied to the liquid in addition to biochemical interactions occurring in the liquid, but may still be referred to as a "graphene field effect transistor." In various examples of the present disclosure, the term "graphene field effect transistor" or gFET is used to describe one or more examples including working examples of a 2D FET with a graphene channel. The term "biologically gated transistor" may also be used to refer to a graphene field effect transistor that is liquid gated as described above.

However, it may be noted that unless otherwise clear from context such references to gFETs should be understand as also referring to other 2D FETs that can be implemented with channels formed or patterned in 2D materials other than graphene, such as for example molybdenum disulfide, consistent with the present disclosure.

The term "output signal," as used herein, refers to a measurable or detectable electrical signal from an integrated circuit, a 2D FET, such as for example, a gFET, or an array of gFETs or other 2D FETs, or to a result that can be calculated based on the measurable or detectable signal. For example, an output signal may be a voltage at one or more terminals of an integrated circuit, a current at one or more integrated circuit, a capacitance, inductance, or resistance (calculated based on applied and measured voltages and currents), a complex-valued impedance, a complex impedance spectrum, an electrochemical impedance spectrum, a threshold voltage, a transfer curve, a Dirac voltage, a power spectral density, one or more network parameters (such as S-parameters or h-parameters), or the like.

The term "excitation condition," as used herein, refers to a physical, electrical, or chemical condition applied to an integrated circuit, a gFET or other 2D FET, or an array of gFETs or other 2D FETs, or to a sample for measurement by an integrated circuit, a gFET or other 2D FETs, or an array of gFETs or other 2D FETs. Excitation conditions may affect ions, molecules or moieties in the liquid applied to a gFETs or other 2D FETs, which in turn may affect one or more output signals from the 2D FET. For example, excitation conditions may include voltages, currents, frequencies, amplitudes, phases, or waveforms of electrical signals applied to a graphene field effect transistor, one or more temperatures, one or more liquid flow rates, one or more wavelengths of electromagnetic radiation, or the like.

The term "distance," as used herein with reference to a distance from the surface of a channel in a biologically gated transistor, refers to a distance between a point (e.g., in the sample liquid), and the closest point of the channel surface to that point. For example, the distance from the surface of the channel to a point directly above the channel in the sample liquid is the distance between a point on the channel surface to the point in the sample liquid along a line that is normal (perpendicular) to the channel surface.

The term "measurement distance," as used herein, refers to a distance from the surface of a channel in a liquid gated 2D FET, such that at least some aspect or portion of a chemical or biochemical interaction occurring at the measurement distance affects an output signal in a way that is detectable by a measurement apparatus. In other words, output signals from a 2D FET are sensitive to chemical or biochemical events occurring at or within the measurement distance from the surface of a channel. Whether an effect on an output signal is detectable by a measurement apparatus may depend on actual sensitivity of the measurement apparatus, on a noise level for noise in the output signal, the extent to which the output signal is affected by aspects or portion of a chemical or biochemical interaction occurring closer to the channel surface, or the like. Whether an effect on an output signal is detectable by a measurement apparatus may be based on a predetermined threshold for detection or sensitivity, which may be signal to noise ratio, a ratio between effects on the output signal caused by events at a distance from the channel to effects on the output signal caused by events at the channel surface, or the like. In some examples, a measurement distance may depend on excitation conditions, or may be frequency dependent.

The term "electrostatic screening distance" as used herein, refers to a measurement distance for a 2D FET with a liquid gate, (also referred to herein as a biologically gated transistor) for steady state (e.g., constant voltage or direct current) or low-frequency (e.g., less than 10 Hz) excitation conditions and measurements. One or more layers of ions may form near the surface of a channel of a biologically gated transistor when a fluid is applied in contact with the channel surface. For example, a double layer of ions may include a first layer of ions attracted or adsorbed to the channel surface and a second layer of ions attracted to the ions in the first layer. Or, where the channel has been functionalized by depositing one or more thin film layers that include certain molecules or moieties (e.g., proteins, peptides, surfactants, polymers such as polyethylene glycol, or the like) on or above the channel surface, forming an ion-permeable layer with a net charge, then ions from the fluid may diffuse into an ion-permeable layer of immobilized molecules or moieties due to the Gibbs-Donnan effect, forming a Donnan equilibrium region, and creating a measurable Donnan capacitance. In either case, charges near the channel surface may act as a "screen" between the channel and the bulk of the sample fluid. Thus, steady-state, or low-frequency excitation and measurement may result in a measurement controller detecting effects on output signals for only the aspects or portions of a biochemical interaction that occur in or near the double layer, or the Donnan equilibrium region, and the electrostatic screening distance may be based on the thickness (e.g., Debye length) for a double layer and/or a Donnan equilibrium region. The Debye length may be thought of as the scale over which mobile charge carriers (e.g. electrons) screen out electric fields in solutions. In other words, the Debye length is the distance between regions where charge can move freely.

The term "measurement bandwidth" as used herein refers to a band or range of frequencies for which output signals of a 2D FET are measured. For example, where discrete samples of the output signals are measured at a sampling rate, the measurement bandwidth may be a range from 0 Hz to half the sampling rate.

The term "bias" as used herein refers to an electrical signal or waveform applied to an electrode or terminal of a 2D FET, such as a conductive source, a conductive drain, a counter electrode, or another electrode. It should be noted that the counter electrode is configured to apply a biasing voltage to a liquid that serves as a gate in 2D FETs as disclosed herein. However, 2D FET as described herein do not have a metalized gate electrode positioned above or below the channel which is why 2D FETs as disclosed herein are referred to as liquid gated. The term "programmable bias" is used to refer to a bias that is capable of being changed, varied, or modulated by the circuitry that applies the bias. Examples of programmable biases include a constant voltage or current selected by bias circuitry, a square wave, a sine wave, a more complicated waveform such as a sum of sine waves of various amplitudes, frequencies, and phases (possibly also including a zero-frequency or DC offset component), or the like.

The terms "target" or "target substance" as used herein, refers to a chemical or biological substance that is of interest in an assay using an integrated circuit, a 2D FET, or an array of 2D FET. "Direct or indirect target substance signal measurement" is used to refer to measuring one or more signals (e.g., output signals from a 2D FET array) that pertain to a target. Measurement and analysis of such signals may determine a parameter such as the presence, absence, or concentration of the target substance in a liquid. Examples of targets include ions, small molecules, compounds, proteins, bacteria, viruses, cells, and the like.

The term "synthetic biopolymer specific binding agent" as used herein refers to a molecule capable of forming a three-dimensional (3D) structure synthesized for specific binding to a selected target. Some synthetic biopolymer specific binding agents, such as aptamers, include single-stranded nucleic acid molecules. Further examples of synthetic biopolymer specific binding agents include other types of molecules such as peptides, saccharides, nucleic acid analogues, or the like. Different synthetic biopolymer specific binding agents may bind to different targets. For example, a variety of nucleic acid sequences may form different three-dimensional structures that bind to a variety of different targets.

Introduction and Disclosed Principles. In the following introduction, various principles developed and tested by the authors of the present disclosure are introduced. In the description of the individual figures, it should be noted that the principles disclosed herein can be generally applicable to the individual examples described with respect to the Figures and that the principles disclosed in this sections and the structures and processes disclosed with respect to each of the individual examples may be implemented in a wide range of combinations with aspects of other individual examples.

Different types of synthetic biopolymer specific binding agents may have different molecular weights and different sizes. For comparison, antibodies which are useful for specific binding to certain analytes typically have a molecular weight of about 150-180 kDa and a size of about 15 nanometers. Certain synthetic biopolymer specific binding agents such as aptamers or peptides may be much smaller. The molecular weight of aptamers is typically in a range of about 6-30 kDa with a size of about 2 nanometers. Some synthetic peptides selected for specific binding may have a molecular weight of about 2-18 kDa. Various synthetic saccharides selected for specific binding may have sizes from tens of nanometers, hundreds of nanometers, or larger. Desorption based methods and systems can be implemented with various sizes of synthetic biopolymer binding agents, the binding agents, sometimes referred to as detection or recognition molecules, may be selected for desorption from the 2D channel materials in response to biochemical interactions with particular analytes in a test sample liquid.

Various biochemical methods exist for detecting target substances based on binding of aptamers to targets. For example, fluorophores may be coupled to aptamers in such a way that a change in the 3D configuration of a synthetic biopolymer specific binding agent as it binds to a target quench or unquenches the fluorophore. However, in systems existing prior to the development of the subject matter of the present disclosure, detection of target substances using aptamers or other synthetic biopolymer specific binding agent with 2D FETs with improved target detection sensitivity such as disclosed herein have not been available.

For example, although a 2D FET, such as a gFET, may be highly sensitive to events within a double layer of ions that forms where a reference liquid or a sample liquid contacts the graphene channel, binding of an antibody, a larger saccharide, or even a much smaller aptamer to a target may occur outside the double layer. For example, certain interactions between aptamers (which may fold and adsorb at various points to a 2D channel such as a graphene channel) may interfere with binding of aptamers to targets. For example, oligonucleotide aptamers may include pi-bonded carbons that readily form pi-pi bonds with graphene, and the resulting bond between an aptamer and the channel of a 2D FET may prevent the aptamer from binding to its target.

By contrast, one or more examples of integrated circuits disclosed herein include 2D FETs with synthetic biopolymer specific binding agents such as peptides, aptamers, or saccharides adsorbed to graphene channels. In some cases, the synthetic biopolymer specific binding agents are selected to desorb from the channel in the presence of a target substance, and to bind to the target. Methods of selecting synthetic biopolymer specific binding agents that will desorb from 2D material such as graphene in response to biochemical interactions with a target are also disclosed herein.

Moreover, the binding of the synthetic biopolymer specific binding agents to the target may occur at a distance from the graphene or other 2D material greater than the double layer screening distance, limiting sensitivity in a conventional measurement approach. Accordingly, for direct target signal sensing, higher frequency modulation of excitation conditions as disclosed herein may be used to enable the disclosed systems, ICs, and methods to perform direct target signal sensing by extending the measurement distance.

For indirect target signal measurements, desorption of the synthetic biopolymer specific binding agents from the graphene or other 2D material directly affects the double layer of ions at the surface of the graphene or other 2D material within the screening distance, thus allowing the high sensitivity of graphene or other 2D material to surface interactions to be used to detect the target.

In certain examples, the synthetic biopolymer specific binding agents are selected to remain attached to the channel when bound to the target substance for what is referred to herein as direct target signal measurement. In such examples, the binding of the synthetic biopolymer specific binding agents to the target may occur at a distance from the graphene or other 2D material greater than the double layer screening distance, again limiting sensitivity in a conventional measurement approach. For direct target signal measurement, a presence and/or properties of the bound target to the synthetic biopolymer specific binding agents can be measured by using a combination of improved data processing and/or a high frequency excitation voltage to create a measurement distance which is greater than the conventional double layer screening distance.

In various examples, the binding between a target and a synthetic biopolymer specific binding agent is an affinity-based or avidity-based interaction. For example, multiple synthetic biopolymer specific binding agents can bind to a single target, similar to an antibody. This can improve sensitivity by amplifying the sensor signal for a single target. The synthetic biopolymer specific binding agent can also be engineered so that after desorbing from the graphene or other 2D material, it will also desorb from the target.

In certain examples, the selection and/or configuration of synthetic biopolymer specific binding agents to enable useful desorption from 2D materials and/or from target substance, allows the target to bind many synthetic biopolymer specific binding agents in succession, greatly amplifying the sensor signal for a single target. In certain examples, the synthetic biopolymer specific binding agent has been engineered to be catalytically removed from the surface by the target, even if the target is not an enzyme. This improved sensitivity enhances the ability to measure analytes present in low concentrations.

For example, if the target were a cancer cell with multiple surface sites targeted by the synthetic biopolymer specific binding agent, the cancer cell could interact with multiple synthetic biopolymers simultaneously or in quick succession. That would trigger binding to the target followed by release from the surface. Once released from the surface, a second biochemical process or interaction would lead to release of the synthetic biopolymer from the cancer cell. The cancer cell could then interact with new synthetic biopolymers on the surface, leading to an increase in the measured sensor response over time.

In this example, if the synthetic polymer is instead engineered to stay on the sensor surface after binding to the target, the combination of multiple interactions with the cancer cell will lead to a much stronger overall binding between the target cell and the surface, more effectively immobilizing the cell to the surface and inducing a clear output signal in the sensor. For example, a synthetic biopolymer specific binding agent can be designed to bind to a marker on an extracellular vesicle such as an exosome. This marker may be in the sample as part of the extracellular vesicle, or it may be a free target marker independent of the extracellular vesicle. By evaluating the thickness and porosity of the charges in the layer within a measurement distance of surface of the sensor, binding by the free target marker can be differentiated from binding by an extracellular vesicle containing the target marker.

It may be noted that extracellular vesicles are just one example of biological entity that may be distinguished using the apparatuses and methods described herein. Highly sensitive measurements of other biological entities such as cells, viruses, bodily liquids, each with respective target substances or biomarkers may be performed using synthetic biopolymer specific binding agents (SBSBAs) that are chosen based on absorptivity type where type A SBSBAs are selected to remain adsorbed to the 2D channel material in response to biochemical interactions with a target substance (e.g., binding activity) in a sample liquid (for what is referred to herein as direct target signal measurement) and type D SBSBAs are elected to desorb from the 2D channel materials in response to biochemical interactions (e.g., specific binding) with the target substance in the sample liquid for what is referred to herein as indirect target signal measurement (e.g., because the desorbed SBSBAs themselves do not necessarily have to located within a measurement distance of the 2D FET channel). In some examples, selecting the synthetic biopolymer specific binding agent based on absorptivity type is facilitated by performing a selection cycle.

In various examples, integrated circuit connections in a metallization layer of the integrate circuit chips disclosed herein enable on-chip measurements comprising measurement vectors for the one or more selected instances of the 2D FETs of the FET array to be made in connection with the liquid mediated deposition of one or more thin film layers of synthetic biopolymer specific binding agents. In some examples, the measurement vectors include one or more transfer curve parameters selected from maximum transconductance magnitudes for p-type and/or n-type branches of a transfer curve, a charge neutrality point voltage of the transfer curve, resistance at the charge neutrality point, curvature of the transfer curve in a charge neutrality point region, curvature of the p-type and/or n-type branches of the transfer curve apart from the region of the charge neutrality point.

Accordingly, by plotting the output current versus measured liquid gate voltage, transfer curves are produced from which measurement vector of responses that may include orthogonal or analytically useful values such as the gate voltage Vg at the charge neutrality point ($V_{CNP}$) also referred to as the Dirac point voltage $V_{Dirac}$, the resistance at the charge neutrality point $R_{CNP}$ or $R_{Dirac}$, the maximum transconductance magnitudes for both n and p type branches of the transfer curve, and the curvature of the transfer curve near the charge neutrality as well as far from the charge neutrality point. A set of measurement vector values such as these can be used to generally describes the complete shape of the transfer curve.

Using a physical model of the device, relevant parameters such as the mobility, gate capacitance, and defect density of the graphene biosensor may be extracted from the transfer curve values. A physical model is an expression for the current related to the applied voltages and physical parameters. An example is $$I = \frac{\mu W V_{DS}}{L} \sqrt{C[Vg]^2 (V_G - V_{CNP})^2 + 4\frac{n_0^2}{q^2}}.$$

This model gives the current (I) for the transistor width (W), length (L), capacitance (C[Vg]), mobility (μ), effective defect density (n0), applied drain-source voltage (VDS), applied gate voltage (VG), charge neutrality voltage ($V_{CNP}$), and the charge constant (q). Terms such as the mobility, capacitance, and effective defect density can vary significantly throughout the transfer curve in more complex variations of this model.

In particular, the physical model includes a capacitance that is a function of gate voltage, denoted by "C[Vg]". In a practical model, this capacitance can take the form of $$C[Vg]^2 = (C_{CNP} + C_{gate}(V_G - V_{CNP})^2) * (1 + \text{skew}_{VG}),$$

where $C_{CNP}$ is a capacitance contribution at the charge neutrality point, $C_{gate}$ is a term that adds to the capacitance with dependence on the gate voltage difference from the charge neutrality point, and $\text{skew}_{vg}$ is a term that adjusts the overall capacitance depending on whether the gate voltage is higher or lower than the charge neutrality point. For a model such as this, terms such as the capacitance, mobility, and effective defect density can be calculated for each transfer curve measured by performing a fit of the current-gate voltage transfer curve. Moreover, transfer curves may be measured continuously throughout the process.

The physical model described above can be used in a fit of the transfer curve data. This curve fit approach can be a conventional "least squares" fitting or similar approach. A machine learning algorithm can be used to create a more efficient fitting algorithm and output the terms of the model more quickly. In addition, the fitting can be made more efficient by dividing the transfer curve by the minimum current in the transfer curve. This removes the modeled dependency of the current on the square root. In this way, the number of variables to fit is drastically reduced and the scaled current is $$I_{scaled} = \frac{2q}{n_0}\sqrt{C[Vg]^2(V_G - V_{CNP})^2 + 4\frac{n_0^2}{q^2}}.$$

In certain examples, the thickness, porosity, and/or other thin film characteristics of the synthetic biopolymer specific binding agent are determined using one or more methods or steps or combinations of steps thereof as disclosed herein, such as for example extraction of the capacitance term from the models described above. After extracting the capacitance at the charge neutrality point, the system can be considered a parallel plate capacitor with one side the graphene channel and the other the bulk liquid gate. In between these two conductive elements is a dielectric, which is a combination of the electrostatic double-layer, the capture chemistry (in this case, the synthetic biology specific binding agent) and any bound analytes.

Changes in thickness of the thin film SBSBA layer in the liquid can be monitored over time using the equation $$\text{thickness} = \frac{\text{constant}}{\text{capacitance}}.$$

In this equation, the capacitance is the extracted value of the capacitance at the charge neutrality point from the model, while "constant" is a combination of the area of the sensor channel and the dielectric constant of the material in between the channel and the liquid. It is useful to use this constant throughout the sensing measurement.

In various examples, porosity of the thin film layer of SBSBAs within the sample liquid can be evaluated by looking at how the capacitance changes with gate voltage. A modeled capacitance which varies strongly with gate voltage indicates a more porous surface than a capacitance that does not vary with the gate voltage.

With a clean 2D channel surface, e.g., pristine graphene, prior to adsorption of the SBSBA thin film layer on the 2D channel, calibration thickness and porosity measurements of a double layer (also referred to as an electric double layer, or a Debye layer) in the liquid over the channel area may be made. Double layer refers to the multiple layers of charge naturally formed above any solid surface by salt ions in a water based liquid. The first layer, the surface charge (either positive or negative), is composed of ions adsorbed onto the 2D channel surface. The second layer is composed of ions attracted to the surface charge (via the coulombic attraction), electrically screening the first layer. This process can be described by complex, but well known surface science models such as the Stern model and the Grahame model. Models from the last few decades, notably the Conway model, describe the connection between electrical capacitance and the electric double layer.

Moreover, with the SBSBA thin film layer adsorbed but before a sample analyte measurement is made, for both thickness and porosity, it may be useful to take a calibration measurement in a known buffer. For such a calibration measurement, porosity will typically be maximized, while the layer thickness measured of the thin film layer of SBSBAs adsorbed to the 2D channel surface will typically be approximately the double layer thickness. These calibration measurements may be facilitated when made using a dilute buffer.

Measurement of the thickness and porosity is used to quantify and check the assembly of the synthetic biopolymer specific binding agent to the surface as well as to track the state and amount of the synthetic biopolymer specific binding agent on the surface during measurement. In the case of a triggered release of synthetic biopolymer specific binding agent, the measured thickness of synthetic biopolymer specific binding agent will decrease while the porosity will increase. In the case of a synthetic biopolymer specific binding agent designed to adhere to the surface after binding the target, measurement of the thickness, porosity and related electrical signals such as capacitance can be used to differentiate between similar biochemical interactions. As explained above, the foregoing principles may be applicable in part, in whole, or in various combinations with individual examples described below with respect to the Figures.

An alternative way to measure the thickness without directly measuring the charge neutrality point is to evaluate the slope, called the transconductance, of the transfer curve between the channel current and gate voltage in a gate voltage region far from the Charge Neutrality Point. In this case, a general idea of the gate voltage range of the Charge Neutrality Point is needed, but precise measurement is not required. The second condition that must be satisfied for this technique to work is that the slope of the curve must be linear, or the curvature off the transfer curve must be corrected for. Curvature in the transfer curve is pronounced near the Charge Neutrality Point, but is also present where various effects lead to effective current saturation. In the case of measurements in liquids, the "various effects" referred to include the gate voltage dependence of the quantum capacitance of the graphene and the gate voltage driven changes to ions and molecules attracted to the graphene channel. In the case that the transconductance (gm) is used to measure the thickness, the following equation can be used:

$$\text{thickness}_2 = \text{thickness}_1 \frac{g_{m1}}{g_{m2}}$$

This is the preferred method of measuring the thickness, as the charge based effects of material adsorption can be more easily separated from the thickness measurement. Just as with the direct current measurement, fitting the derivative of the entire transfer curve or calculating the calculated thickness throughout the whole transfer curve will give a more complete result.

These two approaches can be combined to measure the effective thickness of the material added to the surface in addition to the porosity of the material. This measurement requires performing a change in the salinity of the liquid on top of the sensor. The purpose of this salinity change is to alter the double layer thickness on the surface of the graphene channel. In addition, any ions that are incorporated into the applied material on the graphene channel will be exchanged with the bulk liquid. These two processes will have different speeds. The liquid exchange will alter the double layer thickness in less than one second, while it may take several seconds for the ions to exchange.

Performing the comparison of transfer curves quickly will focus on measuring the large scale porosity of the layer, those pores which are large enough to facilitate physical liquid exchange and for which diffusion is less important. Performing the comparison at a later stage will focus on the overall porosity of the layer, and evaluate the capability of the layer to prevent or suppress diffusion of ions. In one example, a 10 nm thick layer is measured in a full strength buffer such as PBS as the "10 nm layer to test". Then, the full strength PBS is replaced with second buffer of PBS diluted by a factor of two with water. This second buffer is the "low strength" buffer, and could even be water or another non-buffered liquid. The resulting shift in the transfer curve is used to evaluate the porosity of the layer.

In some examples, a calibration measurement is performed by applying one or more solutions with known salinities to determine a known double layer thickness and calibrating responses of selected 2D FETs used to perform the calibration measurement to the known double layer thicknesses determined by applying the one or more solutions.

In certain examples, a relative porosity of the thin film layer is determinable by comparing a first deposition measurement vector generated using a full strength buffer with a second deposition measurement vector generated using a diluted buffer.

To measure the relative porosity of a layer, the entire transfer curve should be measured in the full strength buffer and in the low strength buffer. The low strength buffer may be less effective at maintaining a pH on the surface of the chip and so a shift in the Charge Neutrality Point may happen. In addition, the low strength buffer may alter the overall resistance of the transistor by altering the density of charges adjacent to the graphene channel. Both of these effects will be suppressed by a layer with low porosity. This describes a qualitative evaluation of the porosity of the layer. A quantitative approach requires performing multiple measurements over time and combining the data with a more complex model of diffusion, or creating a calibration curve of responses using layers with known porosity to compare against. In most cases, a practical measurement of relative porosity is sufficient.

In an extreme case in which there is no ion exchange between the bulk buffers and the material adjacent to the graphene channel, the only effect of adding a dilute buffer will be an apparent thickening of the layer on the surface of the graphene. This apparent increase in the thickness of the layer is due to an increase in the double layer thickness, which is incorporated into the overall thickness measurement. As the change in salinity between the buffers is known and the double layer thickness scales with the square root of the salinity of the buffer, this alteration in double layer thickness can be calculated and corrected for.

In the case the salinity of the buffers is not controlled or known as experimental inputs, a split gate structure can be used to measure the salinity. The split gate structure refers to the use of a driving gate electrode, which is also referred to herein as a counter electrode, and a measurement electrode, which is also referred to herein as the reference electrode. The current input required to the counter electrode to control the voltage scales with the salinity of the buffer. Along with the voltages applied, this can be used to calculate the conductivity (inverse resistance) of the liquid. The precise measurements depend strongly on the geometry of the electrodes used as well as the temperature.

FIG. 1 is a schematic block diagram illustrating one example of a system 100 for direct or indirect target substance signal measurement. The system 100, in the depicted example, includes one or more integrated circuits 101, a chip reader 102, a sample prep apparatus 112, a computing device 114, a remote data repository 125, and a data network 121.

An integrated circuit 101, in the depicted example, includes one or more 2D FETs 106 (e.g., 106a, 106b, 106c, 106d) which are described in further detail below. In some examples, an integrated circuit 101 may include an array of multiple 2D FETs 106 (e.g., gFETs). The integrated circuits 101 disclosed herein may be built using traditional electronics manufacturing techniques such as, for example, layered processing (e.g., as is sometimes done using wafers), electronics packaging, and electronics assembly techniques. Layered processing techniques (such as for example wafer processing) may include without limitation layer deposition, removal, patterning, and modification of layer electrical properties. The disclosed structures and methods enable more reliable performance, integration of electrical modules, and lower costs.

Layer processing techniques do not require the use of a "wafer" but can be performed by one skilled in the art on substrates such as plastics and glass. Electronics packaging techniques may include without limitation, the addition of protective layers to a transistor channel, the separation of an array of devices via dicing or cutting into individual dies, connecting the dies to interconnects to aid in electronics assembly, encapsulation of portions of the combined dies and interconnects, testing of the manufactured module, and the removal of protective layers. Electronics assembly techniques may include without limitation testing of the manufactured module, and the removal of protective layers remaining from wafer processing and electronics packaging, integration of the packaged die with a printed circuit board or flexible printed circuit board, and integration of the packaged die with mechanical cases and fluidics systems. Electronics packaging and electronics assembly as disclosed with respect to the apparatuses, systems, and methods disclose herein enables automated manufacturing and assembly processes, which in turn facilitates higher volume manufacturing with improved reliability. The disclosed systems using integrated circuits facilitate direct or indirect target substance signal measurement for a wide variety of target substances, leading to high availability of assays specific to individual target substances.

In some examples of an integrated circuit 101, a 2D FET 106 in the integrated circuit 101 may include a graphene channel disposed on a substrate. The graphene channel may couple a drain terminal to a source terminal, so that events or interactions that affect the conductivity of the channel affect an output signal such as a drain-to-source current. Additionally, in the depicted example, 2D FETs 106 include synthetic biopolymer specific binding agents such as for examples, peptides, aptamers, and/or saccharides adsorbed to the 2D transistor channel. The synthetic biopolymer specific binding agents may be selected to desorb from the top surface in response to biochemical interactions with a target substance in a liquid applied to the 2D transistor channel.

In one example of an integrated circuit 101, all the 2D FETs 106 in an array may include synthetic biopolymer specific binding agents adsorbed to channels. In another example of an integrated circuit 101, at least some of the 2D FETs such as 2D FETs 106 in an array may include synthetic biopolymer specific binding agents adsorbed to channels, and other 2D FETs 106 in an array may be heterogeneously configured, either without synthetic biopolymer specific binding agents, or with different synthetic biopolymer specific binding agents, to perform different measurements, tests, or assays of a liquid applied to the integrated circuit.

One or more layers of ions may form near the graphene channel of a 2D FET 106 when a liquid is applied in contact with the graphene channel. For ease of illustration and simplicity, this is often referred to and drawn as a "double layer" but is understood by one skilled in the art to be a complex arrangement of ions that is comprised of many layers and is specific to the chemical and electrical state of the sensor. If the channel surface has been functionalized by immobilizing certain molecules or moieties (e.g., proteins, peptides, surfactants, polymers such as polyethylene glycol, or the like) to the channel, forming an ion-permeable layer with a net charge, then ions from the liquid may diffuse into the ion-permeable layer of immobilized molecules or moieties due to the Gibbs-Donnan effect, forming a Donnan equilibrium region. In either case, immobilization of molecules, moieties, and/or ions near the channel surface (e.g., in a double layer or a Donnan equilibrium region) may result in a change in capacitance and electric field between the channel of a 2D FET 106 and the bulk of the applied liquid.

For a 2D FET 106, reference electrodes and/or counter electrodes may be provided to measure or alter the electrochemical potential in the applied liquid. Desorption of synthetic biopolymer specific binding agents from the graphene may affect the layer formed by charges near the channel surface, thus affecting a capacitance and electric field between the graphene and the applied liquid, and related output signals such as an electrochemical impedance spectrum.

When excitation conditions are applied to an integrated circuit 101, output signals such as a channel current for a 2D FET 106 or a capacitance may depend on charges within this (effective) dielectric layer, or more generally within a measurement distance of the channel surface. Charges within a measurement distance of the channel surface, which affect the output signals of the integrated circuit 101, may be positively or negatively charged ions or moieties, or may be neutrally charged molecules or moieties (e.g., including an equal number of positive and negative charges) that displace other charges. For example, if synthetic biopolymer specific binding agents adsorbed to 2D FET channel surfaces are nucleic acid molecules, such as aptamers, they may be negatively charged within the applied liquid, and desorption of aptamers from the channel surfaces may affect the arrangement of charges near the channel surface, thus affecting an output signal for a 2D FET 106 and/or an integrated circuit 101.

In some examples, an integrated circuit 101 may include a plurality of transistors where at least one of the transistors is a 2D FET 106. In some examples, an integrated circuit 101 may include one or more additional sensors that do not use field-effect sensing, alongside 2D FETs such as gFETs. For example, various types of sensors may be included that use terahertz spectroscopy, surface-enhanced spectroscopy, quartz crystal microbalance, grating-coupled interferometry, and so forth. In some examples, an integrated circuit 101 may include or be coupled to further components such as a flow cell or liquid propulsion mechanism.

In the depicted example, the chip reader 102 includes circuitry for communicating with (e.g., sending electrical and/or electromagnetic signals to or receiving electrical and/or electromagnetic signals from) components of the integrated circuit 101. For example, an integrated circuit 101 may be mounted to a printed circuit board (PCB) with electrical contacts at one edge. As another example, an integrated circuit may be formed with a PCB as a substrate. A socket in the chip reader 102 may include matching contacts, so that the PCB contacts can be plugged into or removed from the chip reader 102. Various other or further types of connectors may be used to provide a detachable coupling between an integrated circuit 101 and a chip reader 102.

In a further example, the chip reader 102 may include circuitry for communicating via the data network 121. For example, the chip reader 102 may communicate information about measurements performed using the integrated circuit 101 to the computing device 114 and/or to a remote data repository 125, over the data network. The data network 121, in various examples, may be the Internet, or may be another network such as a wide area network, metropolitan area network, local area network, virtual private network, or the like. In certain examples, the chip reader 102 may communicate information in another way, in addition to or in place of communicating over a data network 121. For example, the chip reader 102 may display or print information, save information to a removable data storage device, or the like.

In the depicted example, a measurement controller 122 is implemented by the integrated circuit 101 and/or the chip reader 102. A measurement controller 122, in various examples, may include excitation circuitry to apply excitation conditions to an integrated circuit 101, including a 2D FET 106. The integrated circuit 101 may produce various output signals based on the excitation conditions. For example, where the excitation conditions include a drain-to-source voltage and a liquid gate voltage for a 2D FET 106, output signals may include a drain-to-source current, Dirac point voltage, or other types of signals that are discussed in further detail herein. Output signals from the integrated circuit 101 such as electrical currents, voltages, capacitances, impedances, or the like may be affected by desorption of synthetic biopolymer specific binding agents from the channel surface of a 2D FET 106.

An output signal may be described herein as "affected" by desorption of synthetic biopolymer specific binding agents from graphene if the signal produced in response to the synthetic biopolymer specific binding agents having desorbed from the 2D materials (e.g., graphene) differs from an output signal that would have occurred if the synthetic biopolymer specific binding agents had remained adsorbed to the graphene.

Thus, a measurement controller 122 may determine whether an output signal was affected by desorption of synthetic biopolymer specific binding agents, or the extent to which an output signal was affected, by monitoring changes in output signals as synthetic biopolymer specific binding agents desorb from graphene and bind to targets over time, or by comparing output signals for other 2D FETs 106 of the same integrated circuit 101 that either do not a include synthetic biopolymer specific binding agent (e.g. an aptamer, a peptide, a saccharide) specific to the target of interest, to which a control liquid has been applied that does not contain the target substance.

The measurement controller 122 may include measurement circuitry to perform one or more measurements of at least one of the output signals that are affected by desorption of the synthetic biopolymer specific binding agents. Various examples of a measurement controller 122 are described in further detail below.

In some examples, an integrated circuit 101 or a package for an integrated circuit 101 may include the measurement controller 122. For example, excitation circuitry and/or measurement circuitry may be provided on the same integrated circuit 101 as a 2D FET 106, or on the same package, on the same printed circuit board, or the like. In one or more other examples, the chip reader 102 may include the measurement controller 122. For example, excitation circuitry and/or measurement circuitry may be provided in a chip reader 102 so as to be reusable with multiple integrated circuits 101.

In one or more other examples, an integrated circuit 101 and a chip reader 102 may both include portions of the measurement controller 122. For example, the integrated circuit 101 may include portions of the excitation circuitry, such as a resistive heater for temperature control of the 2D FET 106, and the chip reader 102 may include other portions of the excitation circuitry such as a voltage or current source. In various examples, excitation circuitry, measurement circuitry and/or other components of a measurement controller 122 may be disposed between an integrated circuit 101 and a chip reader 102 in various other or further ways.

Additionally, although the system 100 in the depicted example includes an integrated circuit 101 that may be coupled to or removed from a chip reader 102, the functions and/or components of an integrated circuit 101 and a chip reader 102 may be integrated into a single system in one or more examples. Furthermore, in some examples, a system may include multiple readers or reader modules working in tandem rather than a single chip reader 102. For example, excitation circuitry and/or measurement circuitry for a measurement controller 122 may include lab bench hardware such as source measure units, function generators, bias tees, chemical impedance analyzers, lock-in amplifiers, data acquisition devices, or the like, which may be coupled to or implemented in an integrated circuit 101.

The sample prep apparatus 112, in the depicted example, is operable to automatically or semi-automatically prepare a liquid 120. An assay using an integrated circuit 101 may be used to determine a parameter relating to presence of a target substance, such as the presence, absence, or concentration of the target substance in a liquid applied to the integrated circuit 101. Thus, preparation of the liquid 120 may include preparing a solution in which the target is present, or a solution in which the target is not present. In some examples, a sample prep apparatus 112 may include automated dispensing equipment such as a dispensing robot and/or a fluidic system.

In some examples, a sample prep apparatus 112 may include its own controller and user interface for setting sample prep parameters such as incubation time and temperature for the liquid 120. In various examples, a sample prep apparatus 112 may be controlled via the data network 121. For example, the computing device 114 or the measurement controller 122 may control the sample prep apparatus 112.

In one or more examples, a system 100 may omit a sample prep apparatus 112, and a liquid 120 may be manually prepared. In some examples, preparing a liquid 120 may include obtaining or preparing a sample of a liquid in which the target (or the absence of the target) may be detected. In various examples, a liquid 120 may be derived from a biological source. For example, a liquid may be, or may include components 111 obtained from, a biological sample such as blood, urine, saliva, homogenized tissue, bile, milk, cerebrospinal liquid, or other bodily liquids, and so forth. In various examples, a liquid 120 once obtained may be applied directly to the integrated circuit 101. For example, in certain examples, the integrated circuit 101 may be used to capture and analyze target substances in blood, and the blood may be applied to the integrated circuit 101 as the liquid 120. In certain examples, further sample prep steps to prepare a liquid 120 may include the addition of reagents, concentration or dilution, heating or cooling, centrifuging, or the like. Various other or further preparation techniques may be used to prepare a liquid 120 for use with a measurement controller 122.

The liquid 120, in various examples, may include a target substance, and may include one or more substances other than the target. In FIG. 1 and FIGS. 8-10, a target substance 113 is represented as a circle with a wedge removed, and non-target substances 109 are represented as squares and circles.

The computing device 114, in the depicted example, implements an analysis module 133. In various examples, a computing device 114 may be a laptop computer, a desktop computer, a smartphone, a handheld computing device, a tablet computing device, a virtual computer, an embedded computing device integrated into an instrument, or the like. In further examples, a computing device 114 may communicate with the measurement controller 122 via the data network 121.

The analysis module 133, in certain examples, is operable to determine a parameter relating to presence of the target substance in the liquid 120, based on calibration and detection measurements taken by the measurement controller 122 as described below. In various examples, an analysis module 133 may determine various parameters relating to presence of the target substance, such as an indication of whether or not the target substance is present in the liquid 120, a concentration of the target substance 113, another parameter corresponding to or related to the concentration, or the like.

In the depicted example, the analysis module 133 is separate from the measurement controller 122, and is implemented by a computing device 114 separate from the measurement controller 122. In one or more examples, the analysis module 133 may be partially or fully integrated with the measurement controller 122. For example, the measurement controller 122 may include special-purpose logic hardware and/or a processor executing code stored in memory to implement all or part of the analysis module 133. In some examples, the analysis module 133 may be implemented as an embedded processor system or other integrated circuits that form part of an integrated circuit 101 and/or part of a chip reader 102. In certain examples, where an analysis module 133 is integrated with the measurement controller 122, a system 100 may omit a separate computing device 114.

The remote data repository 125, in various examples, may be a device or set of devices remote from the measurement controller 122 and capable of storing data. For example, the remote data repository 125 may be, or may include, a hard disk drive, a solid-state drive, a drive array, or the like. In some examples, the remote data repository 125 may be a data storage device within the computing device 114. In certain examples, a remote data repository 125 may include network attached storage, a storage area network, or the like.

In various examples, the measurement controller 122 (e.g., an integrated circuit 101 and/or a chip reader 102) may include communication circuitry that transmits measurement information to the remote data repository 125. Measurement information may be measurements from integrated circuits 101, or information about the measurements, such as calculated quantities based on the raw measurements.

The analysis module 133 may communicate with the remote data repository 125 to determine one or more parameters relating to presence of the target substance 113, based on the information stored by the remote data repository 125. In various examples, the analysis module 133 may store analysis results to the remote data repository 125. In one or more examples, the analysis module 133 may receive measurement information from the measurement controller 122 directly or over the data network 121, and a remote data repository 125 may be omitted (e.g., in favor of local data storage).

Figure 2:
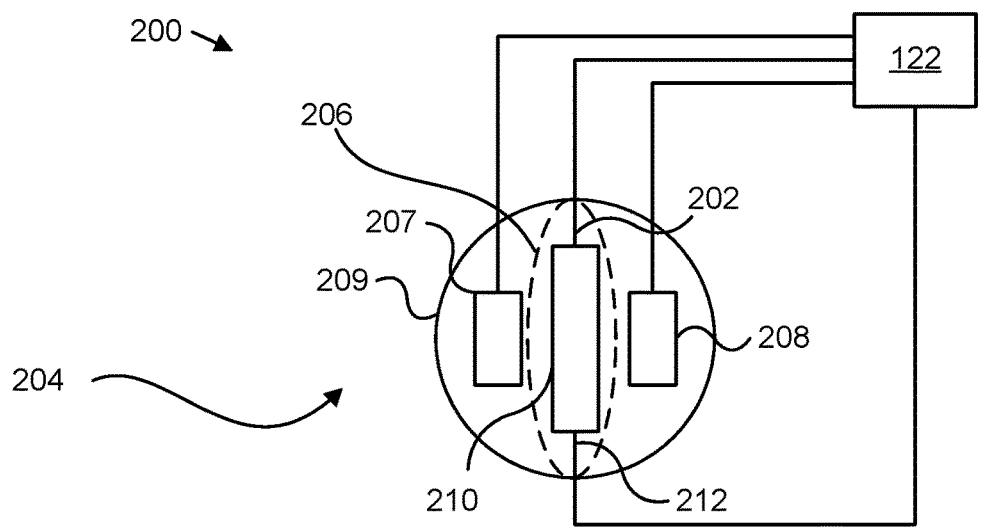
FIG. 2 is a schematic block diagram illustrating an apparatus for direct or indirect target substance signal measurement, including a portion of an integrated circuit with a 2D FET, according to one or more examples of the present disclosure.

FIG. 2 is a schematic block diagram illustrating an apparatus for direct or indirect target substance signal measurement, including a portion of an integrated circuit with a graphene field effect transistor, according to one or more examples of the present disclosure.

As depicted in a top view, the apparatus 200 for direct or indirect target substance signal measurement includes an integrated circuit. Although an integrated circuit includes multiple components such as an array of transistors, a portion 204 of the integrated circuit is depicted, including one 2D FET 206. The depicted portion 204 of an integrated circuit is coupled (directly or via other components of the integrated circuit) to a measurement controller 122. The 2D FET 206 and the measurement controller 122 in the depicted example may, in various examples, be substantially similar to the 2D FET 106 and measurement controller 122 described above with reference to the FIG. 1, and are described further below.

The 2D FET 206, in the depicted example, includes a source 212, a drain 202, and a channel 210. The depicted portion 204 of an integrated circuit includes a reference electrode 208, a counter electrode 207, and a sensor region 209, which are described below. In general, in various examples, a 2D FET 206 may include at least one 2D channel 210 capable of conducting an electrical current between the source 212 and the drain 202.

In an insulated-gate field-effect transistor, current between the source 212 and the drain 202 depends not only not only on a voltage difference between the source 212 and the drain 202 but on certain conditions that affect the output current of the channel 210. However, an insulated-gate field-effect transistor is a solid-state device where a gate electrode is separated from the channel by a thin gate dielectric layer, so that the channel conductivity is modulated by the gate-to-body (or gate-to-source) voltage.

By contrast, in various examples of the present disclosure, channel output signals such as drain-to-source current relative to liquid gate voltage for a 2D FET 206 (e.g., gFETs) may be modulated, gated, or affected by liquid-state events. In particular, a liquid may be applied to the 2D FETs 206 in contact with the transistor channel 210, so that the channel output current depends on (or is gated or modulated by) a state of ions, molecules, or moieties within the liquid.

Figure 7:
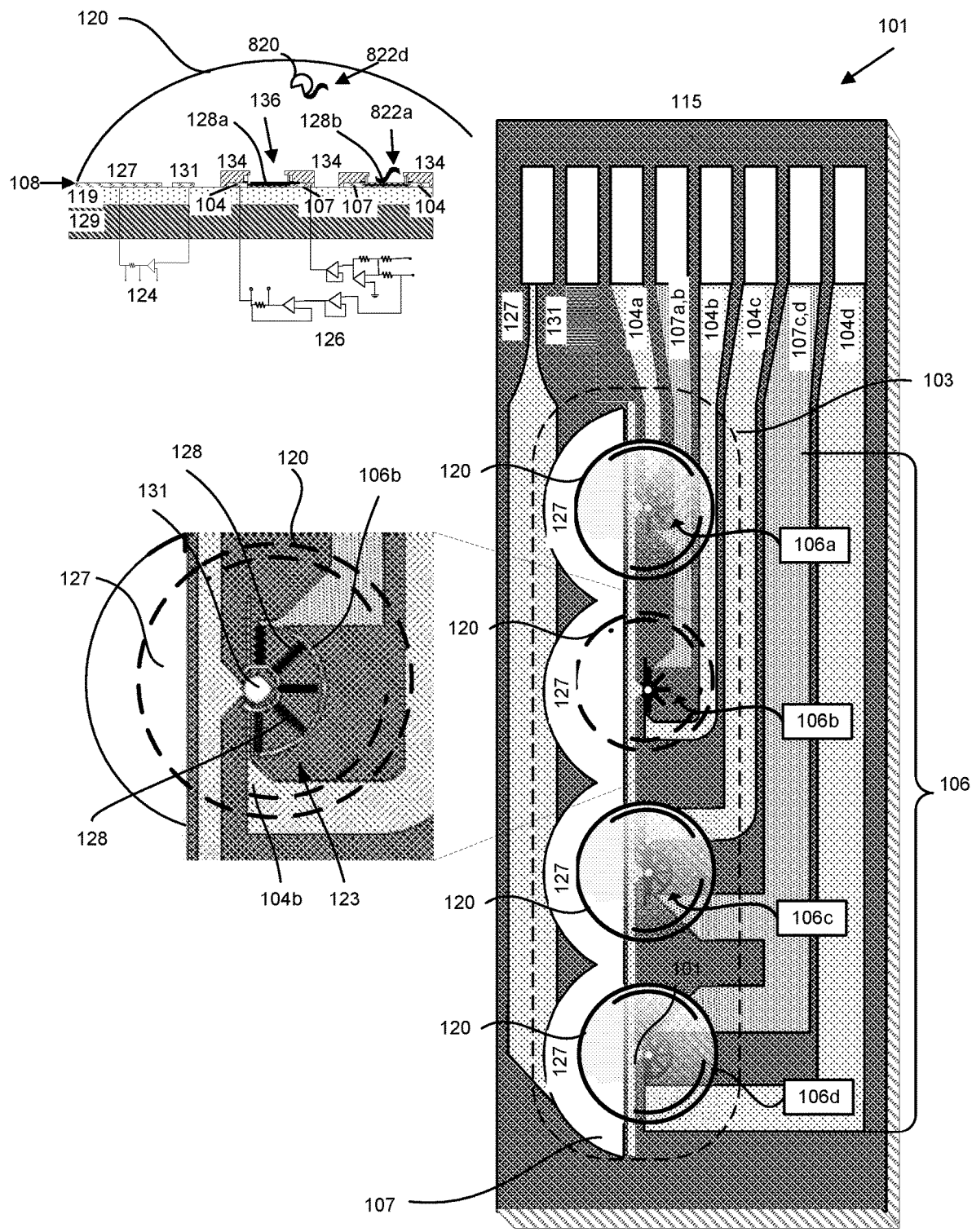
FIG. 7 is a top view with detailed top view and side view insets of an integrated circuit with 2D FETs and on-chip deposition of a thin film layer of synthetic biopolymer specific bind agents, according to one or more examples of the present disclosure.

In various examples, the source 212, the drain 202, a channel 210, a reference electrode 208, and a counter electrode 207 may be formed on a substrate (not shown), such as an oxide or other dielectric layer of a silicon wafer, chip, or flexible circuit. Furthermore, it may be noted that certain components of the integrated circuit and/or 2D FET 206 may be formed to be in contact with a liquid. For example, upper surfaces of the channel 210, the reference electrode 208 and the counter electrode 207 may be exposed or bare for direct interaction with the liquid. Other components may be covered or electrically insulated from the liquid. For example, the source 212 and drain 202 may be covered (or substantially covered) by a ceramic coating layer 134 (as depicted in FIG. 7) such as silicon dioxide, silicon nitride, polyimide, or another dielectric, so that current substantially flows between the source 212 and drain 202 through the channel 210, rather than through a short circuit or an alternative or unintended current path.

Where the source 212 is coupled to a first end of the channel 210 and the drain 202 is coupled to a second end of the channel 210, a ceramic coating that acts as an insulating layer may also cover a portion of the first end of the 2D transistor channel, and a portion of the second end of the 2D transistor channel, so that the insulating later electrically insulates the source 212, the drain 202, a portion of the first end of the 2D transistor channel 210, and a portion of the second end of the 2D transistor channel 210 from electrical contact.

Extending the ceramic coating to cover portions of the channel 210 adjacent to the source 212 and drain 202 may prevent unintended current paths through the liquid, while leaving other portions of the channel 210 exposed to the liquid. In some examples, a ceramic coating may or may not completely cover ends of the channel 210, and may leave some small portions of the source 212 and/or drain 202 exposed. Leakage currents between the source 212 and drain 202 through the liquid (e.g., but not through the channel 210) may be proportional to the exposed surface area, and thus may not be problematic if the non-insulated portions of the source 212 and drain 202 are small.

The sensor region 209 may be a structure to contain the applied liquid in a region above the other components of the integrated circuit and the 2D FET 206. For example, the sensor region 209 may be defined by a ridge of epoxy, a thermosetting resin, a thermoplastic, sheet adhesive, or the like. The material defining the sensor region 209 may be deposited on the substrate, formed as an opening in the chip packaging for the integrated circuit and the 2D FET 206, or the like. In certain examples, the sensor region 209 may be formed by insulating materials (e.g., adjacent to the channel 210) such as silicon nitride deposited over the junction of the source 212 and drain 202 and the respective ends of the channel 210.

Although the depicted example includes a sensor region 209 that is illustrated as a liquid well, other examples of a 2D FET 206 may have liquid in contact with a channel 210 in other ways. For example, a fluidic device or a set of one or more microfluidic channels may be provided to create a flow of liquid parallel or perpendicular to an integrated circuit so that the liquid contacts the channel 210. Furthermore, in certain examples, a liquid in the area of the sensor region 209 may cover one 2D FET 206, more than one 2D FET 206, or may cover all 2D FETs 206 on a chip.

In various examples, an area corresponding to a volume of liquid proximate to the channel 210 may be referred to as a gate area. The gate area may receive a volume of liquid, and substances or interactions within the liquid in the gate area may modulate the channel conductivity (or other output signals). The liquid received in the gate area may include one or more chemical or biological target substances, and the 2D FET 206 may be used to determine various parameters relating to presence of a target substance.

The channel 210, in various examples, is disposed horizontally on a substrate. Terms such as "horizontal," "above," "below," or the like, are used to refer to components of an integrated circuit in relation to a presumed horizontally oriented substrate for the integrated circuit. For example, a channel 210 may be described as being disposed horizontally on the substrate even if the integrated circuit is held tilted or upside down so that the channel's absolute orientation and position are non-horizontal, or under the substrate.

The channel 210, in the depicted example, may be graphene or another 2D nanomaterial such as molybdenum disulfide ($MoS_2$). Graphene forms a 2D transistor channel 210, and includes an atomic layer comprising sp2 hybridized carbon disposed horizontally on a substrate. For a carbon atom in the graphene, three of the four valence electrons may occupy a hybridized sp2 orbital, forming covalent (sigma) bonds with three adjacent carbon atoms in the lattice. The remaining valence electron occupies the remaining p orbital (outside the sp2 hybridization), perpendicular to the plane of the lattice. These protruding p orbitals hybridize to share electrons, similar to pi-bonded electrons in a benzene ring, and it is these hybridized orbitals that form the electronic band structure of the graphene. Thus, when the graphene conducts an electrical current (e.g., in an "on" state for the 2D FET 206), the mobile electrical charges (electrons or holes) are carried via the hybridized p orbitals immediately above the surface. Thus, with a liquid in contact with the top surface of a 2D channel 210, current carried by the top surface of the 2D channel 210 is highly sensitive to ions, molecules, or moieties in the liquid close to the 2D channel 210 (e.g., graphene channel).

In some examples, the 2D channel 210 shape and/or dimensions may be patterned such that the device current is within a predetermined range. For example, increasing the length of the 2D channel 210 or decreasing the width may decrease electrical conduction through the channel 210, and a manufacturer may configure a channel 210 with a length, width, or other shape based on a desired or predetermined current range for the channel 210.

In certain examples, the 2D channel(s) 210 of one or more transistor or groups of transistors may be chemically treated (e.g., chemically oxidized with diazonium salts, sulfuric acid, potassium permanganate, hydrogen peroxide, or similar compounds) to form scattering sites comprising sp3 hybridized carbon to facilitate covalent bonding of certain biomolecules, linkers, or other surface chemistries to the Csp3 orbitals at the scattering sites in the graphene channel(s) 210. In some implementations, a first number of transistors on a chip may include graphene channel(s) 210 with sp3 hybridized scattering sites and a second number of transistors on a chip may lack sp3 hybridized scattering sites.

The methods of synthetic biopolymer specific binding agent selection to facilitate sensing of synthetic biopolymer specific binding agent desorption in from the 2D transistor channel in response to biochemical interactions with target as disclosed herein may be adjusted to account for binding of selected synthetic biopolymer specific binding agents to particular types of 2D nanomaterials (e.g., graphene) used on various transistors and/or binding of the selected synthetic biopolymer specific binding agents to the target. Moreover, in a multiplexing chip, certain graphene transistors may be used for performing measurements of target components other than targets that bind to synthetic biopolymer specific binding agents.

In some examples, a 2D channel 210 may be deposited on the substrate for the 2D FET 206 by chemical vapor deposition (CVD). In some examples, a channel 210 may be made from a two-dimensional material other than graphene, which may be a monoatomic layer or a small number of layers, with strong in-plane covalent bonding and weak interlayer interactions. Such materials may be referred to as van der Waals materials. For example, in various examples, a channel 210 may utilize bilayer graphene, graphene oxide, reduced graphene oxide, molybdenum disulfide, topological insulators, or the like.

Various materials that conduct and exhibit field-effect properties, and that are chemically stable at room temperature when directly exposed to various solutions, may be beneficially used in a liquid-gated field effect transistor. Materials that may be suitable for forming a channel of a liquid-gated field effect transistor similar to a 2D FET 206 may include passivated silicon surfaces, carbon electrodes, or two-dimensional materials other than graphene.

In various implementations, using a 2D FET 206 with one or more channels 210 formed from graphene improves manufacturability, and lowers costs compared with one-dimensional alternatives, such as carbon nanotubes, or other two-dimensional van der Waals materials such as, for example, molybdenum disulfide. Furthermore, transistor channels 210 utilizing graphene may have advantageous characteristics such as better sensitivity, lower resistance, greater operating bandwidth, fewer manufacturing steps, improved reproducibility, and other similar beneficial features, relative to various other two-dimensional van der Waals materials, such as for example, graphene oxide.

The source 212 and drain 202 are electrodes disposed at opposite ends of the channel 210 so that a current conducted through the channel 210 is conducted from the drain 202 to the source 212, or from the source 212 to the drain 202. In various examples, the source 212 and drain 202 may be made of conductive material such as gold, platinum, polysilicon, or the like. In some examples, the source 212 may be coupled to the substrate of the 2D FET 206 (e.g., the silicon below the oxide or other dielectric layer) so that a bias voltage (or another bias signal) applied to the source 212 also biases the substrate under the channel 210. This removes much of the capacitance between the channel and the substrate, enabling more accurate and sensitive high frequency excitations and measurements. In one or more other examples, a 2D FET 206 may include a separate body terminal (not shown) for biasing the substrate.

The terms "source" and "drain" may be used herein to refer to conductive regions or electrodes that directly contact the channel 210, or to leads, wires or other conductors connected to those regions or electrodes. Additionally, the terms "source" and "drain" are used as the conventional names for terminals of a transistor, but without necessarily implying a type of charge carrier. For example, a 2D channel 210 may conduct electricity with electrons or holes as the charge carriers depending on various external conditions (such as the excitation conditions applied by the measurement controller 122 and the adsorption and/or desorption of synthetic biopolymer specific binding agents to the channel 210), and the charge carriers may flow from the source 212 to the drain 202, or from the drain 202 to the source 212.

In various examples, a 2D FET 206 for direct or indirect target substance signal measurement may include synthetic biopolymer specific binding agents adsorbed to the top surface of the 2D channel 210. Adsorption of synthetic biopolymer specific binding agents to a channel 210 may include various chemical and/or physical interactions that affix or adhere the synthetic biopolymer specific binding agents to the top surface of the channel 210. Such interactions between synthetic biopolymer specific binding agents and graphene may include pi-pi stacking, van der Waals forces, electrostatic attraction, or the like.

A synthetic biopolymer specific binding agent may be an aptamer, an oligonucleotide, a peptide, a saccharide, or the like, that is capable of binding with a high affinity to a target substance, and a high specificity for binding to that target substance. For example, A synthetic biopolymer specific binding agent for binding to a particular virus may be an aptamer or a saccharide that binds to a specific surface protein or other surface structure of the virus. Certain peptides, aptamers, and or saccharides may be engineered to perform an action, such as desorption, changing shape, or changing electrical properties in the presence of a triggering chemical environment such as the presence of a target. Synthetic biopolymer specific binding agents (e.g., peptides, aptamers, and/or saccharides) are discussed in further detail below with reference to FIGS. 7 and 8, and selection of synthetic biopolymer specific binding agents that will desorb from a selected 2D nanomaterial in response to biochemical interactions (e.g., specific binding) with a target substance is discussed below with reference to FIGS. 13-15.

In various examples, one or more output signals from the 2D FET 206 may be affected by excitation conditions and by desorption of synthetic biopolymer specific binding agents (e.g., peptides, aptamers, and/or saccharides) from the channel 210 in response to biochemical interactions with a target subtance. As defined above, the excitation conditions may be physical, electrical, or chemical conditions applied to the 2D FET 206. Excitation conditions such as constant bias voltages (or signals), time-varying excitation voltages (or signals), temperature conditions, or the like may be applied to the 2D FET 206 or to the applied liquid by the measurement controller 122.

If a liquid 120 containing a target substance is applied to the channel surface, output signals of the 2D FET 206 may depend on the excitation conditions and on the extent to which synthetic biopolymer specific binding agents desorb from the channel surface to bind to the target substance. For example, output signals may change during an incubation time, as synthetic biopolymer specific binding agents (e.g., peptides, aptamers, and/or saccharides) in the liquid 120 become bound to the target substance.

The desorption of synthetic biopolymer specific binding agents from the channel 210 may gate or modulate the channel conductivity, affecting one or more output signals. Such output signals may be, or may include, a channel current, a voltage, a capacitance, inductance, or resistance (calculated based on applied and measured voltages and currents), a complex-valued impedance, a complex impedance spectrum, an electrochemical impedance spectrum, a transfer curve, a Dirac voltage, a power spectral density, one or more network parameters (such as S-parameters or h-parameters), or the like.

In one or more other examples, a channel 210 may be bare or unfunctionalized, without synthetic biopolymer specific binding agents, but the synthetic biopolymer specific binding agents may instead be adsorbed to the surface of magnetic or non-magnetic particles in the range of about 1 nm to 10 μm in diameter (which may be referred to as "beads") added to the liquid 120. Output signals from one or more 2D FETs 206 may be sensitive to the desorption of synthetic biopolymer specific binding agents from the beads. With magnetic beads, a magnetic field may be applied to attract the beads towards the channel 210 out of the bulk solution of the liquid 120, so that the output signals are more strongly affected by the beads in proximity to the channel 210. In this case, the sensitivity of the resulting system is not constrained by diffusion of target substances to the channel surface as may be the case in certain examples. Instead, the magnetic beads allow rapid sampling of the entire volume, and then are pulled down via a magnetic field into proximity of the channel 210.

In various examples, a liquid applied to the channel 210 may be referred to as a liquid gate for the one or more 2D FETs 206, because one or more of the output signals for the 2D FETs 206 may be affected by conditions such as synthetic biopolymer specific binding agents (e.g., peptides, aptamers, and/or saccharides) binding to targets within the liquid. In addition, in various examples, the integrated circuit may include one or more electrodes for detecting and/or adjusting a voltage or electric potential of the liquid gate. For example, in the depicted example, integrated circuit includes a reference electrode 208 for measuring an electrochemical potential of the applied liquid, and a counter electrode 207 for adjusting the electrochemical potential of the applied liquid.

In various examples, an electric potential may develop at the interface between the applied liquid and the reference electrode 208 and/or the counter electrode 207. Thus, in some examples, a reference electrode 208 may be made of a material with a known or stable electrode potential. In one or more other examples, however, a reference electrode 208 may be a pseudo-reference electrode that does not maintain a constant electrode potential. Nevertheless, measurements of the electrochemical potential of the liquid via a pseudo-reference electrode may still be useful as output signals or as feedback for adjusting the electrochemical potential of the liquid via the counter electrode 207. In some examples, the reference electrode 208 and/or the counter electrode 207 may be made of non-reactive materials such as gold or platinum. A reference electrode 208 and/or a counter electrode 207 disposed on the substrate may be referred to as a gate bias electrode, and may be used for biasing and/or measuring electrical characteristics of the liquid.

In certain examples, the 2D FETs 106, 206 may be made using photolithography or other commercially available chip fabrication techniques. For example, a thermal oxide layer may be grown on a silicon substrate, and metal components such as a source 212, drain 202, reference electrode 208 and/or the counter electrode 207 may be deposited or patterned on the thermal oxide layer. A 2D channel 210 may be formed using chemical vapor deposition. The use of conventional fabrication techniques may provide low-cost 2D FETs 106, 206, especially in comparison to sensors using high-cost materials such as carbon nanotubes or specialty fabrication techniques.

Various configurations of 2D FETs 106, 206 and ways to fabricate 2D FETs 106, 206 (or similar transistors described below) are discussed in U.S. patent application Ser. No. 15/623,279 entitled "PATTERNING GRAPHENE WITH A HARD MASK COATING"; U.S. patent application Ser. No. 15/623,295 entitled "PROVIDING A TEMPORARY PROTECTIVE LAYER ON A GRAPHENE SHEET"; U.S. patent application Ser. No. 16/522,566 entitled "SYSTEMS FOR TRANSFERRING GRAPHENE"; U.S. patent application Ser. No. 15/182,533 titled "GRAPHENE FET DEVICES, SYSTEMS, AND METHODS OF USING THE SAME FOR SEQUENCING"; and U.S. Pat. No. 10,395,928 entitled "DEPOSITING A PASSIVATION LAYER ON A GRAPHENE SHEET"; each of which is incorporated herein by reference in their entireties to the extent legally allowable.

Figure 3:
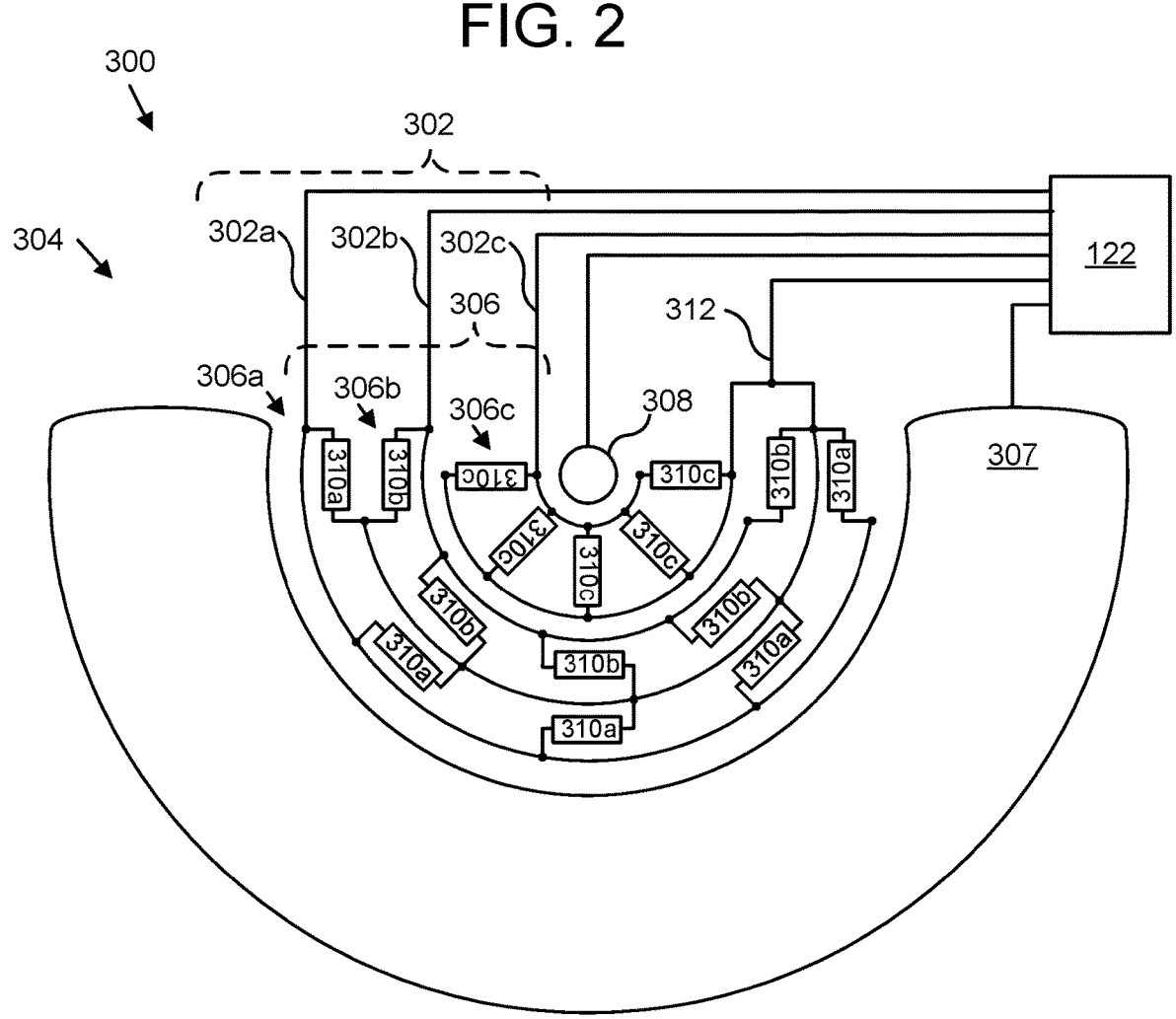
FIG. 3 is a schematic block diagram illustrating an apparatus for direct or indirect target substance signal measurement, including an integrated circuit with multiple 2D FETs, according to one or more examples of the present disclosure.

FIG. 3 is a schematic block diagram illustrating an apparatus 300 for direct or indirect target substance signal measurement, including an integrated circuit 304 with multiple 2D FETs, according to one or more examples of the present disclosure. For example, the integrated circuit 304 depicted in FIG. 3 includes three 2D FETs 306a, 306b, 306c, that respectively have five channels 310a, 310b, 310c, that are distributed in an arcuate or semi-circle configuration. The apparatus 300 also includes a measurement controller 122. As in FIG. 2, the integrated circuit 304 and the 2D FETs 306a, 306b, 306c, are depicted in a top view. In certain examples, the 2D FETs 306a, 306b, 306c, and the measurement controller 122 in the depicted example may be substantially similar to corresponding components described above with reference to FIGS. 1 and 2.

In the depicted example, the 2D FETs 306a, 306b, 306c, include a common source 312, separate drains 302a, 302b, 302c, and five channels 310a, 310b, 310c. The depicted integrated circuit 304 also includes a reference electrode 308 and a counter electrode 307, which may be substantially similar to the reference electrode 208, and counter electrode 207 described above with reference to FIG. 2. (A liquid well similar to the sensor region 209 of FIG. 2 is not depicted in FIG. 3 but may similarly be provided as part of the integrated circuit). In some examples, multiple 2D FETs 306a, 306b, 306c may be disposed in a single liquid well. In some examples, separate 2D FETs or groups of transistors may be disposed in separate liquid wells. In some examples, a liquid well may be omitted, and liquid may be brought into contact with 2D FETs in another way, such as along one or more fluidic channels.

In various examples, a plurality of channels 310a, 310b, 310c may be homogeneous or heterogeneous. For example, homogeneous channels 310a, 310b, and 310c may be bare or unfunctionalized graphene, or may have a single type of synthetic biopolymer specific binding agent adsorbed to the three sets of five channels 310a, 310b, and 310c. In certain examples, heterogeneous channels 310a, 310b, and 310c, may be a mixture of bare and functionalized 2D transistor channels 310, a mixture of 2D transistor channels 310 that are functionalized in more than one way (optionally including one or more unfunctionalized 2D transistor channels 310) or the like.

For example, heterogeneous 2D transistor channels 310a, 310b, and 310c, may include channels functionalized with different synthetic biopolymer specific binding agents selected for binding to different targets, another subset of channels functionalized without synthetic biopolymer specific binding agents, which may be used for other types of assays on the applied liquid, or the like. Additionally, the use of multiple channels 310a, 310b, and 310c, may provide redundancy to mitigate damage to any individual channel 310 (e.g., mechanical damage from a pipette tip used to apply a liquid), and may make the 2D FETs 306a, 306b, and 306c sensitive to target substances across a greater surface area than in a single-channel device.

In various examples, the 2D FETs 306a, 306b, 306c include corresponding drains 302a, 302b, 302c coupled to the channels 310a, 310b, and 310c. In certain examples, one drain may be provided per channel 310 so that each channel 310 can be independently biased. In some examples, however, channels 310 may be coupled to drains in groups, so that the channels 310 of a group can be biased together in parallel, but different groups can be biased differently. For example, in the depicted example, the three 2D FETs 306a, 306b, 306c include a total of fifteen channels 310a, 310b, and 310c, coupled to three drains 302a-c, so that one of the drains 302 can be used to bias a group of five channels 310. In certain examples, a plurality of channels 310 may be coupled in parallel to a single drain 302.

In the depicted example, the channels 310 are coupled in parallel to one source 312. For some measurements, the source 312 may be coupled to a ground (e.g., 0 volts, a virtual ground, or another reference voltage). For example, in various examples, a drain voltage of about 2.5V may serve as a virtual ground, and a source voltage and/or a gate voltage may be varied between about 1.5V and 2.5V. In certain examples, however, channels 310 may be coupled to a plurality of sources 312, allowing different measurements to be made with different source biases. For example, channels 310 may be coupled to multiple sources 312 individually or in groups, as described above for the plurality of drains 302.

In the depicted example, the reference electrode 308 and the counter electrode 307 are disposed so that the channels 310 are between the reference electrode 308 and the counter electrode 307. In this configuration, the electrochemical potential of the liquid gate may be modified via the counter electrode 307 and monitored via the reference electrode 308, so that the electrochemical potential near the channels 310 is close to the modified and/or monitored potential. Additionally, in the depicted example, the counter electrode 307 is significantly larger than the channels 310 or the reference electrode 308, so that modifications to the electrochemical potential of the liquid gate made via the counter electrode 307 quickly occur across a large surface area, and in a large volume of the applied liquid.

Although FIGS. 2 and 3 depict individual 2D FETs 106, 206, an integrated circuit 101 in various examples may include a plurality of 2D FETs 106, 206, 306, which may be homogeneously or heterogeneously configured. For example, the homogeneous or heterogeneous configurations described above for multiple 2D FETs 306a, 306b, 306c in the integrated circuit 304 may similarly apply to multiple 2D FETs 106, 206, each with their own channel.

Figure 4:
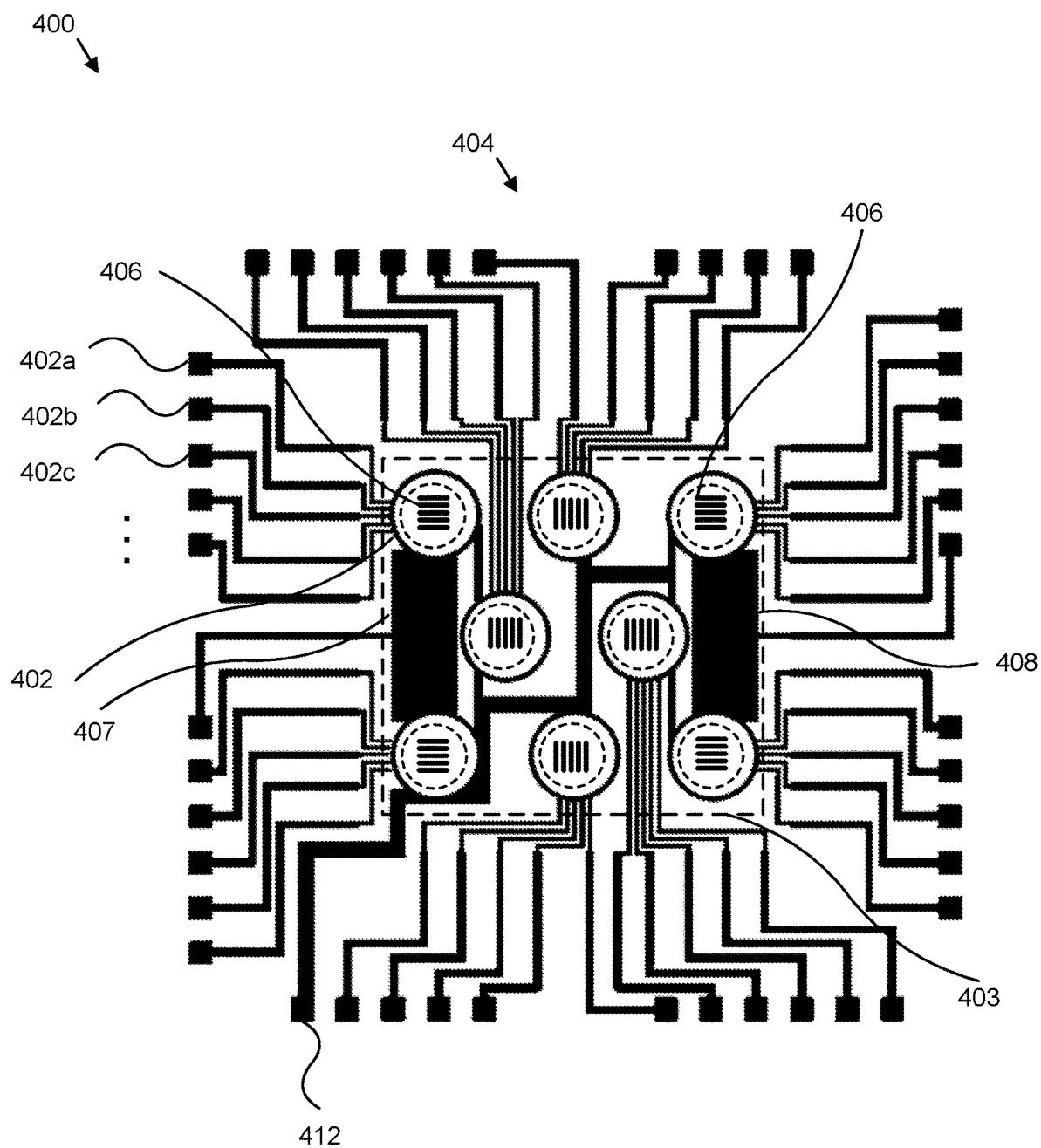
FIG. 4 is a top view illustrating an integrated circuit with an array of 2D FETs, according to one or more examples of the present disclosure.

FIGS. 4, 5, 6, and 7 depict integrated circuits 404, 504, 604, 101 having multiple 2D FETs 406, 506, 606, 706 in two-dimensional or linear arrays. For example, FIG. 4 depicts an array 403 of 2D FETs 406 arranged in eight groups of five 2D FETs 406. A system 100 or an integrated circuit 404 may include multiple 2D FETs such as the 2D FETs 106, 206, 306, 406 with synthetic biopolymer specific binding agents adsorbed to one or more channels so that output signals are affected by desorption of the synthetic biopolymer specific binding agents in response to biochemical interactions (e.g., specific binding) with a target substance, as described above with reference to FIGS. 1-3. A measurement controller 122 may include excitation circuitry to apply excitation conditions to the plurality of 2D FETs 406 in an array 403, and may include measurement circuitry to perform measurements for the plurality of 2D FETs 406, 506 in the array 403.

An analysis module 133 may determine parameters relating to the presence of the target substance, such a rate of synthetic biopolymer specific binding agent desorption, whether a target substance is present or absent, a concentration of a target substance, or the like, for each of the 2D FETs 406 in the array 403. In some examples, the analysis module 133 may determine the extent to which synthetic biopolymer specific binding agents desorb from different channels provided with different synthetic biopolymer specific binding agents, thus identifying which target substances are present or absent.

FIG. 4 is a top view illustrating an apparatus 400 with an integrated circuit 404 that includes eight groups each having five 2D FETs 406. In the depicted example, the 2D FETs 406 are similar to the 2D FETs 106, 206, 306, described above except that each 2D FET 406 has a single channel (which is different from the three 2D FETs 306a, 306b, and 306c depicted in FIG. 3 that respectively each have five channels 310a, 310b, or 310c) so that in the array 403 there are a total of forty drains 302 that are pinned out to corresponding pads 402a, 402b, 402c and so forth for a total of forty transistor output pins at the periphery of the integrated circuit 404.

In the depicted example, the forty 2D FETs 406 share a common source 412. The integrated circuit 404 includes a counter electrode 407 and a reference electrode 408 where the counter electrode 407 may be utilized to apply a voltage to the liquid 120 and the reference electrode 408 may be utilized to measure an electrical potential of the liquid 120. In various examples, the structure and location of the counter electrode 407 and the reference electrode 408 are interchangeable and either of the counter electrode 407 and the reference electrode 408 may be selected for the respective functions of applying or measure the liquid gate voltage.

In the depicted example, a plurality of 2D FETs 406 (arranged in groups indicated by dashed circles) are disposed in a two-dimensional array of droplet locations 402 (indicated by solid circular outlines) on a substrate such as a chip for an integrated circuit 404. A liquid barrier or hydrophobic coating may be applied to the substrate in between the droplet locations. A liquid barrier or hydrophobic coating may be similar to the material described above with reference to FIG. 2 for forming a sensor region 209 (e.g., a liquid well). In certain examples, a two-dimensional array of 2D FETs 406 may be used with multiple droplets deposited on the integrated circuit 404, or with flow channels perpendicular to the surface of the integrated circuit 404.

In the depicted example, the droplet locations 402 are arranged in triangular groupings, in which each droplet location is 4.5 mm away from its nearest neighbors. In certain examples, the droplet locations 402 may be arranged in rectangular groupings, or may be arranged in another two-dimensional arrangement, and may be closer or further than 4.5 mm apart. In the depicted apparatus 400, the array 403 includes eight droplet locations 402 each having five 2D FETs 406. In certain examples, an array such as the array 403 may include more or fewer droplet locations, such as two or four droplet locations, or several hundred to several thousand droplet locations. Droplet locations may be liquid wells for containing liquid, or may be coupled to fluidic channels for moving liquid along or across the droplet locations.

Figure 5:
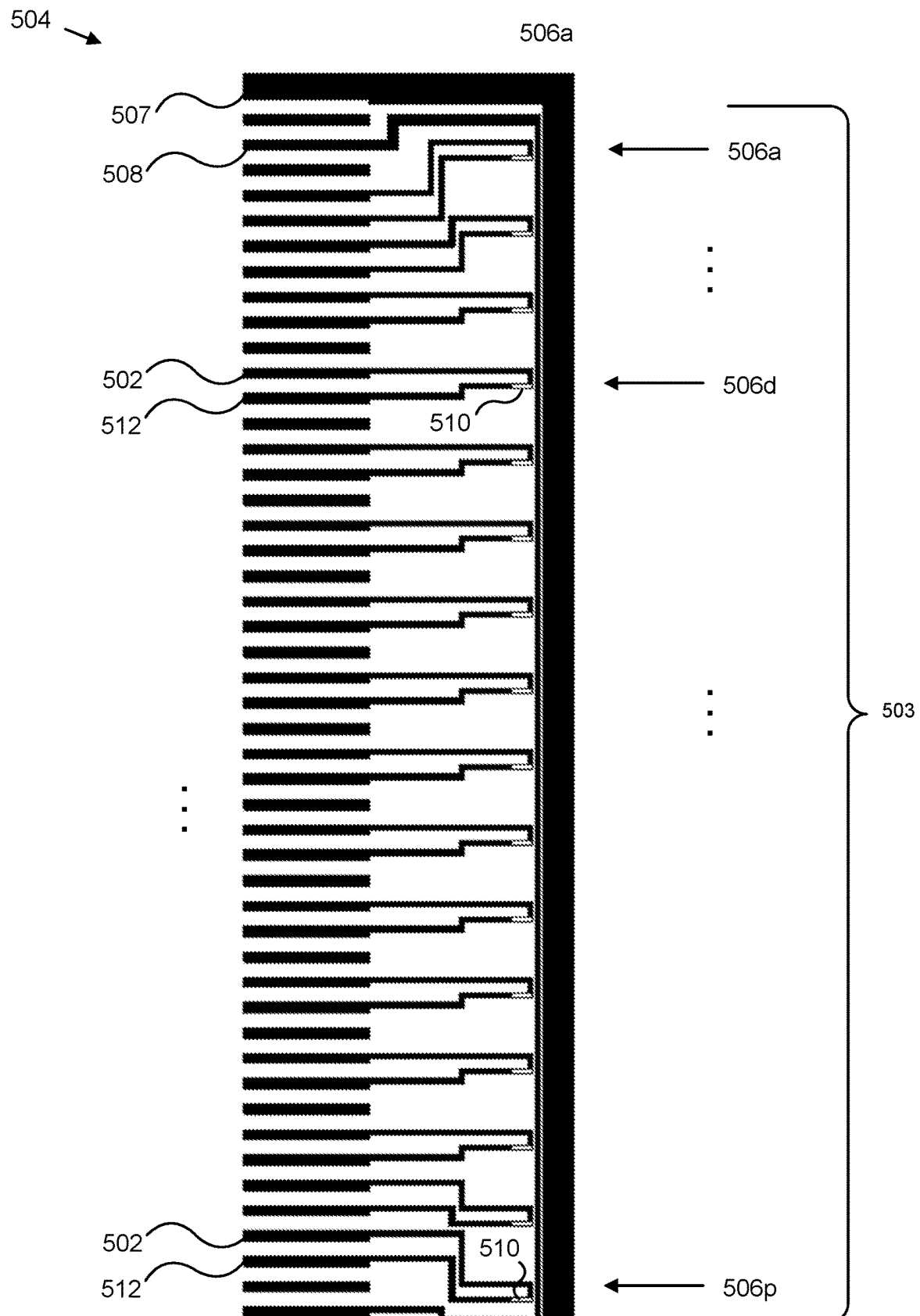
FIG. 5 is a top view illustrating an integrated circuit with an array of 2D FETs, according to one or more examples of the present disclosure.

FIG. 5 is a top view illustrating an integrated circuit 504 with an array of multiple (e.g., sixteen) 2D FETs 506 in accordance with one or more examples of the present disclosure. In the depicted example, the sixteen 2D FETs 506 (e.g., 506a-506p) are disposed in a linear array of locations on a substrate such as a chip for an integrated circuit 504. It may be noted that only three of the sixteen 2D FETs 506a, 506d, and 506p, are labeled in FIG. 5 but any number of two or more 2D FETs 506 may be included in a linear array. Each transistor includes a channel 510 that links a drain 502 to a source 512, as described above. A reference electrode 508 and a counter electrode 507 run along the side of the array 503 in the depicted example, to measure and/or modify the electrochemical potential within the liquid 120. In certain examples, multiple reference electrodes 508 and/or counter electrodes 507 may be provided.

In various examples, a linear array 503 of 2D FETs 506 may be provided with a line of droplet locations separated by a liquid barrier or hydrophobic coating as described above with reference to FIG. 4, or may be provided without a liquid barrier or hydrophobic coating between channels 510. In certain examples, a linear array 503 of 2D FETs 506 may be used with multiple droplets deposited on the integrated circuit 504 in a line, or with flow channels perpendicular to the surface of the integrated circuit 504.

In some examples, a linear array 503 of 2D FETs 506 may be used with flow channels parallel to the surface of the integrated circuit 504, so that liquid travels over the 2D FETs 506 of the array 503 in sequence. In comparison to the two-dimensional array 403 depicted in FIG. 4, the linear array 503 depicted in FIG. 5 may use more chip area on an integrated circuit, but may be less expensive overall due to simplified chip packaging and assembly.

In some examples, packaging for an integrated circuit 504 may enclose the integrated circuit 504 in a casing formed of plastic or another material. A flow channel may extend along the casing from an opening at one end of the casing to an absorbent pad disposed within the casing at the opposite end. In some examples, the flow channel is formed in a pressure-sensitive adhesive that couples the integrated circuit 504 to the casing. In certain examples, the flow channel is formed in a layer of another material, disposed between the integrated circuit 504 and the top of the casing. In certain examples, the flow channel is integrated into the structure of the integrated circuit by etching glass layers or other dielectrics on the upper surface of the circuit. Thus, a user of the integrated circuit may pipette (or otherwise insert) the liquid 120 into an opening so that the liquid 120 runs along the flow channel, over the 2D FETs 506 in sequence, and is absorbed by the absorbent pad. The integrated circuit 504 or its packaging may include pads, leads, or other connectors for communication between a chip reader 102 and the 2D FETs 506.

Figure 6:
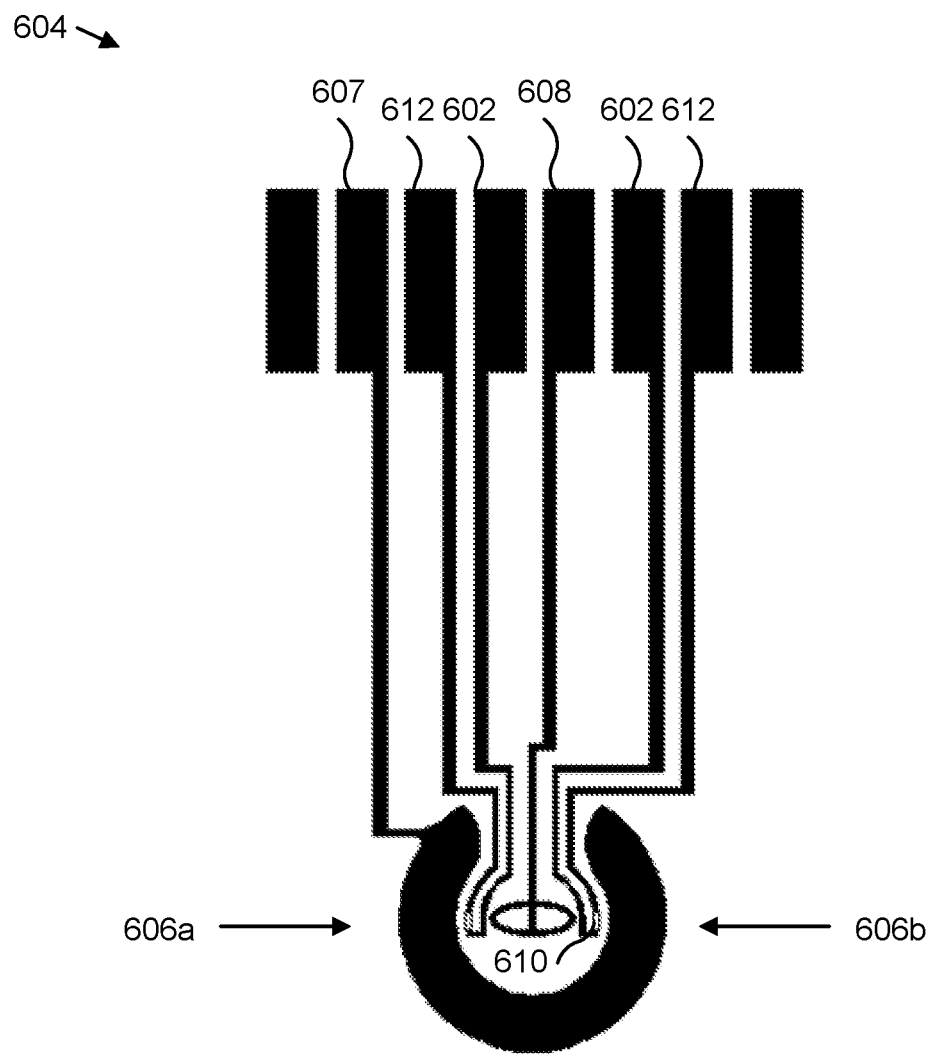
FIG. 6 is a top view illustrating an integrated circuit with an array of 2D FETs, according to one or more examples of the present disclosure.

FIG. 6 is a top view illustrating an integrated circuit 604 with two 2D FETs 606a-b in accordance with one or more examples of the present disclosure. In the depicted example, the 2D FETs 606 (e.g., 606a-606b) are disposed on a substrate. Each transistor includes a channel 610 that links a drain 602 to a source 612, as described above. A reference electrode 608 runs to the center of the two 2D FETs 606, and a counter electrode 607 runs around the outside of the 2D FETs 606 in the depicted example, to measure and/or modify the electrochemical potential within the liquid 120.

FIG. 7 is a top view and detailed top view and side view insets of an integrated circuit 101 with 2D FETs 106a, 106b, 106c, and 106d, and on-chip deposition of a thin film layer of synthetic biopolymer specific bind agents.

In various examples, the integrated circuit 101 includes conductive sources 104 (e.g., 104a, 104b, 104c, and 104d labeled near chip connections 115 at the top of FIG. 7) and conductive drains 107 (e.g., 107a,b, 107c,d, also labeled near chip connections 115 at the top of FIG. 7) patterned in a metallization layer 108 for 2D FETs 106 in an array 103. The metallization layer 108 is formed on a dielectric layer 119, such as an oxide layer, e.g., silicon dioxide ($SiO_2$) deposited on an IC substrate 129. In certain examples, the IC substrate 129 is a silicon wafer or die that may be p-doped or n-doped. The metallization layer 108 may, in some examples, be a bilayer that includes a layer of a non-reactive metal such as gold and a thin adhesion layer to enhance adhesion of certain metals such as gold to the dielectric layer 119. Moreover, it may be noted that different types of metallization layers 108 may be used for different portions of the IC. In one working example, platinum is advantageously selected for the metallization layer 108 because it is non-reactive with many liquids and is suitable for adhering to the dielectric layer 119 without an adhesion layer.

The integrated circuit 101, in some examples, such as the working example depicted in FIG. 7, includes two or more environmentally non-reactive electrodes 127, 131 in the metallization layer 108 deposited on the dielectric layer 119. In certain examples, the two or more environmentally non-reactive electrodes 127, 131 are horizontally offset from the 2D FETs 106 in the array 103. This is in contrast to top-gated or bottom-gated FET designs where metal gates are disposed above or below the channel of the transistor (separated by a gate dielectric).

In various examples of the present disclosure, at least one environmentally non-reactive electrode 127, 131 is configured to impart a counter electrode voltage ($V_{CE}$) to a liquid 120 received in a gate area 123 such that the counter electrode voltage imparted to the liquid provides a gate voltage for the 2D FETs 106 in the array 103 covered by the liquid 120 so that a target analyte is detectable in response to biochemical interactions with a target substance where the biochemical interactions occur within a measurement distance of the channel 128. In other words, in such examples there are no metal gate electrodes disposed vertical above or below the transistor channels 128 (e.g., 128*a*, 128*b*) of the 2D FETs 106.

In one or more examples, at least one environmentally non-reactive electrode 127, 131 is configured to enable a reference electrode measurement of a gate voltage (Vg) of the liquid to be made. Beneficially, using a non-reactive electrode 127 (e.g., a counter electrode), that is larger and separate from a different non-reactive electrode 131 (e.g., a reference electrode), enables certain differences in driven liquid gate voltage as compared to measured gate voltage (e.g., VRef) to be compensated for using feedback circuitry which may be implemented using circuitry similar to the circuitry depicted in FIGS. 2,7.

In various examples, the integrated circuit 101 includes a 2D nanomaterial layer for patterning transistor channels 128 of the 2D FETs 106 between the conductive sources 104 and the conductive drains 107. In certain examples, the integrated circuit 101 include a temporary etchable inert metal layer on the 2D nanomaterial layer that forms hard masked channel regions over the transistor channels 128 of the 2D FETs 106 to be patterned. It may be noted that the transistor channels 128 of the 2D FETs 106 may be unitary or may include multiple parallel elements to improve reliability. For example, the 2D FETs 106 depicted in FIG. 7 are patterned using a radially extending spoke pattern of five rectangular transistor channels 128 patterned in the 2D nanomaterial. In addition to the reliability benefits of using channels that include multiple 2D nanomaterial segments, the spoke pattern also provide efficient electrical coupling with the area of liquid 120 over the 2D FETs (e.g., 110*a*, 110*b*, 110*c*, 110*d*).

In some examples, the integrated circuit 101 includes hard masked channel regions patterned to temporarily cover transistor channels 128 of the 2D FETs and corresponding regions covered by the etchable inert metal layer. Gold is an example of an etchable inert metal layer that provides good temperature and chemical protection for the 2D nanomaterial used to form the transistor channels 128.

In certain examples, the integrated circuit 101 includes a ceramic coating layer 134 patterned to cover portions of the chip to be electrically insulated from the liquid with openings 136 in the ceramic coating 134 corresponding to the hard masked channel regions and corresponding to the regions of the two or more environmentally non-reactive electrodes 127, 131. In various examples, the integrated circuit 101 include a further opening 136 etched in the etchable inert metal layer to expose the 2D FET channels to the liquid received in the gate area 123. In the working example depicted in FIG. 7, the entire top surface of the integrated circuit 101 is covered with a ceramic coating layer such as silicon nitride, aluminum oxide, or other ceramic coating which advantageously provides a protective coating that protects the chip from undesired electrical or chemical contact with the electrically biased liquid environment. Beneficially, the etchable inert metal layer may be used to protect the 2D nanomaterial of the channels of the 2D FETs during the patterning of the ceramic coating layer.

After removal of the etchable inert metal layer, in various examples, one or more thin film layers are deposited via liquid mediated deposition on channels of one or more selected instances of the 2D FETs of the FET array.

Figure 12:
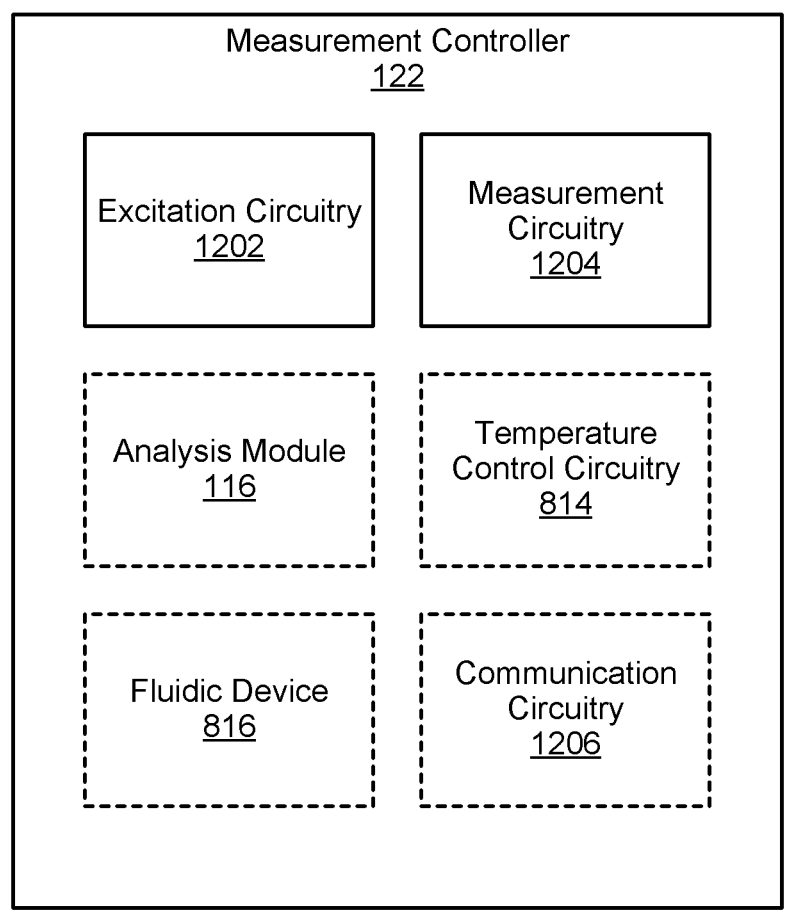
FIG. 12 is a schematic block diagram illustrating a measurement controller, according to one or more examples of the present disclosure.

In various examples, the integrated circuit 101 includes chip connections 115 in the metallization layer that enable on-chip measurements comprising measurement vectors for the one or more selected instances of the 2D FETs of the FET array to be made in connection with the liquid mediated deposition of the one or more thin film layers. In certain examples, the integrated circuit is implemented using chip scale packaging with a connector form factor that enables a chip implementing the integrated circuit 101 to be inserted into a socket such as for example a micro SD socket of a measurement controller 122 that includes communications circuitry 1206 as depicted in FIG. 12 to communicate via input and output signals to the integrated circuit 101 is a top view illustrating an integrated circuit 101 with four 2D FETs 106*a*, 106*b*, 106*c*, 106*d* in accordance with one or more examples of the present disclosure.

In an example depicted in FIG. 7, the 2D FETs 106 (e.g., 106*a,b,c,d*) are disposed on a substrate. Each transistor includes a channel 128, which may include multiple 2D material (e.g., graphene) segments, that links a conductive drain 107 to a conductive source 104, as described above. In the depicted example, four conductive sources 104*a,b,c,d* are provided, one per transistor, and two conductive drains 107*a,b* and 107*c,d* are provided so that each drain 107 is shared by two transistors 106*a,b* and 106*c,d*. Reference electrodes 131, coupled to an integrated resistor, run in series along the side of the transistors, close to the transistor channels 128, and semicircular counter electrodes 127 run in series along the side of the transistors 106*a,b,c,d*, further away from the transistors 106*a,b,c,d* than do the reference electrodes 131.

In the example depicted in FIG. 7, the counter electrodes 116 are connected together and the reference electrodes 131 are connected together. In certain implementations, such as, for example, where liquid samples are analyzed independently on the same chip, one or more counter electrodes may be driven by different sources and one or more reference electrodes may be used to separately measure liquid gate voltages. Furthermore, different electrode geometries may be selected for various implementations of counter electrodes and reference electrodes according to one or more examples of the present disclosure.

Additionally, the array 103 of 2D FETs may include several transistor channels 128 with the same synthetic biopolymer specific binding agents. This is done to produce multiple instances of the same measurement in different locations on the chip. Multiple instances provide extra information regarding the variation in the measurement by evaluating the standard deviation or similar statistical measure. In addition, outliers can be removed from the data by evaluating multiple measurements of the same biochemical interaction on a single integrated circuit 101.

The array 103 of 2D FETs 106 (e.g., 106a, 106b, 106c, 106d) may include several 2D transistor channels 128 with the different synthetic biopolymer specific binding agents, or other binding agents such as antibodies or other proteins. Variations in the thin film layer of binding agent chemistry on the same integrated circuit 101 allows for detection of multiple different target analytes simultaneously. This can also be used for multiomic measurements, for example where one 2D FET e.g., 106a is functionalized to detect a nucleic acid, while another 2D FET e.g., 106b is functionalized to detect a protein. Other variations are possible, such as small molecules, peptides, hormones, extracellular vesicles, cells, and different specific targets within these classes of molecules.

In various examples, excitation circuitry and/or the measurement circuitry may include feedback circuitry 124 and/or bias circuitry 126 for controlling and/or measuring $I$-$V_G$ transfer curves and associated measurement vectors. The excitation circuitry and/or the measurement circuitry may also be used to attract or repel charged components or ions in the liquid 120. Synthetic biopolymer specific binding agents 822 may be selected to remain adsorbed to the 2D transistor channel material (e.g., 822a) or to desorb from the 2D transistor channel material in response to a biochemical interaction (e.g., specific binding) between the synthetic biopolymer specific binding agent 822d and a target substance 820 in the liquid 120.

Figure 8:
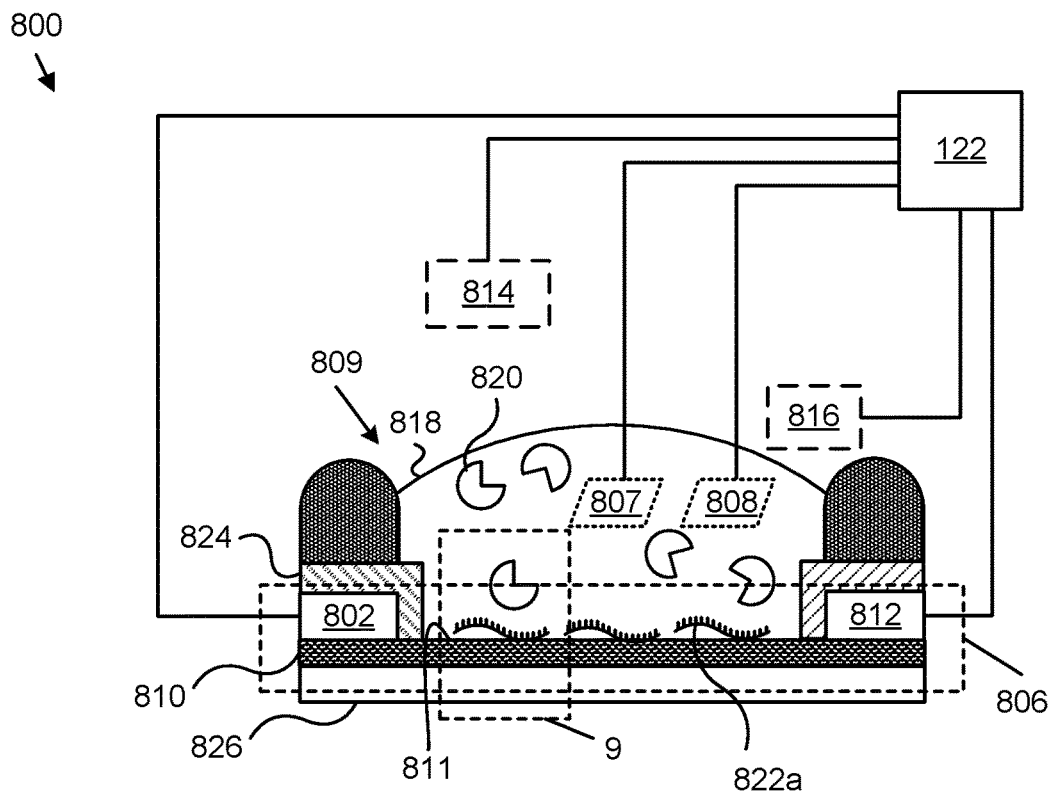
FIG. 8 is a schematic block diagram illustrating an apparatus for direct or indirect target substance signal measurement, including a 2D FET, according to one or more examples of the present disclosure.

FIG. 8 is a schematic block diagram illustrating a further example of an apparatus 800 for direct or indirect target substance signal measurement, including a further example of an a 2D FET 806 coupled to a measurement controller 122. The 2D FET 806 may be part of an array of 2D FETs for an integrated circuit. The 2D FET 806 is depicted in a cross-section view, from the side. The 2D FET 806 and the measurement controller 122 in the depicted example may be substantially as described above with reference to FIGS. 1 through 7, and are described further below.

In the depicted example, the 2D FET 806 includes a source 812, a drain 802, and a channel 810. A reference electrode 808, a counter electrode 807, and a liquid well 809, which may be substantially as described above, are provided by the integrated circuit or field effect transistor array system that includes the 2D FET 806.

The channel 810, in the depicted example, is a two-dimensional graphene region disposed on an insulating substrate 826. The source 812 and drain 802 are formed in contact with the channel 810, and are covered by a ceramic coating 824 (e.g., silicon nitride). The ceramic coating 134, 824 is an insulating layer to electrically insulate the source 812 and the drain 802 from electrical contact with the liquid 818.

Although FIG. 8 depicts the source 812 and drain 802 fully encapsulated by the ceramic coating 824, some examples of a 2D FET 806 may include a source 812 and drain 802 that are not fully encapsulated by a dielectric or passivation layer. For example, a gold layer may be deposited over a 2D channel 810 to protect the channel from contamination or damage during wafer processing, assembly, and packaging, after which a ceramic coating 824 such as silicon nitride may be deposited over the source 812 and the drain 802. The gold may subsequently (e.g., after assembly and packaging) be etched to expose the 2D channel 810, but etching the gold may slightly undercut the ceramic coating 824, resulting in a small portion of the source 812 and the drain 802 not being insulated from the liquid 818. However, any leakage current through the liquid 818 due to non-insulated portions of the source 812 and the drain 802 may be small relative to the measurements of interest if the exposed surface area of the non-insulated portions is small.

A liquid 818 (which may be substantially similar to the liquid 120 described above) is received in a gate area above the channel 810, so that the liquid is applied in contact with the top surface 811 of the channel 810. For example, the liquid well 809 may retain the liquid 818 in a region that includes the gate area, and the liquid 818 may be pipetted (or otherwise inserted) into the liquid well 809 to contact the channel surface 811, the reference electrode 808, and the counter electrode 807. In various implementations, the reference electrode 808 and/or the counter electrode 807 may be substantially co-planar with the channel 810. Furthermore, the counter electrode 807, in various examples, may have a substantially larger surface area than the reference electrode 808 for applying a relatively constant bias voltage across a large area of the sensor. The ceramic coating 824 electrically insulates the source 812 and drain 802 from the liquid 818, so that current between the source 812 and drain 802 is through the channel 810 rather than directly through the liquid 818.

In the depicted example, the liquid 818 includes a target substance 820. As described and depicted above with reference to FIG. 1, a target substance 820 may be any chemical or biological substance that is of interest in an assay using an integrated circuit, a 2D FET 806, or an array of 2D FETs, and is represented in the Figures as a circle with a wedge removed. Non-target substances may also be present in the liquid 818, but are not shown in the Figures for convenience in illustrating interactions involving the target substance 820. In some examples (e.g., for control measurements) a liquid 818 may not include a target substance 820.

In the depicted example, synthetic biopolymer specific binding agents 822 are adsorbed to the to the top surface 811 of the channel 810. The synthetic biopolymer specific binding agents 822 are molecules such as oligonucleotides, selected to desorb from the top surface 811 in response to biochemical interactions, such as for example binding activity, with a target substance 820 in the liquid 818. In the depicted example, the synthetic biopolymer specific binding agents 822 are depicted as single-stranded nucleic acids, but this depiction is not intended to be limiting other synthetic biopolymer specific binding agents such as peptides and/or saccharides.

The target substance 820 may move within the liquid 818 by diffusion or other thermal motion, by circulation of the applied liquid, by electrophoresis, or dielectrophoresis if an electric field is applied, or the like. As the target substance 820 moves, synthetic biopolymer specific binding agents 822 (e.g., peptides, aptamers, and/or saccharides) in proximity to the target substance 820 may desorb from the graphene channel 810 and bind to the target substance 820. Continued motion of the target substance 820 is statistically likely to bring further instances, copies, or molecules of the target substance 820 close enough to the synthetic biopolymer specific binding agents 822 (e.g., peptides, aptamers, and/or saccharides) to be bound; thus, synthetic biopolymer specific binding agent desorption may increase over the course of an incubation time.

The measurement controller 122, in the depicted example, is coupled to the source 812, the drain 802, the reference electrode 808, and the counter electrode 807. In various examples, the measurement controller 122 may apply excitation conditions to the 2D FET 806 via the source 812, the drain 802, and/or the counter electrode 807. In further examples, the measurement controller 122 may perform measurements of one or more output signals from the 2D FET 806 via the source 812, the drain 802, and/or the reference electrode 808.

In some examples, an apparatus 800 may include temperature control circuitry 814, and/or a fluidic device 816. The measurement controller 122 may include or communicate with the temperature control circuitry 814, and/or a fluidic device 816, and may control the temperature control circuitry 814, and/or fluidic device 816. FIG. 8 depicts the temperature control circuitry 814 and a fluidic device 816 in dashed lines, indicating that they may be present in various examples or absent in certain examples.

In various examples, the measurement controller 122 may control a temperature of the liquid 818 using temperature control circuitry 814 for various reasons, such as to control, increase, optimize, or decrease a rate at which synthetic biopolymer specific binding agents 822 (e.g., peptides, aptamers, and/or saccharides) bind to a target substance 820. Temperature control circuitry 814, in various examples, may be any circuitry capable of changing the temperature of the liquid 818 and/or the 2D FET 806. In various examples, temperature control circuitry 814 may be capable of heating the liquid 818 and/or the 2D FET 806. In certain examples, temperature control circuitry 814 may be capable of cooling the liquid 818 and/or the 2D FET 806. In some examples, temperature control circuitry 814 may be provided for both heating and cooling.

In various examples, temperature control circuitry 814 may include components such as a resistive heater in proximity to the 2D FET 806, a resistive wire on the same substrate as the 2D FET 806, a Joule heating controller to control the current in a resistive element (or in the channel 810 itself, used as a resistive element for Joule heating), a solid-state heat pump (e.g., using the Peltier effect). In some examples, temperature control circuitry 814 may include components for monitoring the temperature of the liquid 818 and/or the 2D FET 806 (and for controlling the temperature based on the monitored temperature), such as a thermistor, one or more thermocouples, a silicon bandgap temperature sensor, a resistance thermometer, or the like. Various other or further components for measuring or controlling a temperature may be included as temperature control circuitry 814 in various examples of an apparatus 800 or a measurement controller 122.

In various examples, one or more fluidic devices 816 may be used to drive sample flow through a flow cell or other fluidic or microfluidic channels. In certain examples, the 2D FET 806 may be coupled to a flow cell. In some examples, an integrated circuit may include multiple 2D FETs, and a fluidic device 816 may drive flow of a liquid over a sequence of 2D FETs so that upstream and downstream transistors are, respectively, sensitive to earlier and later interactions involving the target substance 820.

In various examples, the measurement controller 122 may apply one or more excitation conditions to the 2D FET 806 or an array of 2D FETs, so that one or more output signals or parameters associated with the output signals from the 2D FET(s) 806 are affected by the excitation conditions and by desorption of synthetic biopolymer specific binding agents 822 (e.g., peptides, aptamers, and/or saccharides) from the channel 810. For example, an output signal or parameter of an output signal such as a channel-to-liquid capacitance, a channel current, channel surface potential, Dirac Point, transfer curve shape, transfer curve curvature, and transfer curve hysteresis may depend on whether synthetic biopolymer specific binding agents 822 have desorbed from the channel 810, or on the extent to which synthetic biopolymer specific binding agents 822 have desorbed from the channel 810.

Accordingly, in various examples, measurements of affected output signals by the measurement controller 122 may be used by the analysis module to determine a parameter relating to presence of the target substance 820. Such a parameter may include an indication of whether or not a target substance 820 is present in the liquid 818, a concentration of the target substance 820 in the liquid 818, or the like.

Figure 9:
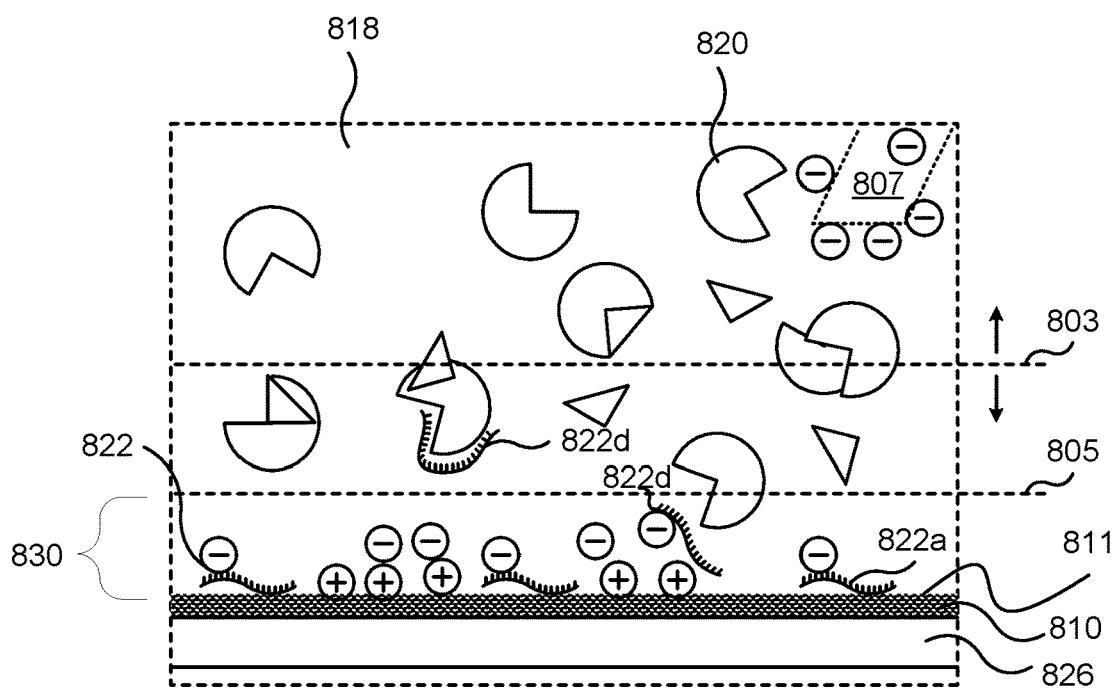
FIG. 9 is a detail view of a region indicated in FIG. 8, illustrating synthetic biopolymer specific binding agents desorbing from a 2D channel and binding to a target substance, according to one or more examples of the present disclosure.

FIG. 9 is a detail view of a region outlined in dashed lines in FIG. 8, illustrating synthetic biopolymer specific binding agents 822 (e.g., peptides, aptamers, and/or saccharides) desorbing from the channel 810 and binding to the target substance 820. Portions of the channel 810, the channel surface 811, the substrate 826, and the liquid 818 (including synthetic biopolymer specific binding agents 822 and a target substance 820) are depicted, as described above with reference to FIG. 8.

FIG. 9 also depicts a measurement distance 803 and an electrostatic screening distance 805. The measurement distance 803 and the electrostatic screening distance 805 are indicated by dashed lines at the respective distances from the 2D channel surface 811. For example, the measurement distance 803 is indicated by a dashed line where points on the line are a measurement distance 803 away from the channel surface 811. In FIG. 9, upward and downward pointing arrows above and below the dashed line for the measurement distance 803 indicate that the measurement distance 803 may be increased or decreased based on excitation conditions and/or measurement bandwidth.

The electrostatic screening distance 805, in various examples, may be approximately the same as the measurement distance 803 for steady state or low frequency measurements (e.g., at frequencies under 10 Hz). Under steady-state or low frequency conditions (e.g., if higher-frequency interactions are not excited and/or not measured), output signals may only be detectably affected by aspects or portions of the biochemical interaction occurring near the channel surface 811. For example, in the depicted example, a Donnan equilibrium region is formed by a thin film layer of specific binding agents 822 immobilized to the surface 811 (e.g., formed as a blocking layer 830).

Although higher-frequency excitation and measurement may distinguish faster-moving interactions (or characteristic resonances) outside the Donnan equilibrium region from slower-moving interactions of the immobilized molecules or moieties, output signals for steady-state or low-frequency excitation and measurement may be affected by aspects or portions of the biochemical interaction occurring in the Donnan equilibrium region. Thus, the electrostatic screening distance 805 in the depicted example is based on the thickness of the Donnan equilibrium region, but the measurement distance 803 may be greater than the electrostatic screening distance 805 when the measurement controller 122 applies higher-frequency excitation conditions (e.g., modulating the gate voltage) and/or makes higher-frequency measurements.

In one or more other examples, an ionic double layer may form in the absence of a Donnan equilibrium region (e.g., if a blocking layer 830 is omitted). As in the Donnan equilibrium region, the ions at or near the surface 811 may screen low-frequency interactions occurring further away from the surface from detectably affecting the output signals, and the electrostatic screening distance 805 may be based on the thickness of the ionic double layer. (In some examples, if an ionic double layer and a Donnan equilibrium region both exist, the electrostatic screening distance 805 may be based on which layer or region is thicker).

Thus, as described above for the Donnan equilibrium region, high-frequency measurements may detect events occurring at a measurement distance 803 greater than the electrostatic screening distance 805. Additionally, in some examples, application of changing excitation potentials may move the ions in the double layer, increasing the measurement distance 803 by increasing the double layer thickness as compared to the electrostatic screening distance 805 (e.g., the double layer thickness under steady state or low-frequency excitation conditions).

When a synthetic biopolymer specific binding agent has been designed to stay adsorbed to the surface when binding to the target analyte, the use of excitation frequencies as described herein can be used to evaluate whether the target analyte has bound to the synthetic biopolymer specific binding agent. When also used in conjunction with the physical model, this approach can determine important properties of the analytes bound to the synthetic biopolymer specific binding agent. For example, how the relative capacitance changes with frequency can be used to distinguish targeted binders from non-specific binders. Targeted binders will have a characteristic change in capacitance upon binding which can be used to differentiate from a non-targeted binder. These differences can be made clearer when the capacitance is measured for several frequencies.

When a synthetic biopolymer specific binding agent has been designed to desorb from the surface when binding to the target analyte, application of higher frequency excitation voltages allows for use of multiple triggered desorption layers stacked on top of each other. For example, the lowest layer of synthetic biopolymer specific binding agent could be an RNA sequence designed to be bound and removed by a Cas13 enzyme, while a layer above that could be a DNA sequence designed to be bound and removed by a Cas12 enzyme. In such an example, using a higher frequency excitation voltage allows for evaluation of the DNA section of the sensor by measuring "through" the RNA sequence. Use of static fields, or slowly varying fields can electrostatically or dielectrically move desorbed synthetic biopolymer specific binding agents further from the surface, and can move targeted analytes closer to the surface. In this way, the speed at which a target can repeatedly trigger desorption of binding agents to the surface can be increased.

In some examples, an integrated circuit, such as integrated circuit 101, is configured to detect a sequence-specific interaction between the nucleic acid and a ribonucleoprotein in a sample liquid based on a reduction in thickness of the nucleic acid layer in response to cleavage of the nucleic acid at the target site by the ribonucleoprotein in the sample liquid.

In one or more examples, the immobilized nucleic acid layer is a reporter DNA that contains sites for ribonucleases to bind to, but without sequences specifically designed or expected to trigger enzyme activity. The reporter DNA is linked to the channel via an immobilization layer. A target for detection such as a DNA sequence indicating cancer is used to select a guide RNA for the ribonucleoprotein complex where the ribonucleoprotein includes a Cas enzyme such as for example Cas14 that is selected to cleave the reporter DNA after recognition of the target DNA. In various examples, the Cas enzyme in the ribonucleoprotein cleaves the reporter DNA generally and the cleaved fragments are washed away, thus enabling detection of the recognition interaction of the ribonucleoprotein with the targeted DNA sequence in solution by measuring the reduced thickness of the remaining nucleic acid layer.

Within the liquid 818 (or 120 as depicted in FIG. 7), one synthetic biopolymer specific binding agent 822a (depicted as an aptamer, but may be a peptide or saccharide) may be seen adsorbed to the top surface of the 2D channel. Another synthetic biopolymer specific binding agent 822d may be seen in the process of desorbing from the channel 810, to bind to a nearby molecule of the target substance 820. Ions in the liquid 818 are depicted as circles with a plus or minus sign to indicate the polarity of the ions. Although an actual liquid 818 may include many dissolved ions, a smaller number of ions are depicted to illustrate motion of charges that affect output signals of the 2D FET 806.

In the depicted example, at least one gate bias electrode for biasing and/or measuring electrical characteristics of the liquid 818 is a counter electrode 807, and is operable by the measurement controller 122 to apply a bias between the counter electrode 807 and the top surface 811 of the channel 810 (or multiple top surfaces of multiple channels in a 2D FET array). In the depicted example, the counter electrode 807 is biased positive relative to the channel 810, so that negative ions in the liquid 818 are attracted to the counter electrode 807 and positive ions in the liquid 818 are attracted to the channel surface 811.

In the illustrated example, synthetic biopolymer specific binding agents 822 themselves are depicted as aptamers that single stranded nucleic acid molecules, which are negatively charged in the liquid 818. Thus, in regions of the channel surface 811 that are occupied by synthetic biopolymer specific binding agents 822 that are aptamers, the aptamers are adsorbed to the graphene, but in other regions of the channel surface 811, positive ions from the liquid 818 are attracted to the channel surface 811 due to the bias applied via the counter electrode 807. Negative ions may in turn be attracted to the positive ions forming an ionic double layer at the channel surface 811.

Because various synthetic biopolymer specific binding agents 822 contain negative and positive charges, desorption of a synthetic biopolymer specific binding agents 822b from the channel surface 811 displaces negative charges from the channel surface 811, allowing the double layer to reform under the applied bias with positive ions adjacent to the channel surface 811 in the region where the desorbed synthetic biopolymer specific binding agent 822b had been. This rearrangement of charges near the channel surface 811, replacing negative charges with positive charges, modulates the transconductance of the 2D material (e.g., graphene) and/or other output signals of the 2D FET 806 (e.g., gFET) in ways that can be measured by the measurement controller 122.

Although certain synthetic biopolymer specific binding agents 822, such as aptamers, are depicted as carrying a single negative charge for simplicity in illustration, an aptamer may be negatively charged with as many negative charges as it has nucleotides. Thus, desorption of an aptamer with 40 to 90 nucleotides removes the same number of negative charges from the graphene channel, allowing replacement by a comparable number of positive charges. This large change in charge at the channel surface 811 may produce a strong change in an output signal.

As described above, however, many synthetic biopolymer specific binding agents 822, such as aptamers, peptides, and/or saccharides with high affinity for binding to a target substance 820 in a liquid 818 may be selected to have a high affinity for binding to 2D materials such as graphene Thus, one difficulty associated with using a 2D FET 806 such as gFET to electronically detect a target substance 820 based on binding of synthetic biopolymer specific binding agents 822 such as aptamers to the target substance 820 is being able to select synthetic biopolymer specific binding agents 822 with a higher affinity for binding to the target substance 820 than to the 2D transistor channel 810 or to other non-target substances.

Rather than using time-consuming 3D modeling and testing of all relevant interactions to design synthetic biopolymer specific binding agents 822, the synthetic biopolymer specific binding agents 822 (or candidate molecules that may be used as synthetic biopolymer specific binding agents 822) may be randomly generated and tested, with synthetic biopolymer specific binding agents that have desired characteristics that have been enriched. For synthetic biopolymer specific binding agents such as aptamers, amplification or enrichment may be performed by PCR or other amplification processes such as isothermal amplification, retro-transcription, or in vitro RNA synthesis.

In some examples, a synthetic biopolymer specific binding agent 822 or synthetic biopolymer specific binding agent candidate may be a peptide or a peptide analogue that includes the normal proteinogenic amino acids, D-amino acids, or other non-coded amino or non-proteinogenic amino acids. In some examples, synthetic biopolymer specific binding agents 822 such as peptides or peptide candidates may include a randomly generated sequence of amino acids, flanked at both ends by known sequences that act as prepared binding sites for purification. These known sequences could be peptide tags such as Avi tags or His tags; they could also be DNA sequences.

A randomly generated sequence for a peptide candidate may include 20-60 amino acids, and the known sequences may include five or more amino acids, so that the resulting molecule is 30-100 amino acids long. In some examples, peptides may be modified to include chemical derivatives such as fluorescent tags for optical detection, poly-1-lysine or polyacrylic acid to create a charged environment at certain pHs, or polyethylene glycol to provide a biochemically neutral environment, or pyrene groups to improve binding to the graphene, or others.

In some examples, a synthetic biopolymer specific binding agent 822 or synthetic biopolymer specific binding agent candidate may be an aptamer such as an RNA oligonucleotide or a single stranded DNA oligonucleotide that is selected to specifically bind to a particular target molecule. In such examples, the synthetic biopolymer specific binding agent 822 (e.g., aptamer) or aptamer candidates may include a randomly generated sequence of nucleotides, flanked at both ends by known sequences that act as primer binding sites for PCR or other amplification processes.

The randomly generated sequence for an aptamer candidate may include 20-60 nucleotides, and the known sequences may include at least 10 nucleotides, so that the resulting molecule is 40-100 nucleotides long. In some examples, aptamers may be modified to include nucleotide derivatives such as xeno-nucleic acids, fluorescent nucleic acids, peptide nucleic acids, locked nucleic acids, aptamers that combine nucleic acids and peptides, aptamers that include pyrene groups, or others.

In some examples, a synthetic biopolymer specific binding agent 822 or a synthetic biopolymer specific binding agent candidate may be a saccharide or contain a saccharide core such as glucose, sucrose, or galactose. In certain examples, the synthetic biopolymer specific binding agent is a pure saccharide or a glycoside, where a sugar is bound to some other functional group. In some examples, a synthetic biopolymer specific binding agent 822 or synthetic biopolymer specific binding agent candidate may include saccharides along with a peptide or aptamer component. A saccharide component may be engineered for binding as described for the peptide or aptamer based synthetic biopolymer specific binding agents. A saccharide component can also be a component designed to be cleaved or hydrolyzed by a common enzyme such as glucose oxidase, beta-galactosidase, or another common glycoside hydrolase.

A solution with the target molecule may naturally include or may be spiked to include such an appropriate enzyme at high concentration. In this way, as the target analyte causes the synthetic biopolymer specific binding agent to desorb from the surface, the enzyme creates a secondary signal in addition to releasing the synthetic polymer from the target molecule, allowing it to bind another synthetic biopolymer specific binding agent on the sensor surface. This can be engineered into the synthetic biopolymer specific binding agent by protecting the saccharide section of the synthetic biopolymer specific binding agent from the enzyme as long as it is on the surface, but ensuring that the binding affinity of the enzyme to the saccharide is greater than the binding affinity of the target to the synthetic biopolymer specific binding agent.

Synthetic biopolymer specific binding agent candidates may be tested for desorption from graphene, binding to a target, and non-binding to one or more counter targets (e.g., molecules other than the target, which may or may not be similar to the target). In certain examples, synthetic biopolymer specific binding agents with the desired characteristics may be amplified or otherwise configured for subsequent rounds of testing and amplification, under increasingly selective conditions such as increased buffer stringency, decreased concentration of the target substance, increased concentration of counter targets, or the like. When one or more synthetic biopolymer specific binding agent candidates have been identified as having a desired level of affinity for binding to a target, and a desired level of specificity to the target (e.g., including desorption from graphene and non-binding to counter targets), the identified molecules may be amplified again and adsorbed to a 2D FET 806 as synthetic biopolymer specific binding agents 822.

In some examples, synthetic biopolymer specific binding agents 822 are selected and tested not to bind to at least one counter target. In some examples, counter targets may be molecules or substances similar to the target substance, or may be molecules or substances that are likely to be present in the type of sample liquid used for target detection.

In some examples, synthetic biopolymer specific binding agents 822 are selected and tested to desorb from the top surfaces of channels of the 2D FETs and bind to the target substance 820 in a selected type of liquid. For example, if the sample liquid for target detection is a buffer solution, the liquid used for synthetic biopolymer specific binding agent testing may be the same buffer solution, or a solution of the same buffer tested at increasing concentrations approaching the concentration of the sample liquid. Alternatively, if the sample liquid for target detection is a derived from a biological source such as blood, saliva, urine, sap, or the like, the liquid used for synthetic biopolymer specific binding agent testing may be the same buffer solution may be a similar biologically-derived liquid.

Some synthetic biopolymer specific binding agent selection processes include random generation and iterative testing for affinity to targets and specificity for targets versus counter targets. However, selecting a synthetic biopolymer specific binding agent 822 solely on the basis of tested interaction with targets and counter targets in a bulk solution may result in synthetic biopolymer specific binding agents 822 that do not sufficiently desorb from graphene or that do not have the desired affinity or specificity if the sample liquid 818 differs from the liquid used in testing. Thus, testing synthetic biopolymer specific binding agent candidates for desorption from graphene and/or in a liquid identical or substantially similar to the liquid 818 that will be applied in an assay may produce one or more synthetic biopolymer specific binding agents 822 more suitable for use with a 2D FET 806.

Furthermore, in some examples, the graphene used for testing synthetic biopolymer specific binding agent candidates may be produced similarly to the graphene used in a 2D FET 806 that is a gFET. For example, 2D material surfaces, such as for example, graphene surfaces or $MoS_2$ surfaces for testing may be produced using the same processes used to produce 2D FETs (e.g., gFETs) so that surface impurities and other characteristics are similar, may result in reliable association between the 2D surface and the synthetic biopolymer specific binding agents, such as for example between graphene or molybdenum disulfide and aptamers, peptides, saccharides, and the like.

Additionally, while graphene or other 2D materials in a 2D FET 806 such as a gFET may be localized to just the region of the channel 810, allowing the applied liquid 818 to contact other surfaces such as the substrate 826 away from the channel 810, 2D material such as graphene for synthetic biopolymer specific binding agent selection, such as aptamer selection, may be produced with a larger surface area, so that synthetic biopolymer specific binding agent candidates adsorb to and desorb from the 2D surface (e.g., graphene) without contacting the substrate 826. In some examples, using synthetic biopolymer specific binding agent 822 that have been selected to desorb from a graphene channel 810 allows the synthetic biopolymer specific binding agent 822 to be adsorbed to the 2D surface (e.g., graphene) and used for target detection without any other modification to the synthetic biopolymer specific binding agent 822, or any further linkage chemistry.

One example of a process for testing synthetic biopolymer specific binding agent candidates may include adsorbing randomly generated synthetic biopolymer specific binding agent candidates, or synthetic biopolymer specific binding agent candidates from a previous round of tests, onto a graphene surface. Candidates that do not adsorb to the graphene will be rinsed away and the graphene may then be put in contact with a high concentration of target substance in low binding buffer stringency.

Synthetic biopolymer specific binding agent candidates that desorb from the graphene in this solution are eluted and kept for another round of testing with lower target concentration and higher buffer stringency. These synthetic biopolymer specific binding agent candidates are amplified using PCR or other amplification techniques, and may be adsorbed onto a new 2D channel material surface (e.g., a new graphene surface) before proceeding to another cycle. In certain examples, cycles may be repeated 8 to 15 times to obtain synthetic biopolymer specific binding agents 822 with high affinity for the target and good desorption from the 2D channel.

In another example, after a number of cycles for testing synthetic biopolymer specific binding agent affinity to the target in the absence of graphene, the resulting synthetic biopolymer specific binding agent candidates are divided in several groups. Each group is used to functionalize a different 2D FET. A solution with high concentration of the target substance is in contact with each 2D FET and the output signals are measured. The group that gives the best response when used with a 2D FET is retained, PCR amplified, and divided into sub-groups to repeat the process with new 2D FETs, with decreased target concentration. The cycle of dividing candidates into groups and testing the groups with 2D FETs is repeated multiple times with decreasing target concentration, to obtain synthetic biopolymer specific binding agents 822 with high affinity for the target and good desorption from graphene.

A buffer solution for testing and/or for use as a sample liquid may be an aqueous buffer such as PBA, HEPES or other known buffer, or a non-aqueous buffer including an ionic liquid. Buffer composition, pH and concentration can stay the same across selection cycles or can be adjusted between cycles to increase the stringency of the selection, so that the buffer used for aptamer testing in the last cycle approximates the buffer used for target measurement.

In various examples, amplification of aptamer candidates after a testing cycle may be performed using asymmetric PCR. The use of asymmetric PCR may advantage amplification of the aptamer candidate sequence more than the complementary sequences.

In certain examples, amplification of peptide candidates after a testing cycle requires more steps than aptamer based candidates. Peptide amplification may be performed using peptide sequencing and synthesis. When combined with a section of DNA, PCR based amplification of just the DNA region can be performed to positively identify very small concentrations of peptide candidates.

In some examples, amplification of a saccharide candidate after a testing cycle may require using mass spectrometry or other analytical chemistry techniques. As with peptide based candidates, using a DNA tag to provide a means of chemical amplification via PCR may be performed.

One example of a process for testing synthetic biopolymer specific binding agent candidates for specificity to a target may include testing for synthetic biopolymer specific binding agent that do not readily bind to counter targets. synthetic biopolymer specific binding agent candidates are adsorbing randomly onto a graphene surface, and put in contact with a solution including counter targets. synthetic biopolymer specific binding agent candidates that desorb from the 2D material (e.g., graphene) in this solution are discarded, while the synthetic biopolymer specific binding agent candidates that remain adsorbed to the graphene are kept, desorbed from the graphene by rinsing with a solvent such as dimethylformamide (DMF), dimethyl sulfoxide (DMSO), N-Methyl pyrrolidone (NMP), or one or more similar solvents, and amplified for another round of testing on new 2D channel material, such as for example, graphene with different counter targets, increasing concentration of counter targets, different buffer stringency, or the like. Counterselection cycles may be repeated to obtain synthetic biopolymer specific binding agent 822 that do not readily bond to counter targets.

Figure 10:
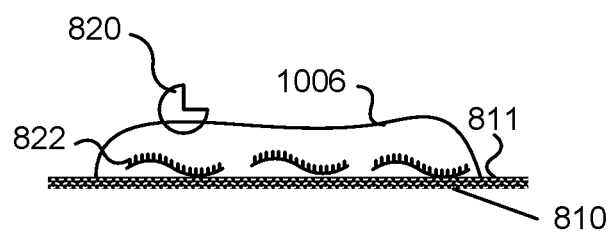
FIG. 10 is a side view illustrating a use of an ionogel with a 2D FET, according to one or more examples of the present disclosure.

FIG. 10 is a side view illustrating a use of an ionogel 1006 with a 2D FET 806, according to one or more examples of the present disclosure. For convenience in depiction, the channel 810 and synthetic biopolymer specific binding agent 822 are depicted in a side view, while other components of a 2D FET 806 are not depicted in FIG. 9. Additionally, although the ionogel 1006 is depicted as covering a portion of the channel 810, some ionogels 1006 may be disposed to cover multiple transistors in a 2D FET array.

In general, a gel may be a liquid, and a cross-linked network (e.g., a network of polymers), that immobilizes the liquid. More specifically, an ionogel 1006 may immobilize an ionic liquid within the ionogel 1006 to channels of 2D FETs. The liquid 818 used for target detection may be the ionic liquid, and the ionogel 1006 may permit transfer of the target substance 820 into the ionic liquid. For example, a touch sensor may allow people to touch the ionogel 1006 with their fingers, and if the target substance (such as an infectious virus) is present on their fingers, it may transfer into the ionic liquid.

An ionic liquid, in various examples, may be a liquid composed largely of ions, such as a salt in the liquid state. By contrast, an aqueous solution may be composed predominantly of polar (but non-ionic) water molecules, with a lower concentration of positive and negative ions from dissociated water molecules and from solute.

Examples of ionic liquids (ILs) include salts, often made by combining a large asymmetrical organic cation with a smaller organic or inorganic anion, that are liquid at room temperature. Ionic liquids can be protic, aprotic or zwitterionic ionic liquids. Various ionic liquids can be tuned or adjusted to have different properties by selecting the appropriate cation and anion couple. For example, an ionic liquid may be selected for solubility of a particular target substance. Example of ion liquid cations include but are not limited to imidazolium, ammonium, pyrrolidinium, pyridinium, tetraalkylammonium, tetraalkylphosphonium, and the like. Examples of ion liquid anions include but are not limited to Cl—, AlCl4—, PF6—, BF4—, NTf2—, DCA-, H3COO—, CH3SO3—, CF3CO2—, CF3SO3—, N(SF3SO2)2— and the like.

Some examples of ILs do not produce vapors, do not evaporate, are non-flammable, and have high thermal stability, making them suitable for use in an ionogel as a liquid/surface interface, for target substances 820 to enter the liquid via the surface of the ionogel 1006. With an ionic liquid embedded in a polymer or silica nanoparticle network to form an ionogel 1006, stability of the ionogel 1006 due to low vapor pressure of the ionic liquid may be considerably greater than for conventional hydrogels, from which water readily evaporates. The surface of the ionogel 1006 may have properties resembling a solid surface, allowing an ionogel to be used as a coating for a durable sensor, while the immobilized ionic liquid allows target substances 820 to diffuse from the surface of the ionogel 1006 to the channel surface 811.

An ionogel 1006 may be formed by gelation of a polymer in presence of ionic liquid. The resulting ionogel 1006 may be applied to a 2D FET by processes such as spin coating. Examples of polymers used to form an ionogel 1006 include poly(styrene-b-ethylene oxide-b-styrene) (SOS),] poly(styrene-b-methyl methacrylate-b-styrene) (SMS), polystyrene-b-poly(ethyl acrylate)-b-polystyrene (SEAS), triblock copolymers and copolymer of vinylidene fluoride and hexafluoropropylene (P(VDF-coHFP).

In some ionogels 1006, where the target substance 820 to be detected is a virus, the ionogel 1006 covering a 2D FET array may be applied to a solid surface such as a door handle or touch screen. The ionic liquid in an ionogel for virus detection may be a protic ionic liquid, such as ethyl ammonium nitrate (EAN). Use of EAN in an ionogel may provide low toxicity in a strong, transparent ionogel, compatible with the use of synthetic biopolymer specific binding agent 822 to bind to target substances 820.

Figure 11A:
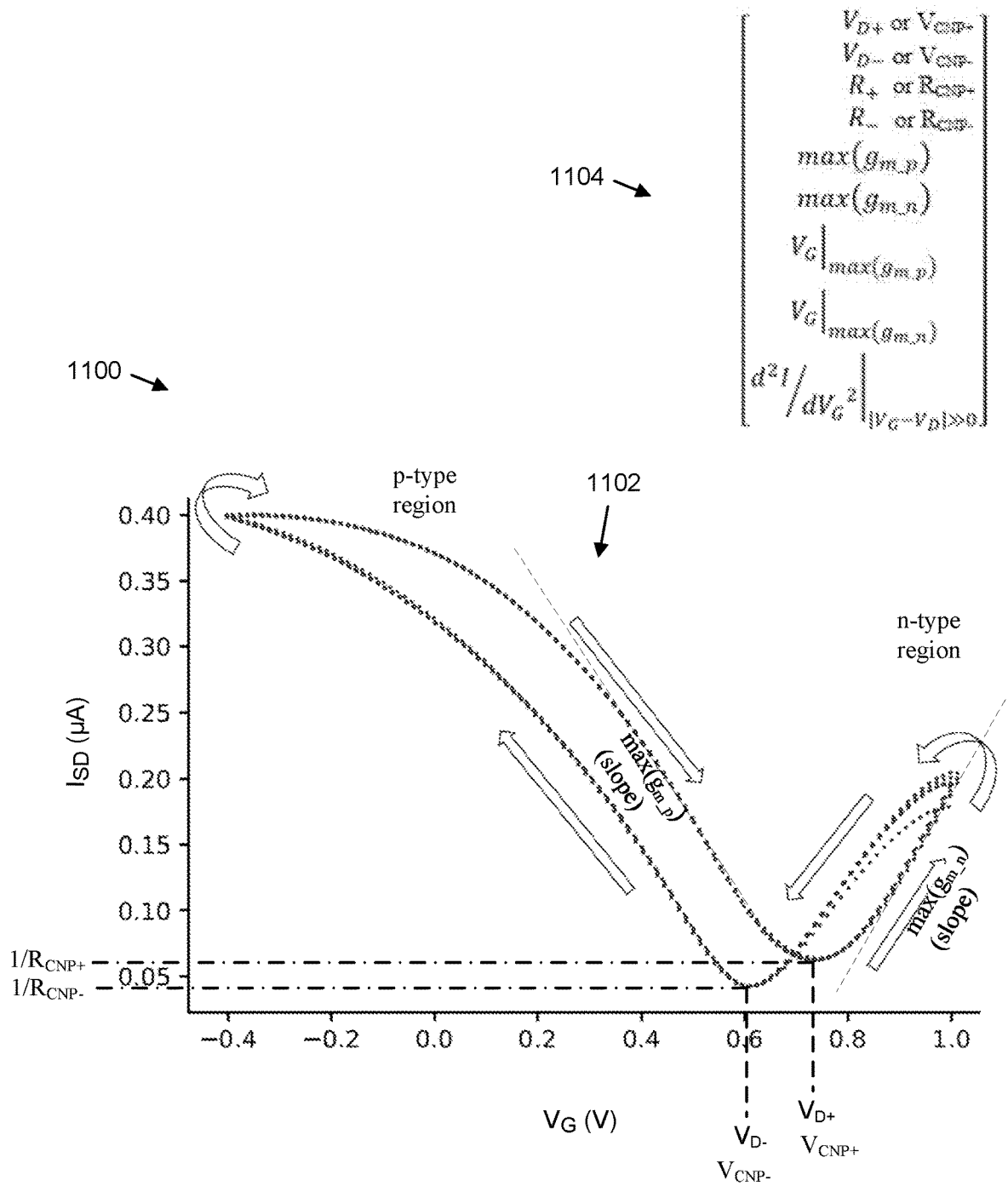
FIG. 11A is a graph illustrating one depiction of a transfer curve for a 2D FET, according to one or more examples of the present disclosure.

FIG. 11A is a graph 1100 illustrating one example of a transfer curve (also sometimes referred to as an I-Vg curve or an Id-Vg curve) for a 2D FET 106 with a graphene channel. In the depicted example, excitation conditions applied by the measurement controller 122 include a constant drain-to-source voltage, and a liquid gate voltage (e.g., applied via a counter electrode and measured at a reference electrode or applied and then measured by a reference electrode) that is swept from a low value to a high value and back, possibly multiple times. Output signals measured by the measurement controller 122 include a drain-to-source current. The graph 1100 depicts the applied gate voltage $V_G$ on the x axis, in volts, and the measured channel current $I_{SD}$ on the y axis, in microamperes. The drain-to-source current $I_{SD}$ exhibits some hysteresis, or dependence on the direction of the sweep of the liquid gate voltage $V_G$. In various examples, use of certain surface chemistries, such as for example, adding pyrene-butyric acid (PBA) to a 2D material such as graphene, will significantly reduce the hysteresis. In that regard, hysteresis may be included as one element of a measurement vectors and may be used, for example, to measure whether the PBA has bound to the graphene. The arrows on the graph 1100 indicate the direction of the liquid gate voltage sweep. The drain current may also be referred to as $I_{SD}$.

It may be observed that the transfer curve 1102 (e.g., an I-V curve) for the 2D FET 106 is generally V-shaped in the depicted example, reflecting a dip in conductivity of the channel as the liquid gate voltage is swept between a voltage that favors electrons as charge carriers and a voltage that favors holes as charge carriers. Additionally, the shape and position of the minimum in the transfer curve can be slightly different when sweeping the liquid gate voltage in an increasing direction than when sweeping the liquid gate voltage in a decreasing direction.

The analysis module 133 may record or track certain parameters such as such as speed and direction (e.g., forward or backward) of the liquid gate voltage sweep. Additionally, the analysis module 133, in various examples, may receive measurements from the measurement controller 122, such as vectors or lists of parameters associated with the transfer curves such as gate voltage and channel current (e.g., points on the I-V graph 1100), and may derive certain quantities from the raw drain-to-source current measurements performed by the measurement controller 122. Such derived quantities for increasing voltage sweeps and/or for decreasing voltage sweeps may include the liquid gate voltage at the bottom of the transfer curve which is the charge neutrality point or "Dirac" voltage, the channel current or channel resistance at the bottom of the transfer curve, the slope of the left and/or right arms of the transfer curve, the curvature (second derivative), or the like.

The analysis module 133 may derive such parameter values or quantities from the measurements separately, e.g., for increasing voltage sweeps and for decreasing voltage sweeps separately. For example, in the graph 1100, the Dirac point for a decreasing voltage sweep is at approximately 0.6 V and a current of 0.05 µA, while the Dirac point for an increasing voltage sweep further right and further up, and a higher gate voltage and channel current. Although the Dirac point is further right for an increasing voltage sweep than for a decreasing voltage sweep in the depicted example, hysteresis may be in an opposite direction in another example, with the Dirac point further to the left for an increasing voltage sweep than for a decreasing voltage sweep.

The analysis module 133, in various examples may track both Dirac points separately and may similarly track other quantity such as the slope of the arms separately for increasing versus decreasing voltage sweeps. Analysis of transfer curves based on increasing and decreasing voltage sweeps provides an additional measurement vector parameter that may, in certain examples, may assist to distinguish target substances. Additionally, in some examples, the analysis module 133 may derive further quantities from the differences between sweeps, such as a current offset, a voltage offset, a difference in slope, or the like, between the transfer curves.

A measurement vector 1104 may include one or more of the following parameters: $V_{CNP}+$ which refers to forward sweep charge neutral point voltage or Dirac voltage measured with an increasing $V_G$; $V_D-$ which refers to reverse sweep charge neutral point voltage or Dirac voltage measured with a decreasing $V_G$; $R_{CNP}+$ which refers to forward sweep resistance at the charge neutral point measured with an increasing $V_G$; $R_{CNP}-$ which refers to forward sweep resistance at the charge neutral point measured with an increasing $V_G$; $\max(g_{m\_p})$ which refers to maximum transconductance (slope) measured in the p-type region of the transfer curve, $\max(g_{m\_n})$ which refers to maximum transconductance (slope) measured in the n-type region of the transfer curve, $V_G|\max(g_{m\_p})$ which refers to the liquid gate voltage at the point of maximum transconductance (slope) in the p-type region; $V_G|\max(g_{m\_n})$ which refers to the liquid gate voltage at the point of maximum transconductance (slope) in the n-type region; and $d^2I/dV_G^2||V_G-V_D|\_\gg 0$ which refers to the second derivative of output current over the liquid gate voltage in the on state.

In various examples, desorption of synthetic biopolymer specific binding agents 822 from the channel 810 may change the transfer curve for a transistor. The measurement controller 122 may apply excitation conditions and measure output signals over time. As synthetic biopolymer specific binding agents 822 (e.g., aptamers, peptides, and/or saccharides) desorb from the channel 810 to bind to target substances 820, derived quantities such as the Dirac point, the slope of the arms of the transfer curve, or the like, may change. The analysis module 133 may derive these quantities from the measurements, and may determine a parameter relating to presence of the target substance 820, such as the presence, absence, or concentration of the target substance 820, based on changes in the derived quantities.

Although the above discussion pertains to measurement of channel current with a swept liquid gate voltage as an excitation, the measurement controller 122 may apply various other or further excitation conditions and measure various other or further output signals, which the analysis module 133 may use as a basis for target substance detection.

Figure 11B:
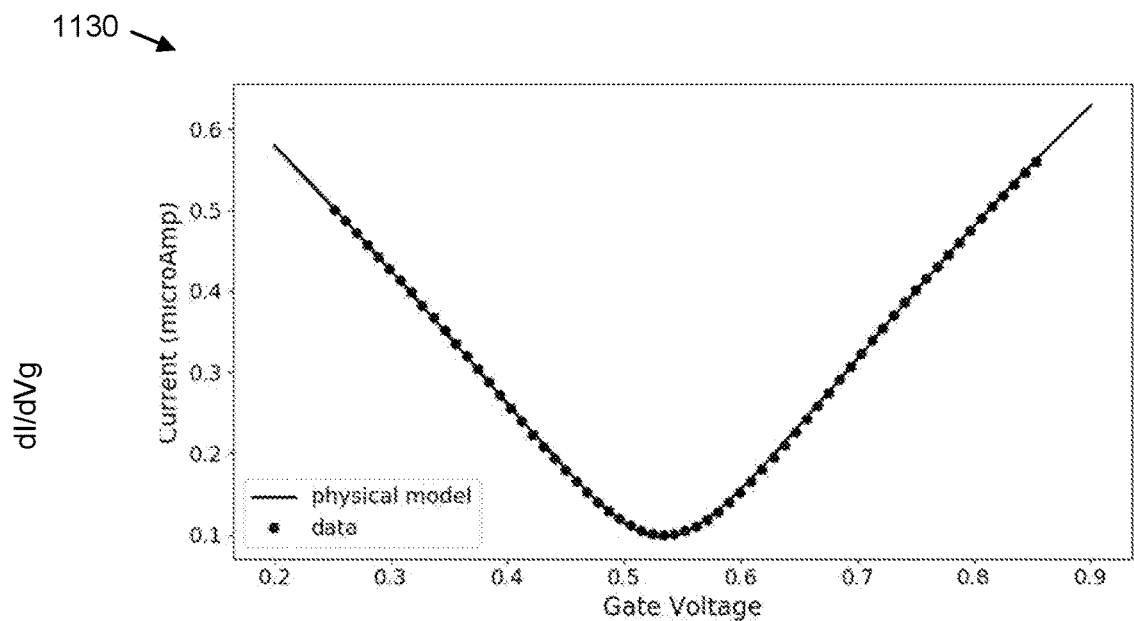
FIG. 11B is a graph comparing transfer curve empirical data for a 2D FET with a transfer curve based on a physical model, according to one or more examples of the present disclosure.

FIG. 11B is a graph 1130 comparing transfer curve empirical data for a 2D FET with a transfer curve based on a physical model, according to one or more examples of the present disclosure. In this example, the data shown is recorded current through a sensor during a sensing measurement. The range of gate voltages applied to the transistor during this measurement is between about 250 and 850 mV. The physical model described has been fit to this data, using the process described herein. The modeled current matches the observed data and enables projected measurements of the current out to a much larger gate voltage range than the gathered data, here between 200 and 900 mV, although even larger ranges are possible. In addition, the modeled current has much better voltage resolution than the gathered raw data. In this case, the gathered data has a resolution of 10 mV, but the modeled data can be used to interpolate current with gate resolution variations of any required precision.

Figure 11C:
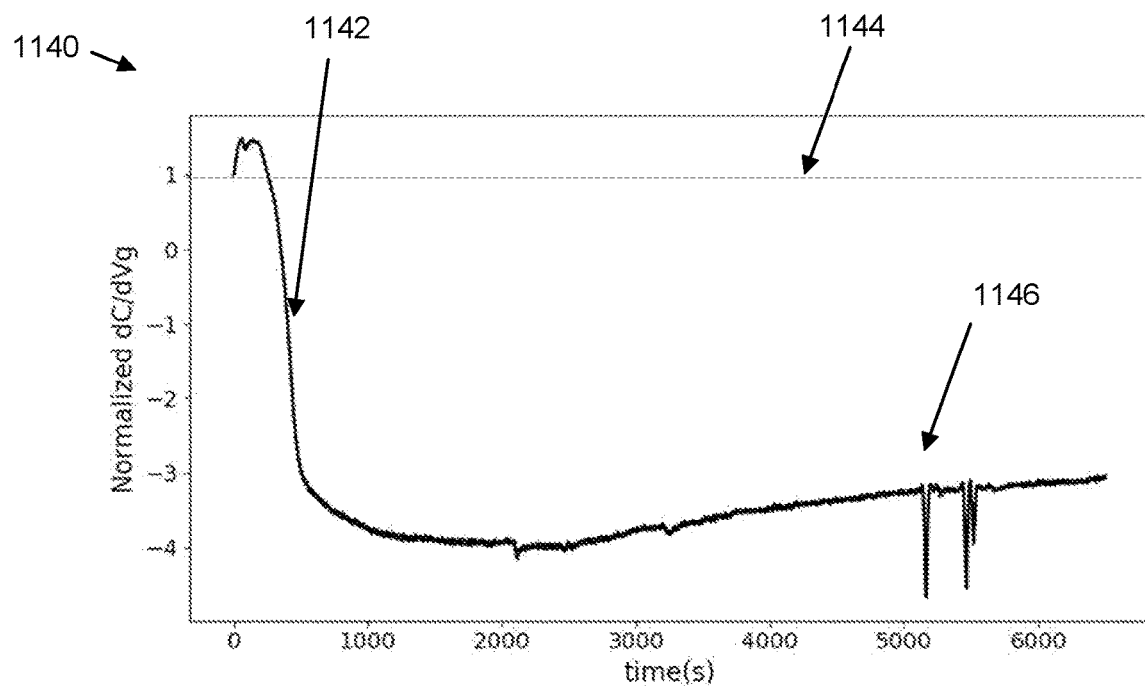
FIG. 11C is a graph depicting a sensing of a binding event measured using a parameter extracted from a physical model of a 2D FET with a thin film of binding agent deposited on the 2D channel of the FET.

FIG. 11C is a graph 1140 depicting a sensing of a binding event measured using a parameter extracted from a physical model of a 2D FET with a thin film of binding agent deposited on the 2D channel of the FET. The parameter extracted here is the part of the capacitance which is sensitive to the applied gate voltage. This value has been normalized so that the starting value is one. This has been done here to simplify the units. FIG. 11C shows actual sensing data. From the initial baseline 1144 level of about one, the sensor briefly increases before a solution containing the target analyte is added, leading to a very clear and large sensing response 1142. Later rinses with buffers cause no appreciable sensing response, other than some noise caused by temporary drying of the chip during a series of pipette actions 1146.

Figure 11D:
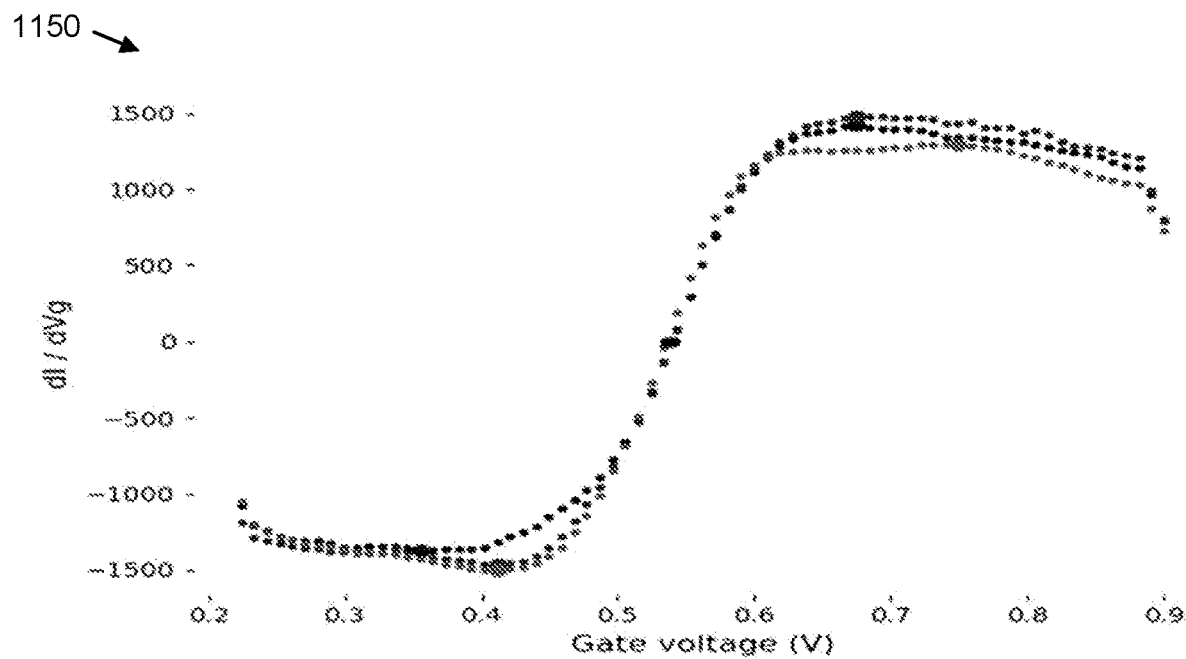
FIG. 11D is a graph illustrating first derivatives of transfer curves of 2D FETs with thin film layers of different binding agents.

FIG. 11D is a graph 1150 illustrating first derivatives of transfer curves of 2D FETs with thin film layers of different binding agents.

Figure 11E:
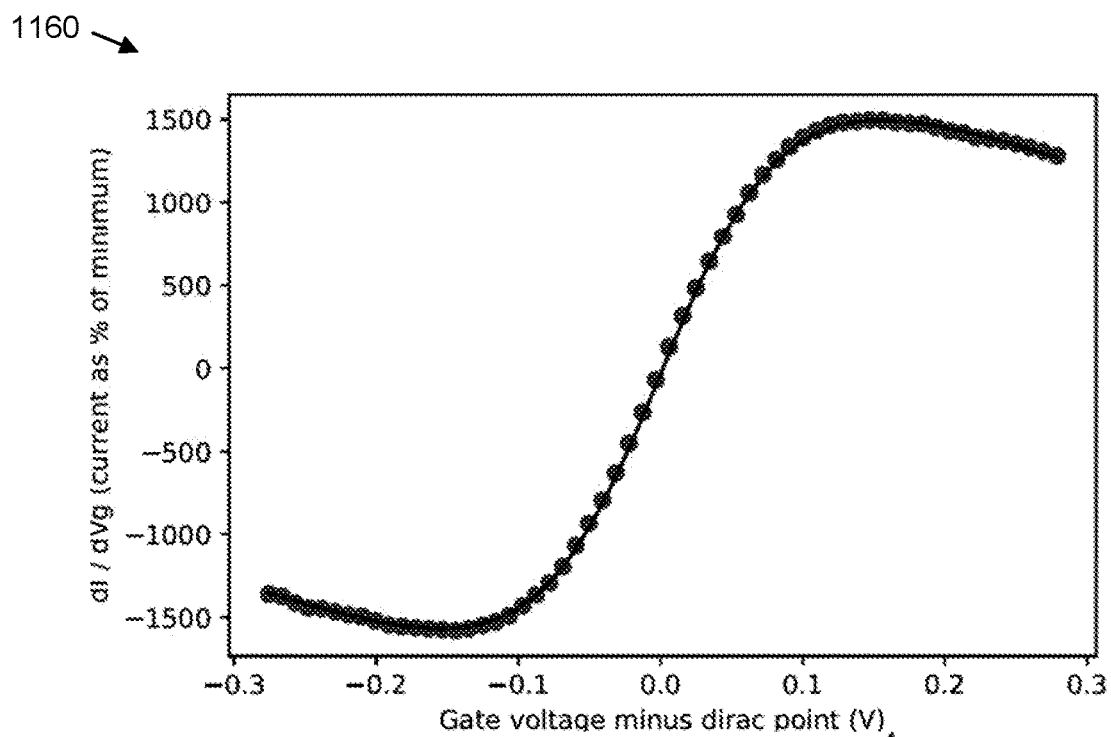
FIG. 11E is a graph illustrating the first derivative of a transfer curve for a 2D FET and an equation that models the first derivative of the transfer curve, according to one or more examples of the present disclosure.

FIG. 11E is a graph 1160 illustrating the first derivative of a transfer curve for a 2D FET and an equation 1162 that models the first derivative of the transfer curve, according to one or more examples of the present disclosure.

FIG. 12 is a schematic block diagram illustrating one example of an apparatus 1200 for direct or indirect target substance signal measurement, including one example of a measurement controller 122. In the depicted example, the measurement controller 122 includes excitation circuitry 1202 and measurement circuitry 1204. Certain components indicated by dashed lines in FIG. 12 are included in the depicted example, but may be omitted in certain examples. In the depicted example, the measurement controller 122 includes an analysis module 133, temperature control circuitry 814, one or more fluidic devices 816, and communication circuitry 1206. As depicted in FIG. 7, the excitation circuit and/or the measurement circuitry may include feedback circuitry 124 and/or bias circuitry 126 for controlling and/or measuring $I$-$V_G$ transfer curves and associated measurement vectors. The measurement controller 122, analysis module 133, temperature control circuitry 814, and fluidic device(s) 816 in the depicted example may be substantially as described above with reference to previous Figures.

In various examples, the measurement controller 122 may use excitation circuitry 1202 to apply excitation conditions to a 2D FET 106, and may use measurement circuitry 1204 to perform one or more measurements of at least one of the one or more output signals from the 2D FET 106. The output signal(s) may be affected by the excitation conditions, and by desorption of synthetic biopolymer specific binding agents 822 from the channel surface.

In various examples, the measurement controller 122 may include an analysis module 133 to determine a parameter relating to the presence of the target substance, based on the one or more measurements from the measurement circuitry 1204. In some examples, an analysis module 133 is not included in the measurement controller 122. For example, in one or more examples, an analysis module 133 may be implemented by a computing device 114 separate from the measurement controller 122. In some examples, the measurement controller 122 may include communication circuitry 1206 to transmit the measurements from the measurement circuitry 1204, or information based on the measurements, to a remote data repository 125.

The excitation circuitry 1202, in the depicted example, is operable to apply one or more excitation conditions to a 2D FET 106, or a set of 2D FETs 106. An excitation condition, in various examples, may be a physical, chemical, or electrical condition applied to 2D FET 106, such as a voltage, amplitude, frequency, amplitude, phase, a light, or waveform for an electrical or electrochemical excitation, a temperature, a liquid flow rate, or the like. Excitation circuitry 1202 may be any circuitry that applies, modifies, removes, or otherwise controls one or more excitation conditions.

In some examples, excitation such as light, heat, electromagnetic energy or other forms of excitation may be precisely and/or individually programmed to be applied to one or more specific 2D FETs 106 to mediate, stimulate, diminish, propel, repel, mix, modulate, or otherwise control biochemical components and interactions in proximity to the excitation source and the corresponding transistor(s).

In various examples, excitation conditions may include one or more electrical signals applied to a 2D FET 106 (or electrochemical potentials applied to the liquid), such as constant-voltage biases or time-varying excitation signals. Excitation circuitry 1202 may produce biases or other excitation signals or couple them to the 2D FET 106 (e.g., via a source 212, drain 202, or counter electrode 207). Accordingly, in various examples, excitation circuitry 1202 may include any circuitry capable of generating or modulating biases or excitation signals, such as power supplies, voltage sources, current sources, oscillators, amplifiers, function generators, bias tees (e.g., to add a DC offset to an oscillating waveform), a processor executing code to control input/output pins, signal generation portions of source measure units, lock-in amplifiers, network analyzers, chemical impedance analyzers, or the like. Excitation circuitry 1202 in various other or further examples may include various other or further circuitry for creating and applying programmable biases.

In some examples, excitation conditions may include a temperature for the liquid 120 applied to a 2D FET 106, and excitation circuitry 1202 may use temperature control circuitry 814 to control the temperature. Controlling the temperature, in various examples, may include increasing or decreasing the temperature (e.g., to detect or analyze temperature-sensitive aspects of a biochemical interaction) maintaining a temperature in a range or near a target temperature, monitoring temperature for feedback-based control, or the like.

Thus, as described above, temperature control circuitry 814 may include any circuitry capable of changing the temperature of the liquid 120 and/or the 2D FET 106. For example, in various examples, temperature control circuitry 814 may include a resistive heater, a Joule heating controller to control current in a resistive heater (or in the channel 210 itself), a solid-state heat pump, a thermistor, or the like. Temperature control circuitry 814 in various other or further examples may include various other or further circuitry for controlling or measuring a temperature.

Additionally, in certain examples, excitation circuitry 1202 may include other or further circuitry, for applying excitation conditions other than or in addition to electrical signals and/or temperature. For example, excitation circuitry 1202 may include electromagnets for magnetic excitation, light emitters of any desired wavelength, radioactive sources, emitters of ultraviolet light, x-rays, gamma rays, electron beams, or the like, ultrasonic transducers, mechanical agitators, or the like. The measurement chips shown in FIGS. 3-7 represent examples of integrated circuit apparatuses and systems described herein, which may be manufactured at least in part by Rogue Valley Microdevices, of Medford Oregon, using microelectronic and microelectromechanical systems (MEMS) manufacturing processes.

Many of the types of excitation circuitry can be produced side-by-side with 2D FETs using the same manufacturing tools and very similar processes. Combining 2D FETs with these other types of circuitry is enabled, at least in part, using processes, methods, designs, and manufacturing steps described above or included in incorporated reference. Various other or further types of excitation circuitry 1202 may be used to apply various other or further excitation conditions.

As described above, one or more output signals for a 2D FET 106 may be affected by or sensitive to desorption of synthetic biopolymer specific binding agents 822 from a channel surface 811. Where increasing numbers of synthetic biopolymer specific binding agents 822 may bind to target substances 820 over an incubation time, desorption of the synthetic biopolymer specific binding agents 822 to bind to target substances 820 may be measured by a change in output signals.

As a simple example, with excitation conditions that include a constant drain-to-source bias voltage, desorption of synthetic biopolymer specific binding agents 822 from the channel surface 811 may affect an output signal, such as a drain-to-source current, a capacitance of an ionic double layer formed at the channel surface 811 (e.g., as measured between the drain 202 and the reference electrode 208), or the like.

Various output signals that may be affected by the desorption of synthetic biopolymer specific binding agents 822, and measured, may include a complex resistance (e.g., impedance) of the channel 210, electrical current through the channel 210, voltage drop across the channel 210, coupling between the channel 210 and the liquid gate (e.g., biased and/or measured via a counter electrode 207 and/or a reference electrode 208), electrical (channel) and/or electrochemical (liquid gate) voltages, currents, resistances, capacitances, inductances, complex impedances, network parameters (e.g., S-parameters or h-parameters determined using a network analyzer), a Dirac voltage (e.g., a liquid gate voltage that minimizes channel current in a 2D channel 210 such as graphene), charge carrier mobility, contact resistance, kinetic inductance, a spectrum based on multiple measurements such as a power spectral density, an electrical impedance spectrum, an electrochemical impedance spectrum, or the like.

Because certain output signals from various instances of the 2D FET 106 may be affected by the desorption of synthetic biopolymer specific binding agents 822 from the channel surface 811 to bind to target substances 820, information pertaining to the presence of the target substance can be obtained by measuring one or more of the affected output signals. Thus, in various examples, the measurement circuitry 1204 may be operable to perform one or more measurements of the affected output signals. For example, the measurement circuitry 1204 may measure initial and final output signals, output signals for the liquid and for a control liquid, or the like. Additionally, in some examples, the measurement circuitry 1204 may be operable to perform a plurality of time-dependent measurements of one or more of the affected output signals. In various examples, the rate at which the affected output signals properties change may indicate a level or concentration of the target substance in the liquid. In some examples, the sensitivity of the measurement controller 122 may be increased by increasing the length of time between initial and final measurements of the affected output signals.

Measurement circuitry 1204, in various examples, may include any circuitry capable of performing measurements of one or more output signals. For example, in some examples, measurement circuitry 1204 may include preamplifiers, amplifiers, filters, voltage followers, data acquisition (DAQ) devices or boards, sensor or transducer circuitry, signal conditioning circuitry, an analog-to-digital converter, a processor executing code to receive and process signals via input/output pins, measurement portions of source measure units, lock-in amplifiers, network analyzers, chemical impedance analyzers, or the like. Measurement circuitry 1204 in various other or further examples may include various other or further circuitry for performing measurements of output signals.

In the depicted example, the measurement circuitry 1204 includes circuitry for performing electrical measurements. Electrical measurements may be measurements of electrical and/or electrochemical output signals. For example, in various examples, electrical output signals may be measured via the source 212 and drain 202 terminals of a 2D FET 106. In certain examples, the measurements include measurements of an electrochemical potential of the liquid 120 via a reference electrode 208 of the 2D FET 106.

On a 2D FET 106, a double layer formed by ions in the liquid or an optionally added sensitization layer between the graphene channel and the bulk liquid that acts as an effective gate dielectric. One example of a useful sensitization layer for detection and/or analysis of target substances is an ion-permeable layer with a net charge, so that ions from the liquid may diffuse into the ion-permeable layer of immobilized molecules or moieties due to the Gibbs-Donnan effect, forming a Donnan equilibrium region.

Certain examples of a type of sensitization layer include an insulating coating such as a double layer membrane with membrane proteins, ion channels, or synthetic analogs of such incorporated into it. These membrane embedded proteins enable control the flow of charge across the insulating layer and thus control the gate field in the transistor.

A further example type of sensitization layer is an inorganic filter, such as an aluminum oxide membrane, that can be made to have uniform pore sizes that match the size of a specific target substance. This sensitization layer would enable smaller molecules to diffuse in and out of the region near the graphene, and would prevent larger structures such as cells from approaching the graphene, but would encourage targeted sizes of target substances to approach and associate with the graphene surface.

Measurement circuitry 1204 may monitor the current through the graphene channel, while excitation circuitry 1202 applies a varying or constant voltage to the liquid gate. The effect of the electric field from the liquid gate is changed by the presence or desorption of synthetic biopolymer specific binding agents 822 from the channel in the effective gate dielectric region. Desorption of synthetic biopolymer specific binding agents 822 from the channel surface may cause a change such as an increase or decrease in current, a change in capacitance between the channel (or other surface) and the liquid, or a change in the effective gate potential experienced by the graphene (which is equivalent to a shift in the Dirac Voltage). The specific responses depend on the charge and hydrophobicity of the synthetic biopolymer specific binding agents, the effective doping of the channel or other surface, and the properties of the liquid. All of this can be done simultaneously by monitoring the channel current in coordination with the applied liquid gate voltage.

Similarly, a surface of a working electrode in an electrochemical system may be used in place of the channel of a 2D FET 106. A working electrode for the electrochemical system may be metal film, a graphite surface, a piece of graphene, or the like. A counter electrode and reference electrode to control and measure the electrochemical potential in the liquid may be provided, as described above. In this measurement, excitation circuitry 1202 may apply a voltage between the liquid and the working electrode with a frequency that varies over time. For example, the frequency may be varied over time to move between 0.1 Hz and 1 MHz The measurement circuitry 1204 may measure the complex impedance between the working electrode and the liquid, and the capacitance and resistance between the working electrode and the liquid can be calculated. The capacitance between the working electrode and the liquid may change with increasing desorption of synthetic biopolymer specific binding agents from the surface of the graphene. This is similar to using a 2D FET 106, but with a less complex sensor.

In various examples, portions or components of excitation circuitry 1202 and/or measurement circuitry 1204 may be disposed in an integrated circuit 101, a chip reader 102, or in a separate device (e.g., lab bench test and measurement equipment) coupled to the integrated circuit 101. For example, single-use components such as a resistive heater component for excitation circuitry 1202 may be disposed on an integrated circuit 101, while multi-use components such a digital signal processing circuitry for generating or analyzing complex waveforms may be disposed in a chip reader 102. Various other ways to dispose or arrange portions or components of excitation circuitry 1202 and/or measurement circuitry 1204 may be used in various other examples.

The analysis module 133, in some examples, is operable to determine one or more parameters relating to the presence of the target substance, or to desorption of synthetic biopolymer specific binding agents 822 from the channel, based on the one or more measurements performed by the measurement circuitry 1204. Such a parameter may include an indication of whether or not the target substance 820 is present in the liquid 818, a concentration of the target substance 820, another parameter corresponding to or related to a concentration, an indication of whether or not (or to what extent) synthetic biopolymer specific binding agents 822 were desorbed from the channel surface, a determination of the rate of desorption, or the like.

In various examples, an analysis module 133 may use various methods, including known quantitative analysis methods to determine one or more parameters relating to the presence of the target substance, based on the one or more measurements. Results from the analysis module 133, such as parameters characterized by the analysis module 133, may be communicated to a user directly via a display or printout (e.g., from the chip reader 102), transmitted to a user via data network 121, saved to a storage medium (e.g., in remote data repository 125) for later access by one or more users, or the like.

In certain examples, an analysis module 133 may be separate from the measurement controller 122. For example, an analysis module 133 may be implemented by a computing device 114 separate from the measurement controller 122. Thus, in some examples, a measurement controller 122 may include communication circuitry 1206, instead of or in addition to an analysis module 133. Communication circuitry 1206, in the depicted example, is operable to transmit information to a remote data repository 125. The communication circuitry 1206 may transmit information via the data network 121, and may include components for data transmission (and possibly reception), such as a network interface controller (NIC) for communicating over an ethernet or Wi-Fi network, a transceiver for communicating over a mobile data network, or the like. Various other or further components for transmitting data may be included in communication circuitry 1206 in various other or further examples.

In various examples, the information transmitted by the communication circuitry 1206 to the remote data repository 125 may be information based on the measurements performed by the measurement circuitry 1204. Information based on the measurements may be the measurements themselves (e.g., raw samples), calculated information based on the measurements (e.g., spectra calculated from the raw data), and/or analysis results (e.g., a determined parameter) from the analysis module 133. In a further example, an analysis module 133 may be in communication with the remote data repository 125 (e.g., via the data network 121).

An analysis module 133 may be operable to characterize one or more parameters based on the information transmitted to the remote data repository 125. For example, instead of the analysis module 133 receiving measurements directly from the measurement circuitry 1204, the communication circuitry 1206 may transmit measurements (or information about the measurements) to the remote data repository 125, and the analysis module 133 may retrieve the measurements (or information about the measurements) from the remote data repository 125.

In certain examples, storing data in a remote data repository 125 may allow information to be aggregated from multiple measurement controllers 122 for remote analysis of phenomena that may not be apparent from a single measurement controller 122. For example, for epidemiology purposes, a measurement controller 122 may determine whether a person is infected with a disease based on a biochemical interaction involving viruses, antibodies, DNA or RNA from a pathogen, or the like, in a liquid 120 obtained from the person, which may include a sample of blood, saliva, mucus, cerebrospinal liquid, stool, or the like. Information uploaded to a remote data repository 125 from multiple measurement controllers 122 may be used to determine aggregate characteristics, such as how infection rates differ in different geographical regions. In various examples, an analysis module 133 may implement various other or further ways of using aggregate information from multiple measurement controllers 122.

The measurement controller 122, in various examples, may use excitation circuitry 1202, measurement circuitry 1204, and an analysis module 133 together in various ways with one or more 2D FETs 106a, 106b to determine or characterize parameters relating to the presence of the target substance. In some examples, multiple 2D FETs, may be homogeneously configured (e.g., for redundancy) or heterogeneously configured (e.g., with channel surfaces 811 functionalized in different ways to characterize different aspects of a biochemical interaction).

In various examples, excitation circuitry 1202 and measurement circuitry 1204 may perform a control measurement in parallel with analyte measurement made using a first graphene field effect transistor. For example, the control measurement may be made with a second graphene field effect transistor provided in an integrated circuit 101, with a non-reactive biomolecule blocking layer or a control liquid such as water instead of the liquid 120. The excitation circuitry 1202 and the measurement circuitry 1204 may apply excitations and perform measurements for both 2D FETs 106 in parallel, and the control measurements from the second 2D FET 106 may be subtracted from the measurements from the first 2D FET 106 prior to analysis by the analysis module 133.

In certain examples, the excitation circuitry 1202 and the measurement circuitry 1204 may apply excitation conditions and perform measurements for multiple 2D FETs 106 with varied conditions. For example, versions of the enzyme or experimental conditions such as buffer composition and temperature may be varied across multiple 2D FETs 106, and the rate of synthetic biopolymer specific binding agent desorption (or other parameters relating to synthetic biopolymer specific binding agent desorption or to presence of the target substance) may be determined and compared. Such a comparison may be an easy way to improve experimental conditions with rapid feedback.

Figure 13:
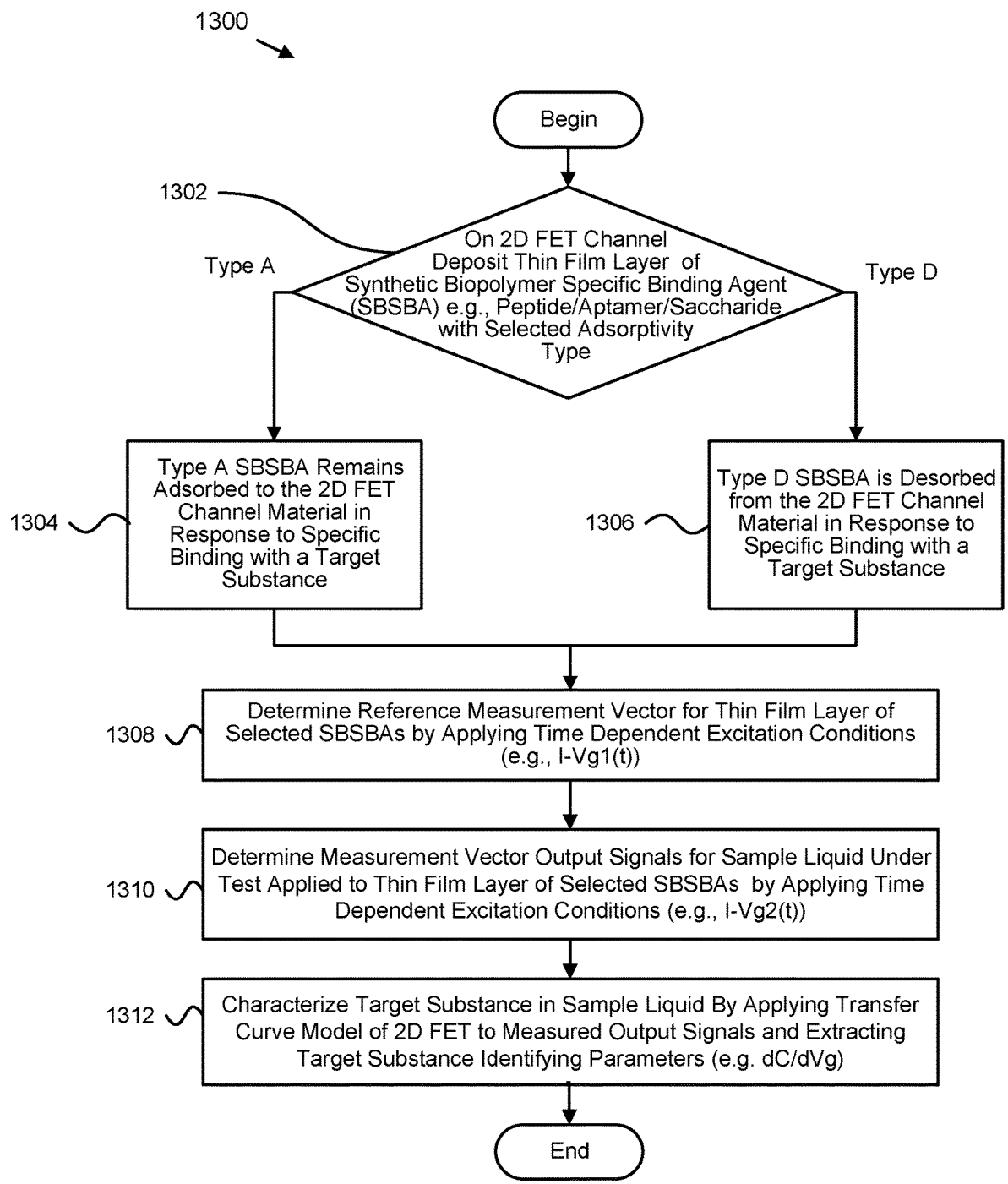
FIG. 13 is a schematic flow chart diagram illustrating a method for selecting synthetic biopolymer specific binding agents, in a selection cycle.

FIG. 13 is a schematic flow chart diagram illustrating a method 1300 for characterizing a target substance in a sample liquid in a 2D FET with a thin film layer of synthetic biopolymer specific binding agents selected based on absorptivity type according to one or more examples of the present disclosure.

In various examples, the method 1300 begins and includes depositing 1302 on a channel of a 2D FET, a thin film layer of a synthetic biopolymer specific binding agent for a target substance in a sample liquid, the synthetic biopolymer specific binding agent selected based on absorptivity type chosen from: a type A absorptivity 1304 wherein the synthetic biopolymer specific binding agent is selected to remain adsorbed the channel of the 2D FET in response to biochemical interactions, such as for example binding activity, with a target substance; and a type D absorptivity 1306 wherein the synthetic biopolymer specific binding agent is selected to desorb from the channel of the 2D FET in response to biochemical interactions, such as for example binding activity, with a target substance.

The method 1300 continues and includes determining 1308 a reference measurement vector (such as the measurement vector 1104 described above with respect to FIG. 11A) of 2D FET parameters based on measuring a 2D output current versus liquid gate voltage for the selected thin film layer of a synthetic biopolymer specific binding agent in a reference liquid that lacks the target substance by applying time dependent excitation conditions to the reference liquid.

It may be noted that the measurement vector may include fewer parameters than listed or more parameters than listed. It may also be noted that as described below, certain parameters useful to characterize the response to binding activity between a selected synthetic biopolymer specific binding agent and a particular target analyte may be derived from the measurement vector parameters by applying a physical model of the 2D FET to the measurement vector data.

In one or more examples, the method 1300 continues and includes determining 1310 a measurement vector of 2D FET output signals versus liquid gate voltage for the selected thin film layer of a synthetic biopolymer specific binding agent in the sample liquid (e.g., being tested for a particular target substance) by applying the time dependent excitation conditions to the sample liquid.

The method 1300, according to one or more examples, continues and includes characterizing 1312 the target substance in the sample liquid by applying a transfer curve model of the 2D FET to the measured output signal and extracting parameters usable to identify the target substance. For example, as depicted in FIG. 11C, a steep drop in the change of capacitance relative the change in liquid gate voltage $V_G$ (as measured by the reference electrode) may be used to identify binding activity between a selected synthetic biopolymer specific binding agent (adsorbed to or desorbed from the 2D channel) and target substance. As explained with respect to FIG. 11C, a graph of the relevant parameters taken over time may vary with the particular synthetic biopolymer specific binding agent selected (Type A-remains adsorbed to 2D channel in response to biochemical interactions, such as for example binding activity, with a target substance, type D-desorbs from 2D channel in response to biochemical interactions, such as for example binding activity, with a target substance).

Figure 14:
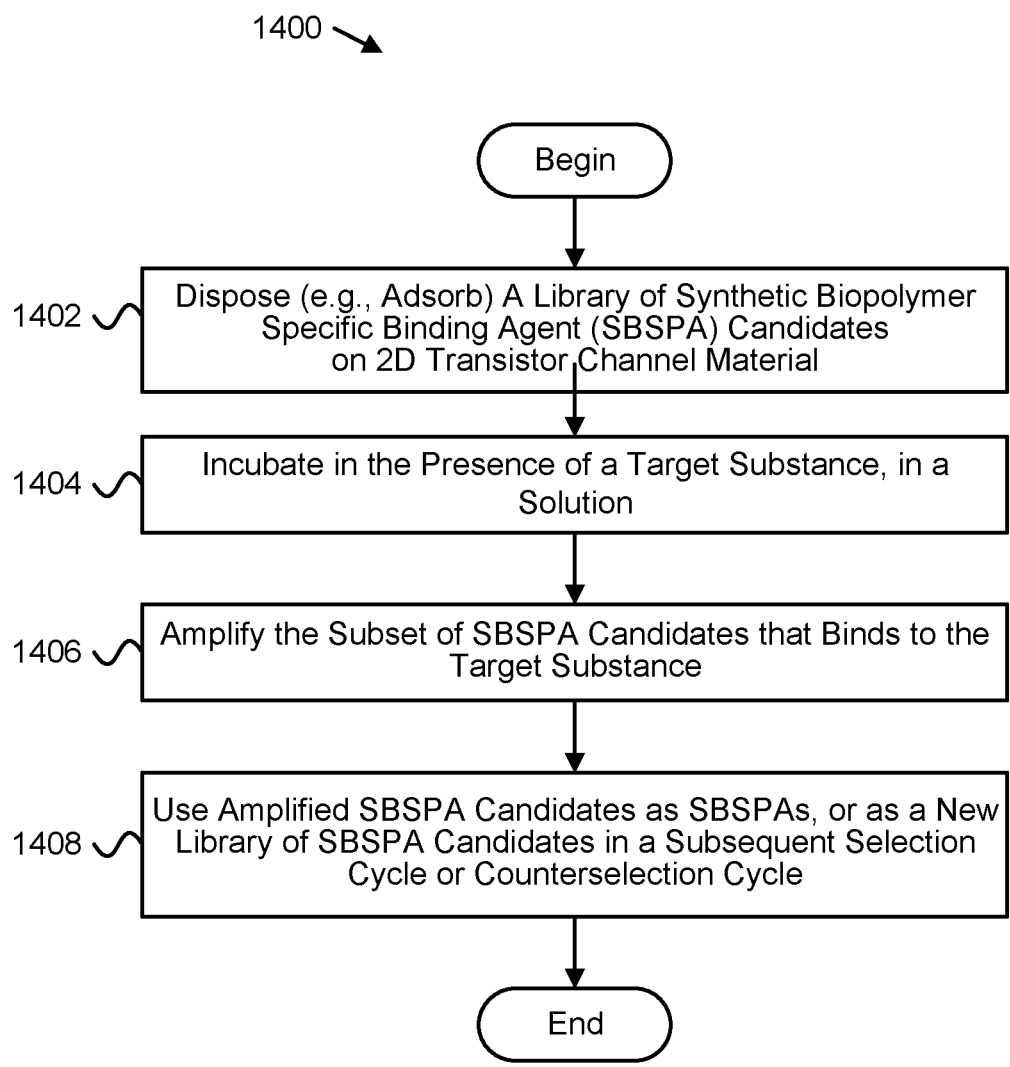
FIG. 14 is a schematic flow chart diagram illustrating a method for selecting synthetic biopolymer specific binding agents, in a selection cycle.

FIG. 14 is a schematic flow chart diagram illustrating one example of a method 1400 for selecting synthetic biopolymer specific binding agents, in a selection cycle. The method 1400 begins with adsorbing 1402 a library of synthetic biopolymer specific binding agent candidates to new 2D transistor channel material, such as graphene for a graphene channel of a gFET. The 2D transistor channel material is incubated 1404 in the presence of a target substance 820 in a solution, so that a subset of the synthetic biopolymer specific binding agent candidates desorb from the 2D transistor channel material and bind to the target substance 820. The resulting subset of synthetic biopolymer specific binding agent candidates is amplified 1406, and used 1408 as synthetic biopolymer specific binding agents 822 with a 2D FET, or as a new library of synthetic biopolymer specific binding agent candidates in a subsequent selection cycle (e.g., repeating the method 1400) or counterselection cycle.

Figure 15:
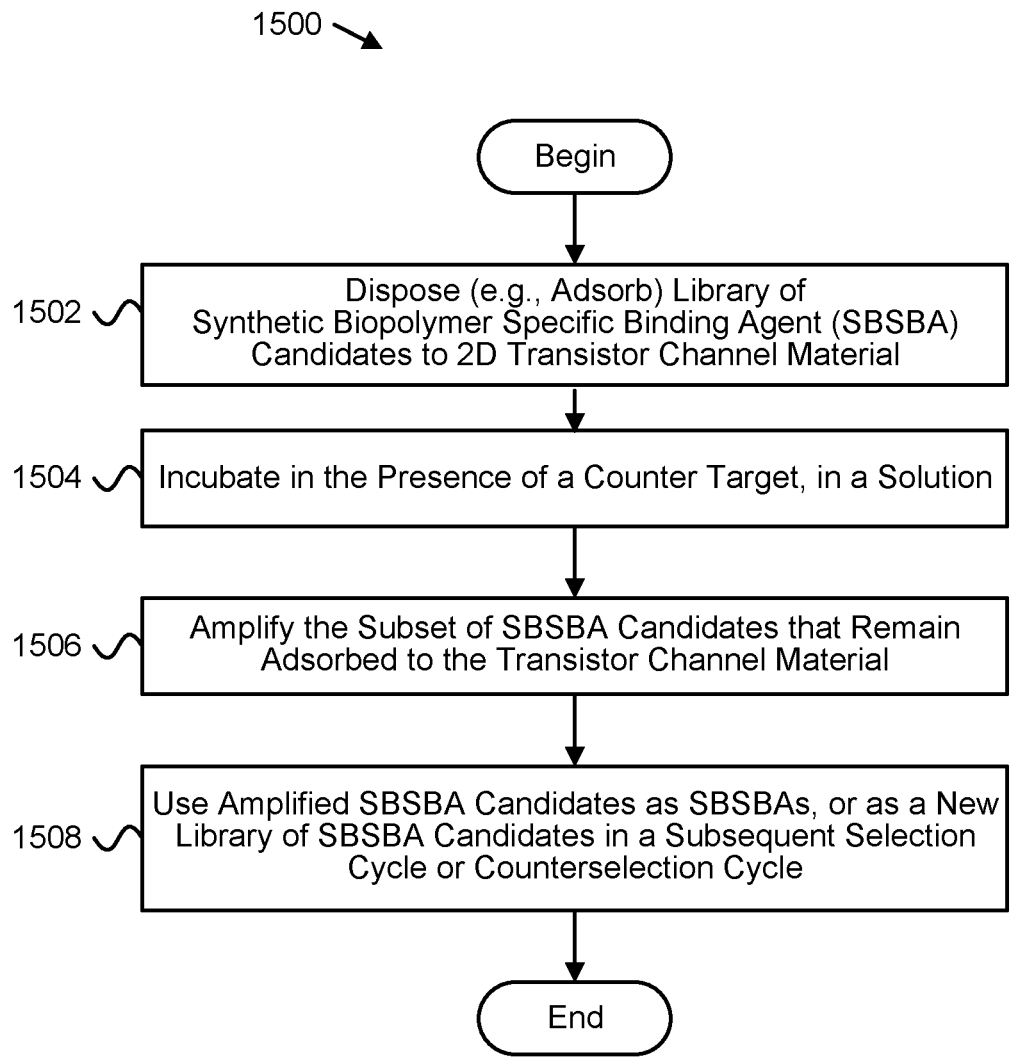
FIG. 15 is a schematic flow chart diagram illustrating a method for selecting synthetic biopolymer specific binding agents, in a counterselection cycle.

FIG. 15 is a schematic flow chart diagram illustrating one example of a method 1500 for selecting synthetic biopolymer specific binding agents, in a counterselection cycle. The method 1500 begins with adsorbing 1502 a library of synthetic biopolymer specific binding agent candidates to new 2D transistor channel material, such as graphene for a graphene channel of a gFET. The 2D transistor channel material is incubated 1504 in the presence of a counter target in a solution, such that a first subset of the synthetic biopolymer specific binding agent candidates desorb from the 2D transistor channel material and bind to the counter target, and a second subset of the synthetic biopolymer specific binding agent candidates remain adsorbed to the 2D transistor channel material. The first subset of synthetic biopolymer specific binding agent candidates, which bound to the counter target, may be discarded. The second subset of synthetic biopolymer specific binding agent candidates, which did not bind to the counter target, may then be desorbed from the graphene, amplified 1506, and used 1508 as synthetic biopolymer specific binding agents or as a new library of synthetic biopolymer specific binding agent candidates in a subsequent selection cycle or counterselection cycle.

Figure 16:
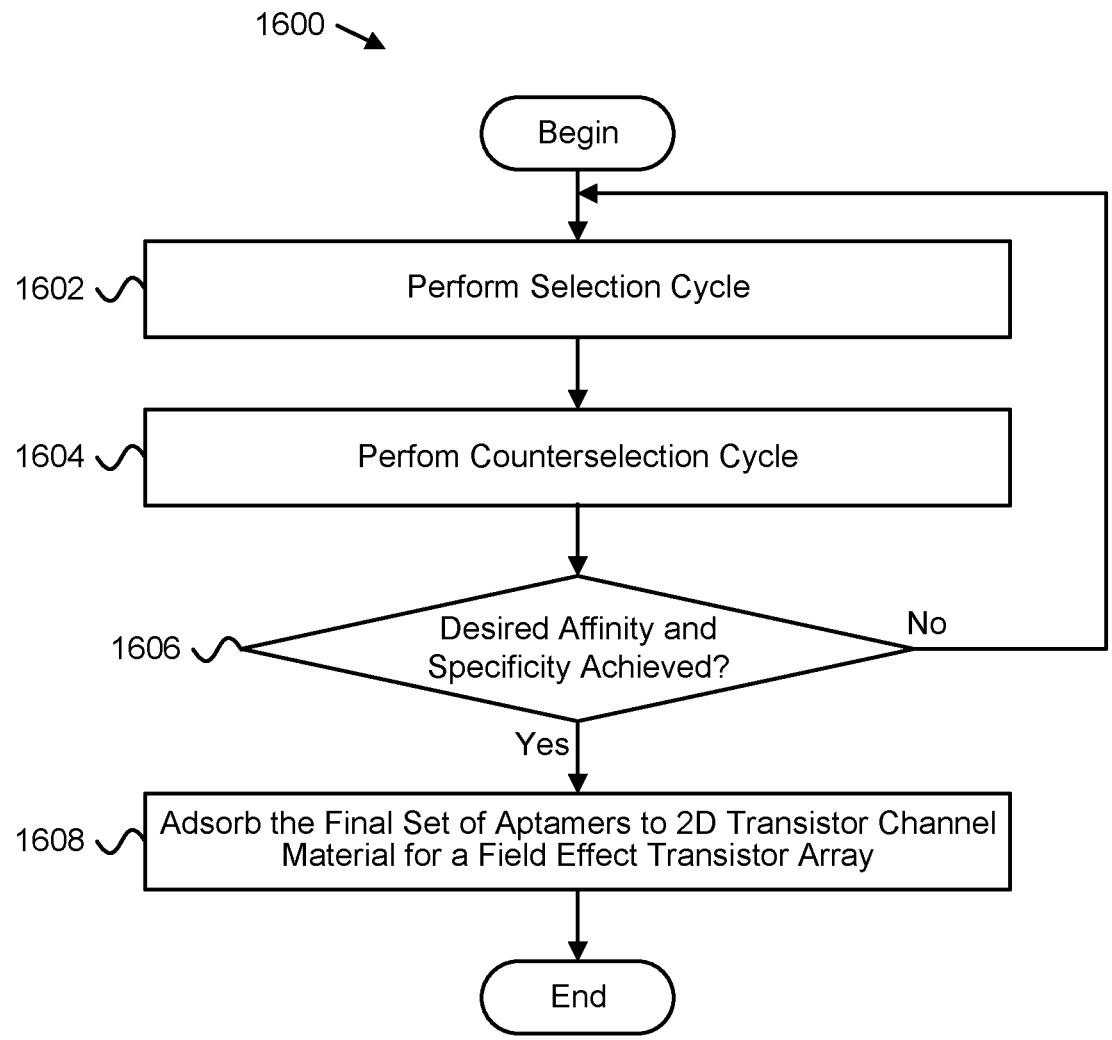
FIG. 16 is a schematic flow chart diagram illustrating a method for producing a field effect transistor array including selected synthetic biopolymer specific binding agents.

FIG. 16 is a schematic flow chart diagram illustrating one example of a method 1600 for producing a field effect transistor array including selected synthetic biopolymer specific binding agents. The method 1600 includes iteratively performing a plurality of selection cycles 1602 (e.g., using the method 1300 of FIG. 13) and counterselection cycles 1604 (e.g., using the method 1400 of FIG. 14) to produce a final set of synthetic biopolymer specific binding agents. In the depicted example, iterations of selection and counterselection cycles end when a desired affinity and specificity for a target has been achieved 1606, which may be verified using a system for direct or indirect direct or indirect target substance signal measurement as disclosed herein.

In another example iterations of selection and counterselection cycles end after a predetermined number of cycles. Additionally, although FIG. 16 depicts performing equal numbers of alternating selection and counterselection cycles, different numbers of selection cycles and counterselection cycles may be performed in another order. For example, a number of counterselection cycles may be performed to obtain synthetic biopolymer specific binding agents with high specificity after first performing a number of selection cycles to obtain synthetic biopolymer specific binding agents with high affinity to targets. The final set of synthetic biopolymer specific binding agents is adsorbed 1608 to 2D transistor channel material for a field effect transistor array, and the method ends.

Examples may be practiced in other specific forms. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

Various embodiments of present disclosure are described in the following clauses:

1. A method for target substance signal measurement comprising adsorbing a thin film layer of synthetic biopolymer specific binding agents to a top surface of one or more 2D transistor channels in an array of 2D FETs; applying excitation conditions that affect the 2D FETs in the array, the excitation conditions comprising a time dependent counter electrode voltage applied to a liquid in a gate area; determining measurement vectors for one or more output signals of the 2D FETs, the one or more output signals being affected by the excitation conditions and a biochemical interaction between the target substance and the synthetic biopolymer specific binding agents; and characterizing one or more parameters of the biochemical interactions based on the measurement vectors.

2. The method according to clause 1, further comprising selecting the synthetic biopolymer specific binding agents to desorb from the 2D transistor channels in response to biochemical interactions with a target substance in the liquid.

3. The method according to any of the preceding clauses, further comprising selecting the synthetic biopolymer specific binding agents not to bind to a counter target.

4. The method according to clause 1, further comprising selecting the synthetic biopolymer specific binding agents to remain adsorbed to the 2D transistor channel material in response to biochemical interactions with the target substance in the liquid.

5. The method according to any of the preceding clauses, wherein the 2D transistor channels comprise graphene;

6. The method according to any of the preceding clauses, wherein the 2D transistor channels comprise a 2D nanomaterial selected from molybdenum disulfide, phosphorene, and transition metal dichalcogenides;

7. The method according to any of the preceding clauses, wherein the synthetic biopolymer specific binding agents are selected from aptamers, peptides, saccharides, fragments thereof, and combinations thereof.

8. The method according to any of the preceding clauses, further comprising characterizing the target substance in the sample liquid by applying a transfer curve model of the 2D FET to the measured output signal and extracting parameters usable to identify presence of the target substance.

9. The method according to any of the preceding clauses, wherein the liquid is derived from a biological source.

10. The method according to any of the preceding clauses, further comprising performing a test for an adverse health condition by determining presence of target substances associated with the adverse health condition.

11. The method according to clause 10, wherein the adverse health condition is selected from a cancer, a viral infection, a bacterial infection, a cardiovascular disorder, or combinations thereof.

12. The method according to any of the preceding clauses, wherein the measurement vectors comprise transfer curve parameters derived from on-chip electrical measurements of the thin film characteristics of the layer of synthetic biopolymer specific binding agents in the liquid, the thin file characteristics selected from thickness, relative thickness, porosity, relative porosity, and combinations thereof.

13. The method according to any of the preceding clauses, wherein the measurement vectors comprise one or more transfer curve parameters selected from maximum transconductance magnitudes for p-type and/or n-type branches of a transfer curve, a charge neutrality point voltage of the transfer curve, resistance at the charge neutrality point, curvature of the transfer curve in the region of the charge neutrality point, curvature of the p-type and/or n-type branches of the transfer curve apart from the region of the charge neutrality point, slope of the p-type and/or n-type branches of the transfer curve apart from the region of the charge neutrality point, and skew of the transfer curve between the p-type and n-type branches of the transfer curve.

14. The method according to clause 13, wherein one or more parameters comprising capacitance, mobility, defect density, and combinations thereof are extracted from the transfer curves parameters using a physical model of selected 2D FETs that includes a capacitance term dependent on gate voltage and a term for the skew of the transfer curve between p-type and n-type conduction.

16. The method according to any of the preceding clauses, further comprising performing a calibration measurement by: applying one or more solutions with known salinities to determine one or more known double layer thicknesses; and calibrating responses of selected 2D FETs used to perform the calibration measurement to the known double layer thicknesses determined by applying the one or more solutions.

17. The method according to any of the preceding clauses, further comprising determining a thickness of a selected thin film layer in the liquid by: determining a ratio of a maximum transconductance measurement of a pre-deposition transfer curve to a maximum transconductance measurement of a post-deposition transfer curve.

18. The method according to any of the preceding clauses, further comprising determining a thickness of a selected thin film layer in the liquid by: determining a ratio of a pre-deposition fitted capacitance to a post-deposition fitted capacitance.

19. The method according to any of the preceding clauses, wherein characterizing the biochemical interactions between the target substance and the synthetic biopolymer specific binding agents comprises characterizing the biochemical interaction occurring at one or more measurement distances including at least one measurement distance greater than an electrostatic screening distance from the surface of the channel, by performing a plurality of time-dependent measurements of at least one of the one or more output signals affected by the excitation conditions and the biochemical interaction, using a predetermined measurement bandwidth corresponding to the one or more measurement distances.

20. The method according to clause 19, wherein the predetermined measurement bandwidth satisfies a predetermined frequency criterion for measuring at least one of the one or more parameters of the biochemical interaction.

21. The method according to any of the preceding clauses, further comprising characterizing the one or more parameters of the biochemical interaction at multiple measurement distances from the surface of the channel, the multiple measurement distances corresponding to the multiple excitation frequencies.

22. The method according to any of the preceding clauses, further comprising characterizing the one or more parameters of the biochemical interaction by determining an observed spectrum based on the plurality of time-dependent measurements and comparing the observed spectrum to one or more model spectra corresponding to one or more models of biochemical interactions.

23. An integrated circuit comprising a liquid gated array of two-dimensional field effect transistors configured to perform the method of any one or more of clauses 1-22.

24. A biosignal processing device comprising: the integrated circuit of clause 23; an interface; and a processing system coupled to the interface, the interface and the processing system configured to perform the method of any one or more of clauses 1-22.

25. A non-transitory computer-readable medium including instructions that, when executed by one or more processors of a biosignal processing device, cause the biosignal processing device to perform the operations of any one or more of clauses 1-22.

Various modifications to the implementations described in this disclosure may be readily apparent to persons having ordinary skill in the art, and the generic principles defined herein may be applied to other implementations without departing from scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations.

What is claimed is:

1. A system for indirect target substance signal measurement comprising:
    an integrated circuit comprising an array of 2D FETs, at least a portion of one or more selected instances of the 2D FETs in the array individually comprising:
        a 2D transistor channel disposed on a substrate, the 2D transistor channel formed in a layer of 2D nanomaterial, a gate area for receiving a volume of liquid comprising one or more chemical or biological target substances,
a conductive source electrically coupled to a first end of the 2D transistor channel,
a conductive drain electrically coupled to a second end of the 2D transistor channel, and
one or more layers of synthetic biopolymer specific binding agents adsorbed directly or indirectly to a top surface of the 2D transistor channel of the one or more selected instances of the 2D FETs in the array, wherein at least a portion of the one or more layers of synthetic biopolymer specific binding agents is selected to bind to a target substance in a liquid applied to the array of 2D FETs in contact with the top surface and in response to binding with the target substance to desorb from the 2D transistor channel of the one or more selected instances of the 2D FETs;
one or more environmentally non-reactive electrodes for biasing and/or measuring electrical characteristics of the liquid, the one or more environmentally non-reactive electrodes disposed on the substrate;
a measurement controller operable to apply one or more excitation conditions to the array of 2D FETs such that one or more output signals from the one or more selected instances of the 2D FETS of the array are affected by binding of the synthetic biopolymer specific binding agents to the target substance in the liquid causing the one or more layers of synthetic biopolymer specific binding agents to desorb from the 2D transistor channel of one or more selected instances of the 2D FETS to which they were adsorbed, and to perform one or more measurements of the one or more output signals affected by binding of the synthetic biopolymer specific binding agents; and
an analysis module operable to determine measurement vectors based on the one or more measurements, wherein at least a portion of the analysis module and the measurement controller individually comprises one or more of a set of hardware circuits, a set of programmable logic, and executable code stored on non-transitory computer-readable storage media.

2. The system of claim 1, wherein the 2D nanomaterial of the 2D transistor channel is graphene.

3. The system of claim 1, wherein the measurement vectors comprise one or more transfer curve parameters derived from electrical measurements of thin film characteristics of the one or more layers of synthetic biopolymer specific binding agents, the thin film characteristics selected from relative thickness and/or relative porosity.

4. The system of claim 1, wherein the measurement vectors comprise one or more transfer curve parameters selected from maximum transconductance magnitudes for p-type and/or n-type branches of a transfer curve, a charge neutrality point voltage of the transfer curve, resistance at the charge neutrality point, curvature of the transfer curve in a charge neutrality point region, curvature of the p-type and/or n-type branches of the transfer curve apart from the charge neutrality point region, slope of the p-type and/or n-type branches of the transfer curve apart from the charge neutrality point region, skew of the transfer curve between the p-type and n-type branches of the transfer curve, and combinations thereof.

5. The system of claim 1, wherein one or more analyte characterization parameters selected from capacitance, mobility, defect density, and combinations thereof, are extracted from the measurement vectors using a physical model of current through selected 2D FETs that includes a capacitance term dependent on gate voltage and a term for skew of a transfer curve between p-type and n-type conduction.

6. The system of claim 3, wherein the relative thickness of a thin film layer of the one or more selected layers of synthetic biopolymer specific binding agents deposited over the top surfaces of transistor channels of the 2D FETs are determined by determining a ratio of a pre-deposition maximum transconductance values determined prior to deposition of the one or more selected layers of synthetic biopolymer specific binding agents to a post-deposition maximum transconductance values determined after deposition of the one or more selected layers of synthetic biopolymer specific binding agents.

7. The system of claim 3, wherein the relative porosity of a thin film layer of the one or more selected layers of synthetic biopolymer specific binding agents deposited over the top surfaces of transistor channels of the 2D FETs is determined by comparing a first deposition measurement vector generated using a full strength buffer with a second deposition measurement vector generated using a diluted buffer.

8. The system of claim 1, wherein the one or more selected instances of the 2D FETs in the array individually further comprise a ceramic coating over the conductive source and the conductive drain to electrically insulate at least a portion of the conductive source and at least a portion of the conductive drain.

9. The system of claim 3, wherein for a sample under test, characterization of the target substance in the sample is based on a comparison of measurement vectors comprising selected thin film characteristics of the layer of synthetic biopolymer specific binding agent select to desorb from the channels of the selected one or more 2D FETs in response to binding with the target substance to reference measurement vectors comprising selected thin film characteristics of the one or more layers of synthetic biopolymer specific binding agent remaining on 2D transistor channels of different 2D FETs.

10. The system of claim 3, wherein for a sample under test,
characterization of the target substance in the sample is based on a rate of change of the selected thin film characteristics of the layer of synthetic biopolymer specific binding agent selected to desorb from the channels of the selected one or more 2D FETs in response to binding with the target substance to reference measurement vectors comprising selected thin film characteristics of the layer of synthetic biopolymer specific binding agent remaining on 2D transistor channels of different 2D FETs.

11. An apparatus comprising:
a 2D transistor channel comprising 2D nanomaterial for one or more selected instances of 2D field effect transistors (2D FETs) in a 2D FET array; and
one or more thin film layers comprising synthetic biopolymer specific binding agents adsorbed to a top surface of the 2D transistor channel of the one or more selected instances, at least a portion of the one or more synthetic biopolymer specific binding agents being selected to bind to a target substance in a liquid applied to the top surface and in response to binding to the target substance to desorb from the 2D transistor channel of the one or more selected instances of the 2D FETs, wherein the 2D FETs comprises one or more pre-deposition reference thin film characteristics determined based on measurement vectors of transfer curve parameters measured before individual layers of the one or more layers of synthetic biopolymer specific binding agents are deposited to be adsorbed to the top surface of the 2D transistor channel of the one or more selected instances, the thin film characteristics selected from relative thickness and/or relative porosity.

12. The apparatus of claim 11, wherein the 2D nanomaterial of the 2D transistor channel is graphene.

13. The apparatus of claim 11, wherein the one or more layers of synthetic biopolymer specific binding agents adsorbed to the top surface of the 2D transistor channel comprise selectively deposited thin film layers that meet a predetermined criteria for one or more thin film characteristics selected from relative thickness and/or relative porosity.

14. The apparatus of claim 11, further comprising an environmentally non-reactive electrode operable to apply a bias between the electrode and the top surface, such that the synthetic biopolymer specific binding agents selected to desorb in response to binding with the target substance are repelled from the top surface of the 2D transistor channel.

15. The apparatus of claim 11, wherein the one or more layers of synthetic biopolymer specific binding agents selected to desorb from 2D transistor channel in response to binding with the target substance are selected from peptides, nucleic acid molecules, saccharides, and combinations thereof, that have been identified as having a predetermined affinity and/or specificity for: binding to the target substance, desorption from the 2D transistor channel, and/or non-binding to counter targets.

16. An apparatus comprising:
a 2D transistor channel comprising 2D nanomaterial for one or more selected instances of 2D field effect transistors (2D FETs) in a 2D FET array;
one or more thin film layers comprising synthetic biopolymer specific binding agents adsorbed to a top surface of the 2D transistor channel of the one or more selected instances, at least a portion of the one or more synthetic biopolymer specific binding agents being selected to bind to a target substance in a liquid applied to the top surface and in response to binding to the target substance to desorb from the 2D transistor channel of the one or more selected instances of the 2D FETs; and
an environmentally non-reactive electrode operable to apply a bias between the electrode and the top surface, such that the synthetic biopolymer specific binding agents selected to desorb in response to binding with the target substance are repelled from the top surface of the 2D transistor channel.

17. The apparatus of claim 16, wherein the 2D nanomaterial of the 2D transistor channel is graphene.

18. The apparatus of claim 16, wherein the 2D FETs comprises one or more pre-deposition reference thin film characteristics determined based on measurement vectors of transfer curve parameters measured before individual layers of the one or more layers of synthetic biopolymer specific binding agents are deposited to be adsorbed to the top surface of the 2D transistor channel of the one or more selected instances, the thin film characteristics selected from relative thickness and/or relative porosity.

19. The apparatus of claim 16, wherein the one or more layers of synthetic biopolymer specific binding agents adsorbed to the top surface of the 2D transistor channel comprise selectively deposited thin film layers that meet a predetermined criteria for one or more thin film characteristics selected from relative thickness and/or relative porosity.

* * * * *